United States Patent
Bechtel et al.

(10) Patent No.: US 6,379,013 B1
(45) Date of Patent: Apr. 30, 2002

(54) VEHICLE EQUIPMENT CONTROL WITH SEMICONDUCTOR LIGHT SENSORS

(75) Inventors: Jon H. Bechtel; Frederick T. Bauer; Joseph S. Stam, all of Holland; Robert C. Knapp, Coloma; Robert R. Turnbull; David J. Schmidt, both of Holland; G. Bruce Poe, Hamilton; David L. Plangger, Stevensville, all of MI (US); Robert H. Nixon, Burbank; Eric R. Fossum, La Crescenta, both of CA (US); Timothy E. Steenwyk, Jenison, MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 09/491,192

(22) Filed: Jan. 25, 2000

Related U.S. Application Data

(63) Continuation-in-part of application No. 09/307,941, filed on May 7, 1999, which is a continuation-in-part of application No. 09/236,969, filed on Jan. 25, 1999, which is a continuation-in-part of application No. 09/307,191, filed on May 7, 1999, which is a continuation-in-part of application No. 09/290,966, filed on Apr. 13, 1999, which is a continuation-in-part of application No. 09/237,107, filed on Jan. 25, 1999.

(51) Int. Cl.$^7$ .................................. G02B 5/08
(52) U.S. Cl. .................. 359/604; 359/601; 359/602; 359/605; 359/608
(58) Field of Search ................. 359/604, 601–603, 359/605–610, 264–272; 250/208.1, 208.2, 209, 226, 214 AL, 214 D, 206.1, 210

(56) References Cited

U.S. PATENT DOCUMENTS

| | | |
|---|---|---|
| 2,632,040 A | 3/1953 | Rabinow |
| 2,827,594 A | 3/1958 | Rabinow |
| 3,601,614 A | 8/1971 | Platzer, Jr. |
| 3,680,951 A | 8/1972 | Jordan et al. |
| 3,746,430 A | 7/1973 | Brean et al. |

(List continued on next page.)

FOREIGN PATENT DOCUMENTS

| | | |
|---|---|---|
| DE | 2946561 | 5/1981 |
| DE | 4424454 | 1/1996 |

(List continued on next page.)

OTHER PUBLICATIONS

Patent Abstract of Japanese Publication No. 59199347, published Nov. 12, 1984, entitled WIPER CONTROLLER FOR VEHICLE.

(List continued on next page.)

*Primary Examiner*—Mohammad Sikder
(74) *Attorney, Agent, or Firm*—Price, Heneveld, Cooper, DeWitt & Litton; Brian J. Rees

(57) ABSTRACT

Equipment on automotive vehicle (20) is controlled by a system at least one semiconductor light sensor (170, 170') having variable sensitivity to light. Each light sensor generates a light signal (164) indicative of the intensity of light incident on the light sensor. Control logic (66) varies the sensitivity of the light sensor and generates equipment control signals (166) based on received light signals. Sensitivity of light sensors (170, 170') may be varied by changing the integration time (228) for producing charge from light (176) incident on light transducers (178), by selecting between light transducers (178, 490, 500, 504) of different sensitivity within the light sensor (170), by using a light transducer (530) with a sensitivity that is a function of the amount of incident light (176), and the like. Controlled equipment includes devices such as automatically dimming rearview mirrors (24,26), headlamps (44), and moisture removal means (38, 40, 42).

49 Claims, 37 Drawing Sheets

U.S. PATENT DOCUMENTS

| | | |
|---|---|---|
| 4,208,668 A | 6/1980 | Krimmel |
| 4,315,159 A | 2/1982 | Niwa et al. |
| 4,355,271 A | 10/1982 | Noack |
| 4,443,057 A | 4/1984 | Bauer et al. |
| 4,465,370 A | 8/1984 | Yuasa et al. |
| 4,580,875 A | 4/1986 | Bechtel et al. |
| 4,620,141 A | 10/1986 | McCumber et al. |
| 4,632,509 A | 12/1986 | Ohmi et al. |
| 4,652,745 A | 3/1987 | Zanardelli |
| 4,669,826 A | 6/1987 | Itoh et al. |
| 4,678,938 A | 7/1987 | Nakamura |
| 4,690,508 A | 9/1987 | Jacob |
| 4,692,798 A | 9/1987 | Seko et al. |
| 4,697,883 A | 10/1987 | Suzuki et al. |
| 4,793,690 A | 12/1988 | Gahan et al. |
| 4,798,956 A | 1/1989 | Hochstein |
| 4,799,768 A | 1/1989 | Gahan |
| 4,819,071 A | 4/1989 | Nakamura |
| 4,859,867 A | 8/1989 | Larson et al. |
| 4,862,037 A | 8/1989 | Farber et al. |
| 4,867,561 A | 9/1989 | Fuji et al. |
| 4,871,917 A | 10/1989 | O'Farrell et al. |
| 4,886,960 A | 12/1989 | Molyneux et al. |
| 4,891,559 A | 1/1990 | Matsumoto et al. |
| 4,902,108 A | 2/1990 | Byker |
| 4,916,307 A | 4/1990 | Nishibe et al. |
| 4,916,374 A | 4/1990 | Schierbeek et al. |
| 4,930,742 A | 6/1990 | Schofield et al. |
| 4,956,591 A | 9/1990 | Schierbeek et al. |
| 4,960,996 A | 10/1990 | Hochstein |
| 4,967,319 A | 10/1990 | Seko |
| 4,973,844 A | 11/1990 | O'Farrell et al. |
| 4,987,354 A | 1/1991 | Steinmann |
| 5,036,437 A | 7/1991 | Macks |
| 5,124,549 A | 6/1992 | Michaels et al. |
| 5,140,455 A | 8/1992 | Varaprasad et al. |
| 5,204,778 A | 4/1993 | Bechtel |
| 5,214,274 A | 5/1993 | Yang |
| 5,220,317 A | 6/1993 | Lynam et al. |
| 5,235,178 A | 8/1993 | Hegyi |
| 5,243,215 A | 9/1993 | Enomoto et al. |
| 5,276,389 A | 1/1994 | Levers |
| 5,306,992 A | 4/1994 | Dröge |
| 5,313,072 A | 5/1994 | Vachss |
| 5,329,206 A | 7/1994 | Slotkowski et al. |
| 5,336,980 A | 8/1994 | Levers |
| 5,338,691 A | 8/1994 | Enomoto et al. |
| 5,386,111 A | 1/1995 | Zimmerman |
| 5,386,128 A | 1/1995 | Fossum et al. |
| 5,410,455 A | 4/1995 | Hashimoto |
| 5,416,318 A | 5/1995 | Hegyi |
| 5,426,294 A | 6/1995 | Kobayashi et al. |
| 5,451,822 A | 9/1995 | Bechtel et al. |
| 5,471,515 A | 11/1995 | Fossum et al. |
| 5,483,346 A | 1/1996 | Butzer |
| 5,488,416 A | 1/1996 | Kyuma |
| 5,498,866 A | 3/1996 | Bendicks et al. |
| 5,508,592 A | 4/1996 | Lapatovich et al. |
| 5,537,003 A | 7/1996 | Bechtel et al. |
| 5,550,677 A | 8/1996 | Schofield et al. |
| 5,581,240 A | 12/1996 | Egger |
| 5,598,146 A | 1/1997 | Schröder |
| 5,614,788 A | 3/1997 | Mullins et al. |
| 5,625,210 A | 4/1997 | Lee et al. |
| 5,644,418 A | 7/1997 | Woodward |
| 5,659,294 A | 8/1997 | Schröder |
| 5,660,454 A | 8/1997 | Mori et al. |
| 5,661,303 A | 8/1997 | Teder |
| 5,663,542 A | 9/1997 | Kohr et al. |
| 5,666,028 A | 9/1997 | Bechtel et al. |
| 5,712,685 A | 1/1998 | Dumas |
| 5,715,093 A | 2/1998 | Schierbeek et al. |
| 5,724,187 A | 3/1998 | Varaprasad et al. |
| RE35,762 E | 4/1998 | Zimmerman |
| 5,760,962 A | 6/1998 | Schofield et al. |
| 5,789,737 A | 8/1998 | Street |
| 5,796,094 A | 8/1998 | Schofield et al. |
| 5,796,106 A | 8/1998 | Noack |
| 5,808,350 A | 9/1998 | Jack et al. |
| 5,811,793 A | 9/1998 | Pientka |
| 5,818,600 A | 10/1998 | Bendicks et al. |
| 5,821,863 A | 10/1998 | Schröder et al. |
| 5,837,994 A | 11/1998 | Stam et al. |
| 5,841,126 A | 11/1998 | Fossum et al. |
| 5,841,159 A | 11/1998 | Lee et al. |
| 5,872,437 A | 2/1999 | Pientka et al. |
| 5,904,493 A | 5/1999 | Lee et al. |
| 5,923,027 A | 7/1999 | Stam et al. |
| 5,942,853 A | 8/1999 | Piscart |
| 5,990,469 A | 11/1999 | Bechtel et al. |
| 6,008,486 A | 12/1999 | Stam et al. |
| 6,027,955 A | 2/2000 | Lee et al. |
| 6,097,023 A | 8/2000 | Schofield et al. |
| 6,196,688 B1 * | 3/2001 | Caskey et al. .............. 359/603 |

FOREIGN PATENT DOCUMENTS

| | | |
|---|---|---|
| DE | 19526249 | 2/1996 |
| EP | 0479169 | 4/1992 |
| EP | 0285724 | 12/1992 |
| EP | 0675345 | 10/1995 |
| EP | 0711683 | 5/1996 |
| EP | 0869032 | 10/1998 |
| FR | 2641237 | 7/1990 |
| FR | 2726144 | 4/1996 |
| GB | 2056059 | 3/1981 |
| JP | 8-166221 | 6/1996 |
| JP | 97126998 | 5/1997 |
| WO | 8605147 | 9/1986 |
| WO | 9427262 | 11/1994 |
| WO | 9501561 | 1/1995 |
| WO | 9735743 | 10/1997 |
| WO | 9843850 | 10/1998 |
| WO | 9923828 | 5/1999 |
| WO | 9947396 | 9/1999 |
| WO | 0022881 | 4/2000 |

OTHER PUBLICATIONS

Christopher M. Kormanyos, SAE Paper No. 980003, pp. 13–18.

Franz–Josef Kalze, SAE Paper No. 980005, pp. 23–26.

J.P. Löwenau et al., SAE Paper No. 980007, pp. 33–38.

Tohru Shimizu et al., SAE Paper No. 980322, pp. 113–117.

* cited by examiner

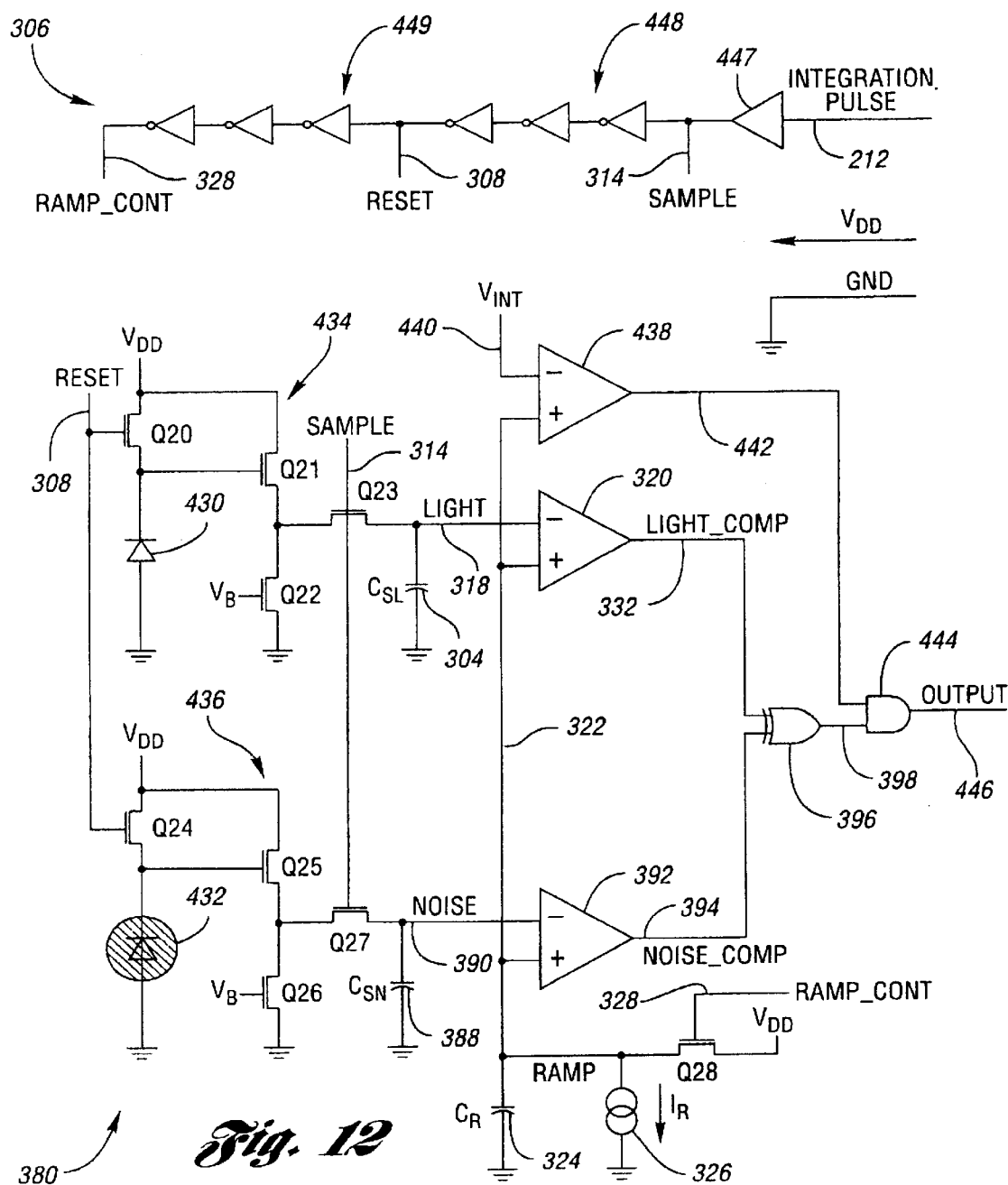
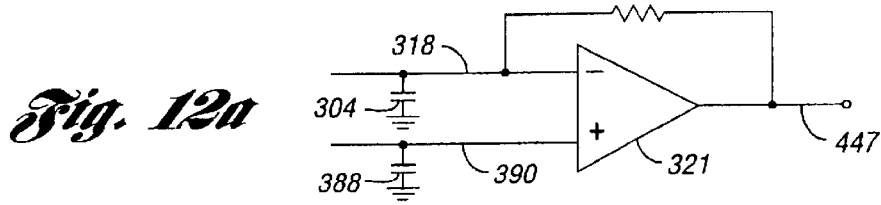
Fig. 12
Fig. 12a

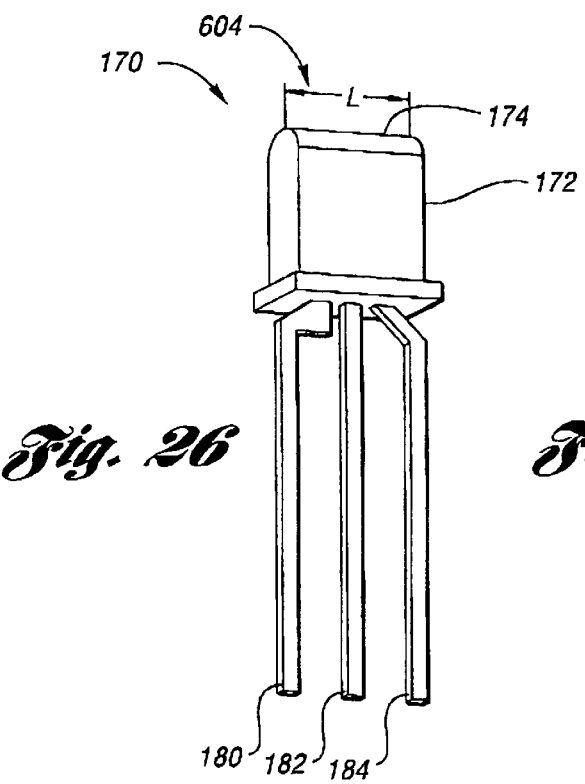
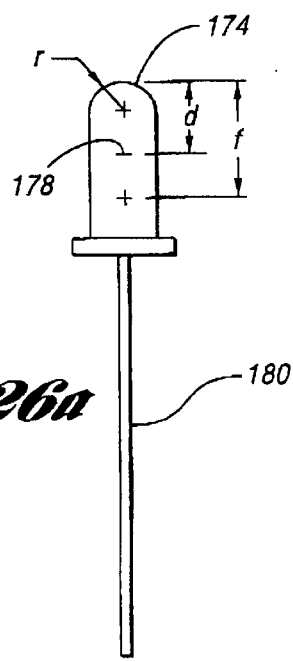
Fig. 26    Fig. 26a
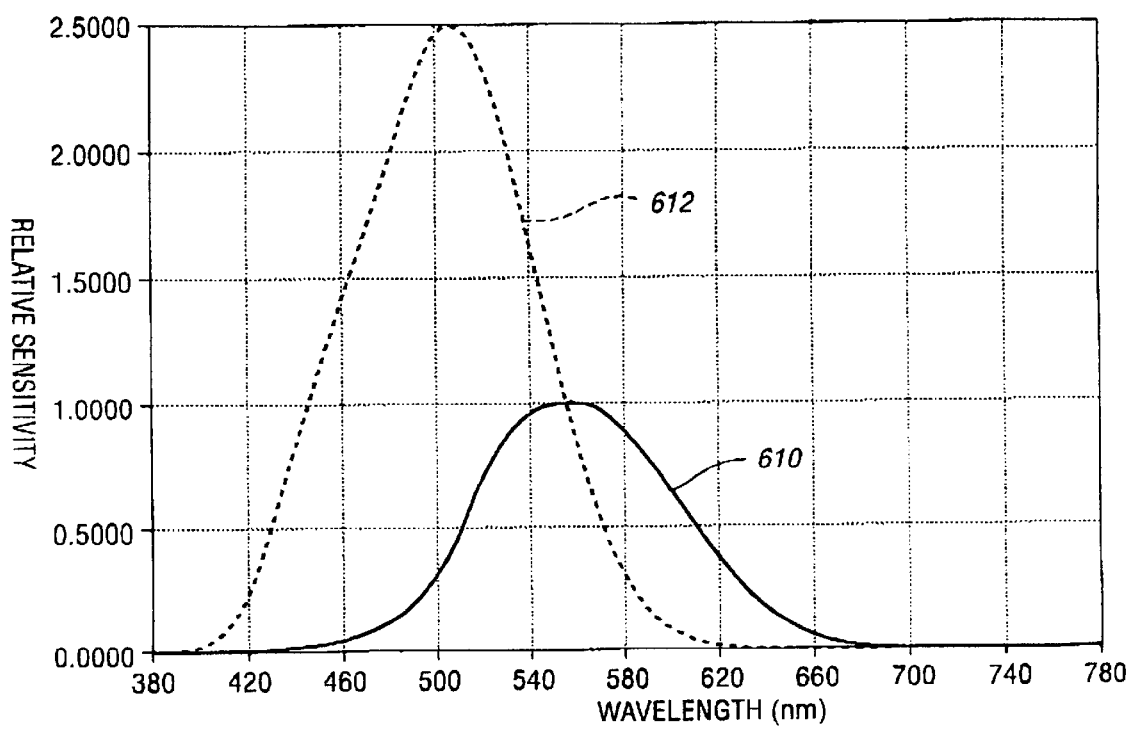
Fig. 27

VEHICLE EQUIPMENT CONTROL WITH SEMICONDUCTOR LIGHT SENSORS

REFERENCE TO RELATED APPLICATIONS

This is a Continuation-in-Part of co-pending U.S. patent application Ser. No. 09/307,941, entitled AUTOMATIC DIMMING MIRROR USING SEMICONDUCTOR LIGHT SENSOR WITH INTEGRAL CHARGE COLLECTION, May 7, 1999, which is a Continuation-in-Part of U.S. patent application Ser. No. 09/236,969, entitled AUTOMATIC DIMMING MIRROR USING SEMICONDUCTOR LIGHT SENSOR WITH INTEGRAL CHARGE COLLECTION, filed Jan. 25, 1999, the disclosures of which are incorporated herein by reference thereto. This application is also a Continuation-in-Part of co-pending U.S. patent application Ser. No. 09/307,191, entitled PHOTODIODE LIGHT SENSOR, filed May 7, 1999, and a Continuation-in-Part of co-pending U.S. patent application Ser. No. 09/290,966, entitled MOISTURE DETECTING SYSTEM USING SEMICONDUCTOR LIGHT SENSOR WITH INTEGRAL CHARGE COLLECTOR, filed Apr. 13, 1999, both of which are a Continuation-in-Part of U.S. patent application Ser. No. 09/237,107, entitled PHOTODIODE LIGHT SENSOR, filed Jan. 25, 1999, the disclosures of all of which are incorporated herein by reference thereto.

TECHNICAL FIELD

The present invention relates to automatically controlled automotive vehicle equipment of the type using light sensors to monitor light levels.

BACKGROUND ART

The continuing reduction in the size and cost of electronic circuits, in particular microprocessors, makes possible the inclusion of an increasing amount of intelligence for the automatic control of automotive vehicle equipment. Examples include: rearview mirrors that adjust their reflectivity in response to the levels of ambient light and glare from other vehicles; moisture on windows sensed and removed by automatic wipers, defrosters, defoggers, and the like; windows that automatically close when rain is detected; headlamps switched in response to ambient light levels; heating and cooling of the vehicle passenger compartment automatically adjusted in anticipation of changes in external conditions.

Systems that automatically control automotive equipment can advantageously employ one or more sensors for measuring light levels. Automatically dimmable rearview mirrors, and in particular electrochromic mirrors, using light sensors, are described in U.S. Pat. No. 4,902,108 to Byker; U.S. Pat. No. 5,724,187 to Varaprasad et al.; and U.S. Pat. No. 5,928,572 to Tonar et al.; as well as U.S. patent application Ser. No. 08/832,596 to Baumann et al., filed Apr. 2, 1997, entitled "An Improved Electrochromic Medium Capable of Producing A Pre-Selected Color." In the case of mirrors having automatic reflectivity control, such as electrochromic mirrors, it is advantageous to use sensors to detect both forward and rear light levels. Among the dual sensor designs proposed include those described in U.S. Pat. No. 3,601,614 to Platzer; U.S. Pat. No. 3,746,430 to Brean et al.; U.S. Pat. No. 4,580,875 to Bechtel et al.; U.S. Pat. No. 4,793,690 to Gahan et al.; U.S. Pat. No. 4,886,960 to Molyneux et al.; U.S. Pat. No. 4,917,477 to Bechtel et al.; U.S. Pat. No. 5,204,778 to Bechtel; U.S. Pat. No. 5,451,822 to Bechtel et al.; and U.S. Pat. No. 5,715,093 to Schierbeek et al. A vision system is disclosed in U.S. patent application Ser. No. 09/001,855, entitled VEHICLE VISION SYSTEM, filed by Jon H. Bechtel et al. on Dec. 31, 1997, the disclosure of which is incorporated herein by reference thereto.

Various moisture detectors are also known that employ a light sensor. Examples of such detectors include those described in U.S. Pat. No. 5,821,863 to Schröder et al.; U.S. Pat. No. 5,796,106 to Noack; U.S. Pat. No. 5,661,303 to Teder; U.S. Pat. No. 5,386,111 to Zimmerman; U.S. Pat. No. 4,973,844 to O'Farrell et al.; U.S. Pat. No. 4,960,996 to Hochstein; U.S. Pat. No. 4,930,742 to Schofield et al.; U.S. Pat. No. 4,871,917 to O'Farrell et al.; U.S. Pat. No. 4,867,561 to Fujii et al.; U.S. Pat. No. 4,798,956 to Hochstein; U.S. Pat. No. 4,652,745 to Zanardelli; and U.S. Pat. No. RE. 35,762 to Zimmerman. A moisture detection system is disclosed in U.S. Pat. No. 5,923,027, entitled MOISTURE SENSOR AND WINDSHIELD FOG DETECTOR USING AN IMAGE SENSOR, issued on Jul. 13, 1999, to Joseph S. Stam et al., the disclosure of which is incorporated herein by reference thereto.

A variety of systems for controlling headlamps using a light sensor are also known, including those described in U.S. Pat. No. 4,891,559 to Matsumoto et al.; U.S. Pat. No. 5,036,437 to Macks; U.S. Pat. No. 5,235,178 to Hegyi; U.S. Pat. No. 5,537,003 to Bechtel et al.; U.S. Pat. No. 5,416,318 to Hegyi; U.S. Pat. No. 5,426,294 to Kobayashi et al.; U.S. Pat. No. 5,666,028 to Bechtel et al., and U.S. Pat. No. 5,942,853 to Piscart. Such systems employ a light sensor to detect conditions under which the headlamp light intensity is altered. Other systems are disclosed in U.S. Pat. No. 5,837,994, entitled CONTROL SYSTEM TO AUTOMATICALLY DIM VEHICLE HEAD LAMPS, issued Nov. 17, 1998, to Joseph Scott Stam et al., U.S. Pat. No. 5,990,469, entitled CONTROL CIRCUIT FOR IMAGE ARRAY SENSORS, issued to Jon H. Bechtel et al. on Nov. 23, 1999, and U.S. Pat. No. 5,998,929, entitled CONTROL SYSTEM FOR AUTOMOTIVE VEHICLE HEADLAMPS AND OTHER VEHICLE EQUIPMENT, issued on Dec. 7, 1999, to Jon H. Bechtel et al, the disclosures of which are incorporated herein by reference thereto.

Such automatically controlled equipment may employ one or more cadmium sulfide (CdS) cell as a light sensor. CdS cells are photosensitive resistors exhibiting increasing conductance with increasing light levels. CdS cells offer some advantages, such as being relatively low in cost, demonstrating good sensitivity to low light levels, and providing a spectral response somewhat similar to that of the human eye. However, equipment employing such cells can not fully realize these advantages due to other characteristics of CdS cells, such as: a high degree of variance between cells, slow response at low light levels, poor environmental stability, limited dynamic range, and difficulty being assembled in automated electronic manufacturing processes and equipment. Rearview mirrors employing CdS cells for sensing ambient light and glare may incorporate the CdS cell into a full or partial bridge to increase the dynamic range of the cell. However, the bridge output will only represent a fixed relationship between an ambient light level and a glare level, which fixed relationship is often not appropriate throughout the range of ambient light levels monitored.

Vehicle equipment, such as automatic dimming mirrors, have also used one or more discrete photodiodes configured as a light-dependent current source. Relative to equipment using CdS cells, equipment using photodiodes will experience less operational variance due to the light sensor part performance, will demonstrate better environmental stability, and will be more easily adapted to automated manufacturing. However, photodiodes themselves are relatively expensive and produce very low currents at low light levels. These low currents require the inclusion of special amplification techniques to achieve a useful signal for the electronic components, increasing the cost and complexity of the equipment.

Another approach to providing equipment responsive to ambient light is described in U.S. Pat. No. 5,760,962 issued to Schofield et al. wherein an automatically dimmable mirror is disclosed that incorporates a large imaging array to gather light from behind and beside the vehicle. Each light transducer, or pixel, within the array views a separate area within the target spatial distribution of the light sensor. The equipment measures ambient light by examining pixels generally directed sideways. The cost of the imaging array, the required lens, and the complicated signal processing logic make equipment using the imaging array prohibitively expensive for many automotive applications. An additional problem is that light collected from a side view less accurately represents the ambient light experienced by the vehicle operator than does light from a forward view.

One difficulty with providing equipment employing light sensors is the occurrence of operating anomalies when the equipment is subject to high temperatures. Some equipment employs light sensors that are extremely non-linear at high temperatures. Other equipment may suffer a permanent change in operating characteristics after being exposed to high temperatures. Such a permanent change can occur in equipment using a CdS cell exposed to prolonged sun on a hot day, such as prolonged exposure to temperatures in excess of 87 C. Sensors may even provide completely false readings, such as by identifying a bright light condition in low light conditions, due to excessive thermal noise. Traditionally, the only way to deal with this problem has been to incorporate a temperature sensor and additional electronics into the vehicle equipment to compensate for sensor performance changes resulting from temperature variations. Such electronics add cost and complexity to the equipment.

It can thus be seen that a difficulty with implementing automatically controlled equipment is accommodating the light sensor. Inclusion of light sensors typically introduces complex and costly manufacturing processes. However, the equipment needs to be inexpensive to fall within the range deemed acceptable by an automobile purchaser. Additionally, manufacturers of vehicles incorporating such equipment must either accept inconsistent operating performance or use complex and costly circuitry and processes to accommodate these variations. Such additional provisions may be required to enable the equipment to operate with sufficiently consistent sensitivity across a wide dynamic range as is required for operation in the ranges of temperature, humidity, shock, and vibration experienced within a vehicle.

What is needed is more cost-effective equipment using light sensors operable over a wide range of light conditions and temperatures.

SUMMARY

Automotive vehicle equipment is controlled by a system including at least one semiconductor light sensor having variable sensitivity to light. A light sensor generates a light signal indicative of the intensity of light incident on the light sensor. Control logic varies the sensitivity of light sensors and generates equipment control signals based on received light signals. Sensitivity of light sensors may be varied by changing the integration time of charge produced by light incident on light transducers, by selecting between light transducers of different sensitivity within the light sensor, by using a light transducer with a sensitivity that is a function of the amount of incident light, and the like.

In one embodiment, the system for automatically controlling vehicle equipment includes at least one semiconductor light sensor outputting a discrete light signal based on light incident over a variable integration period. Control logic generates at least one equipment control signal based on the discrete light signal.

In another embodiment, the vehicle equipment includes a rearview mirror having a dimming element with a variably reflective surface, the degree of reflectivity based on the equipment control signal. The light sensors include at least one of an ambient light sensor positioned to receive light generally in front of the vehicle and a glare sensor positioned to view a scene generally behind a vehicle operator.

In still another embodiment, the vehicle equipment includes at least one headlamp. The light sensors include at least one ambient light sensor positioned to receive light generally in front of and above the vehicle. The light sensors may be a first ambient light sensor admitting light in a first band of frequencies and a second ambient light sensor admitting light in a second band of frequencies different than the first band of frequencies. The control logic can determine a first filtered ambient light level from the light signal output from the first ambient light sensor and a second filtered ambient light level from the light signal output from the second ambient light sensor. A threshold based on the first filtered ambient light level and the second filtered ambient light level is found. A headlamp control signal based on the threshold and at least one of the first filtered ambient light levels and the second ambient light level is generated.

In yet another embodiment, the control of vehicle equipment is based on detecting the presence of moisture on a window. The system includes an emitter for emitting light at the window. At least one light sensor is positioned to receive light from the emitter reflected from the window. The control logic receives a first light signal from the light sensor with the emitter turned off. The emitter is turned on and a second light signal is received from the light sensor. The presence of moisture is determined based on the first light signal and the second light signal.

A method for automatically controlling equipment in an automotive vehicle is also disclosed. Sensitivity is determined for at least one semiconductor light sensor. Charge incident on the light sensor is integrated to achieve the determined sensitivity. A discrete light signal is generated based on the light incident on the light sensor over the integration period. The discrete light signal can be analog or digital. In one embodiment, the discrete signal has a digital level with a variable, analog length. At least one vehicle equipment control signal is then generated based on the discrete light signal.

These and other objects, features, and advantages will be apparent from reading the following detailed description taken in connection with the accompanying drawings.

BRIEF DESCRIPTION OF THE DRAWINGS

FIG. 12 is a schematic diagram illustrating an implementation of the light sensor of FIG. 14 using photodiodes as light transducers;

FIG. 12a is a circuit schematic of an alternate circuit for converting the LIGHT and NOISE signals of FIG. 12 to an output signal;

FIG. 26 is a perspective view illustrating an alternate light sensor;

FIG. 26a is a side elevation view illustrating of the sensor according to FIG. 26;

FIG. 27 is a graph illustrating frequency responses of the human eye;

DETAILED DESCRIPTION OF THE DRAWINGS

Figure 1:
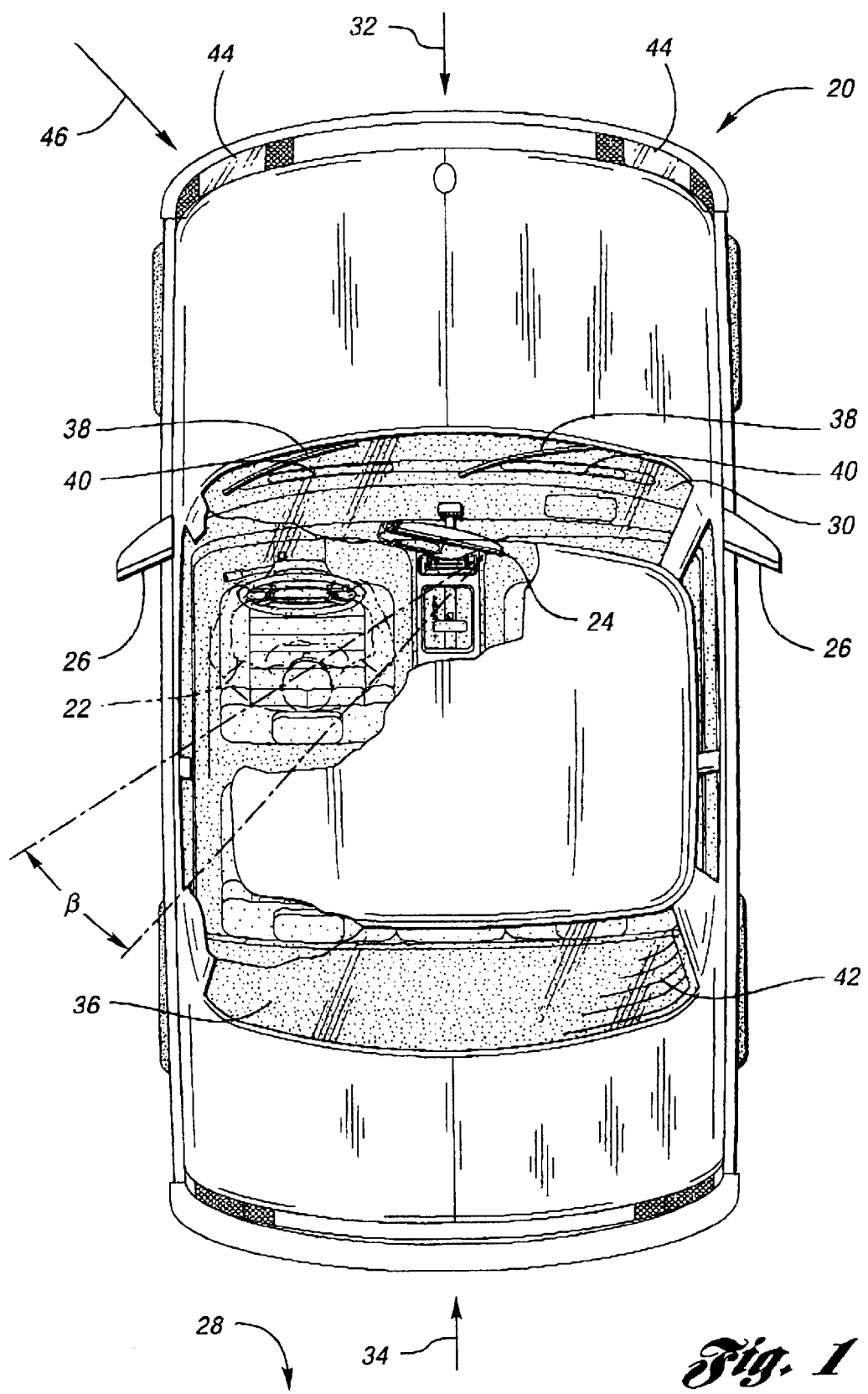
FIG. 1 a top plan view of an automotive vehicle that may incorporate automatically controlled equipment.

Referring now to FIG. 1, an automotive vehicle 20 is shown. Vehicle 20 is driven by operator 22. Operator 22 uses interior rearview mirror 24 and one or more exterior rearview mirrors 26 to view rearward scenes, shown generally by 28. Most of the time, operator 22 looks forward through windshield 30. The eyes of the operator 22 therefore adjust to forward ambient light 32 coming generally from the front of the vehicle. In low ambient light conditions, a relatively bright light source in rearward scene 28 may reflect from mirrors 24,26 and temporarily visually impair, distract, or dazzle operator 22. This relatively strong light is known as glare 34.

To reduce the impact of glare 34 on operator 22, the reflectance of mirrors 24,26 may be reduced. Manually adjustable interior mirrors contain a prismatic reflective element manually switched by operator 22 to change the amount of light that mirror reflects to operator 22. Automatically dimming interior and exterior mirrors 24, 26 include elements that automatically adjust the amount of light reflected to operator 22 responsive to the detected level of glare 34. Automatically dimming mirrors include a light sensor for glare 34 and, typically, a light sensor for forward ambient light 32.

Another environmental condition that can have an affect on operator 22 is moisture, which may condense on or impact vehicle windows, such as windshield 30 or rear window 36. Such moisture can impair the view of operator 22. This moisture may take the form of rain, snow, sleet, and the like on a window exterior surface, or may be fog, frost, ice, and the like on a window exterior or interior surface. Vehicle 20 typically includes several means for removing moisture, such as wipers 38 for windshield 30 and, possibly, rear window 36, defoggers 40 built into the dashboard of vehicle 20, and defrosters 42 built into rear window 36, or possibly windshield 30. Typically, this moisture removing equipment is manually controlled. In order to automatically control such moisture removing means, the presence of moisture on vehicle windows 30, 36 must be properly detected. Light sensors can be used to detect the moisture.

Other vehicle equipment requiring control are headlamps 44 that illuminate an area in front of vehicle 20 when ambient conditions do not provide sufficient light. Manual controls for the headlamps, parking lights, and bright lights, are well known. Headlamps 44 may also be automatically varied between off or daylight running light settings and night time light beams based on the level of ambient light detected by a light sensor (not shown in FIG. 1). Since most ambient light illuminating the forward view of operator 22 comes from above vehicle 20, skyward ambient light 46 from a direction generally in front of and above vehicle 20 may advantageously be monitored for automatically controlling headlamps 44.

Other vehicle equipment may also be controlled responsive to light sensors. Openings such as power door windows, sunroofs, moon roofs, convertible tops, and the like can be automatically closed when rain is detected. Passenger compartment heating and cooling may be improved by anticipating changes in thermal loading, such as when the sun disappears behind or appears from a cloud bank, or detecting which side of the vehicle is in the sun. Parking lamps, puddle lights, courtesy lights, and other auxiliary lighting may be controlled based on ambient light levels, the detected presence of exterior moisture, the running state of vehicle 20, and the like. Fog lights on the front and/or rear of the vehicle can be controlled based on the detection of fog. While particular applications, such as rearview mirror dimming, moisture removal, and headlamp control, are described in detail herein, it is understood that the present invention applies to a wide variety of automatic equipment control within automotive vehicles. Accordingly, as used herein, "vehicle equipment" refers to power windows, power doors, sunroofs, moon roofs, convertible tops, running lights, fog lights, parking lights, puddle lights, courtesy lights, and other vehicle lights, rearview mirrors, heating and cooling systems, windshield wipers, and headlamps, and any other controlled mechanism or components in a vehicle.

Regardless of the vehicle equipment controlled, automotive consumers will welcome such automated control of equipment provided the equipment meets certain criteria. First, the automatic equipment works in a reasonable and predictable manner throughout the wide range of operating conditions experienced by an automotive vehicle. Second, the equipment operates reliably throughout the life of the vehicle. Third, the equipment is reasonably priced. Forth, the automatic equipment frees the driver to concentrate on driving.

The light sensors, and also possibly the control logic, for the automatically controlled equipment can be advantageously implemented in interior rearview mirror 24. The review mirror provides an excellent location for light sensors as it is located high in the vehicle passenger compartment at a location with a good field of view through the side windows, the front windshield 30, and the rear window 36. The interior rearview mirror 24 includes a forward ambient light sensor 58 (FIG. 2), skyward ambient light sensors 150, 150', 158, 158', glare sensor 62 (FIG. 3), light emitter 104, a first reflected light sensor 110, and a second reflected light senor 110a. Interior rearview mirror 24 includes housing 850 into which these light sensors are assembled. Forward ambient light sensor 58 is held within housing 850 so as to view forward ambient light 32. One or more skyward ambient light sensors 150, 150', 158, 158' are held within housing 850 so as to view skyward ambient light 46. Although four skyward ambient light sensors are illustrated, a single sky sensor 150 or two light sensors 150, 158 can be used to monitor the forward sky ambient light 46.

Housing 850 may be formed so as to restrict light collected by skyward ambient light sensors 150, 150', 158, 158'. In particular, skyward ambient light sensors 150, 150', 158, 158' may be recessed into housing 850 to limit the amount of forward ambient light 32 received by light sensors 150, 150', 158, 158'. Similarly, forward ambient light sensor 58 may be recessed in housing 850 to limit the amount of skyward light 46 impacting this sensor. Housing 850 is attached to a mirror mounting assembly, shown generally by 852. Mounting assembly 852 includes mounting foot 854 for attaching rearview mirror 24 to windshield 30. The mounting foot may be attached to windshield 30 using a clear adhesive. Moisture sensor 120 may be incorporated into mounting foot 854. In addition or alternatively, one or more of forward ambient light sensor 58, skyward ambient light sensor 150, and skyward ambient light sensor 158 may be incorporated into mounting foot 854. By locating sensors 150, 158 in mounting foot 854, sensors 150', 158' can be omitted.

Figure 3:
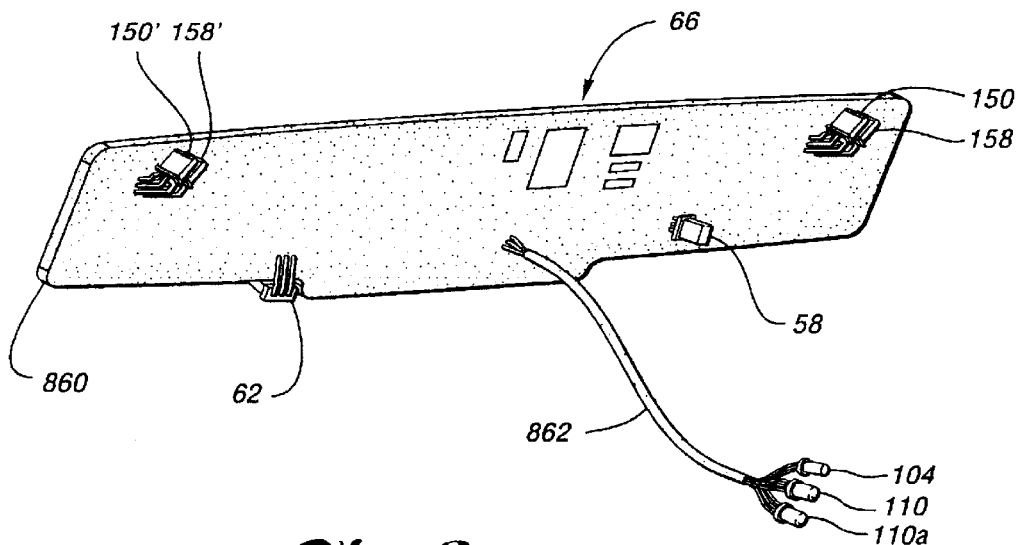
FIG. 3 is a top, rear perspective view of a rearview mirror circuit board for the rearview mi according to FIG. 2.

Referring now to FIG. 3, the rearview mirror circuit board assembly is shown. It is envisioned that either a single sided or two sided, conventional circuit board may be employed. Rearview mirror housing 850 encloses circuit board 860, carrying forward ambient light sensor 58, glare sensor 62, and skyward ambient light sensors 150, 150', 158, 158' on surface 861 of the board 860. Glare sensor 62 may be bent around circuit board 860 or may be connected to circuit board 860 by flexible wires to permit glare sensor 62 to view glare 34 from generally behind vehicle 20. Alternatively, if a two sided circuit board is used, the glare sensor 62 may be mounted to the front of the circuit board. Moisture sensor 120 may include emitter 104 and one or more light sensors 110, 110a connected to circuit board 860 by cabling 862. Circuit board 860 may include control logic 66 receiving sensor signals and generating equipment control signals responsive thereto. Cable 863 supplies power and ground to circuit board 860 as well as carrying equipment control signals from circuit board 860 to the remainder of the vehicle electrical system. The cable 863 may be mounted to the circuit board via a conventional multi-pin connector 865.

Figure 4:
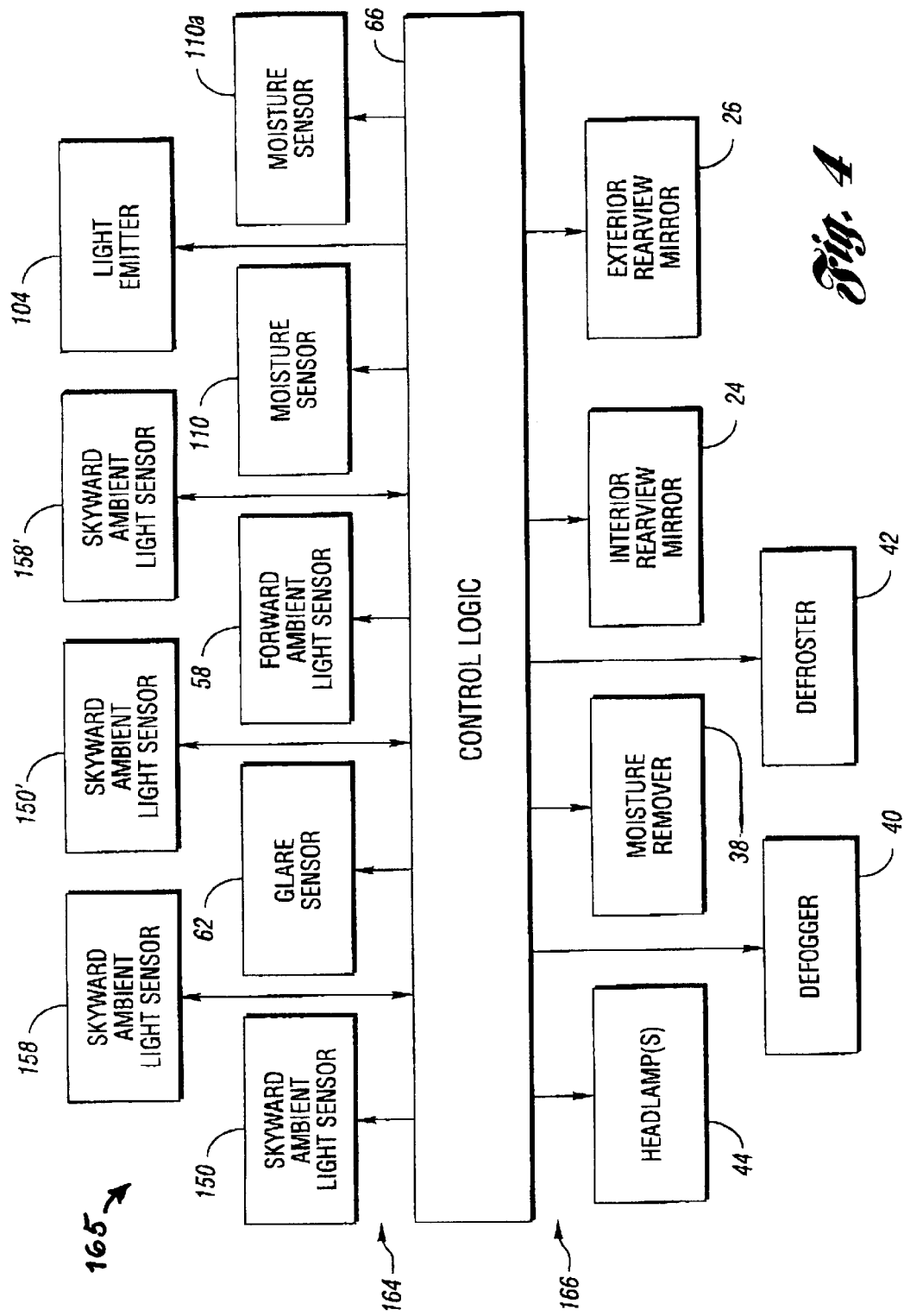
FIG. 4 is a block diagram illustrating a generalized automatic vehicle equipment control system.

An automatic vehicle equipment control circuit 165 is illustrated in block diagram form in FIG. 4, a portion of which is mounted in interior rearview mirror 24. The control circuit 165 includes an ambient light sensor 150, an optional ambient light sensor 158, an optional ambient light sensor 150', and optional ambient light sensor 158', a glare sensor 62, a forward ambient light sensor 58, a moisture sensor 110, an optional moisture sensor 110a, and an emitter 104 connected to control logic 66 through busses 164. It will be recognized that fewer sensors could be provided. Additional sensors, such as other light sensors, speed sensors and temperature sensors that are not illustrated, may also be connected to the control logic 66. Busses 164 connect each of the light sensors and the emitter to control logic 66. Control logic 66 may be responsive to light signals on busses 164 to generate equipment control signals on busses 166 so as to control various automotive vehicle equipment such as headlamps 44, wipers 38, a defogger 40, a defroster 42, and rearview mirrors 24, 26 automatically. Less or additional equipment could be controlled by the control logic 66. Light level signals on busses 164 and control signals on busses 166 may be analog, discrete, digital, or the like, to fit the particular need of the sensors and equipment. Although shown as a single box that can be located in the mirror housing 850, it will be recognized that the control logic 66 may be distributed throughout vehicle 20. It will be recognized that significant cost and manufacturing advantages can be achieved by implementing the control logic using a minimum number of components. Equipment control signal as used herein refers to a signal that is used in controlling equipment, which control signal can be used directly by the equipment or input to further circuitry which controls the equipment.

Somewhat more particularly, one or more of the light sensors 58, 62, 110, 110a, 150, 150', 158, 158' are implemented using a light sensor that incorporates a silicon-based light transducer and conditioning electronics, which is advantageously implemented on a single substrate. The light transducer generates charge at a rate proportional to the amount of incident light. This light-induced charge is collected over an integration period. The resulting potential on bus 164 is proportional to, and thus indicative of, the level of light to which the sensor is exposed over the integration period. Such a light sensor with integral charge collection has many advantages. For example, the ability to incorporate additional electronics on the same substrate as the transducer increases noise immunity and permits the sensor output to be formatted for use by a digital circuit. Component integration additionally reduces the system cost. Silicon devices are more temperature invariant than CdS cells and can be packaged to provide protection from humidity, shock, and vibration. Additionally, silicon-based light sensors have a faster response time than CdS cells, speeding up the response time of the automatic equipment. One disadvantage of silicon-based light transducers is that they have a frequency response substantially different than that of the human eye. Types of charge accumulating light transducers include photodiodes and photogate transistors. A variety of charge integrating photodiode devices are known, including those in U.S. Pat. No. 4,916,307 to Nishibe et al.; U.S. Pat. No. 5,214,274 to Yang; U.S. Pat. No. 5,243,215 to Enomoto et al.; U.S. Pat. No. 5,338,691 to Enomoto et al.; and U.S. Pat. No. 5,789,737 to Street. Photogate transistor devices are described in U.S. Pat. No. 5,386,128 to Fossum et al. and U.S. Pat. No. 5,471,515 to Fossum et al.

The control logic 66 includes a controller that can advantageously be implemented using a microprocessor, microcontroller, digital signal processor, programmable logic unit, or the like. A PIC 16C620A microcontroller commercially available from Microchip may be used. The control logic receives light signals from sensors 58, 62, 110, 110a, 150, 150', 158, 158' responsive to which it determines a light level. The microcontroller need not include an analog-to-digital converter (ADC) connected to receive the output from the sensors 58, 62, 110, 110a, 150, 150', 158, 158' if these sensors produces discrete, digital outputs. The microcontroller may optionally include electronically alterable memory in which calibrated thresholds associated with each of the sensors are stored during manufacture of the mirror 24 for later use in controlling equipment 24, 26, 38, 40, 42 and 44 in a predetermined manner. The microcontroller in control logic 66 preferably generates control signals on lines 164 that select the sensitivity of the sensors 58, 62, 110, 110a, 150, 150', 158, 158' to effect a wide dynamic range for the light sensors. The microcontroller also generates control signals applied to the automatically controlled equipment 24, 26, 38, 40, 42, and 44 responsive at least in part to the signals from the sensors.

Figure 5:
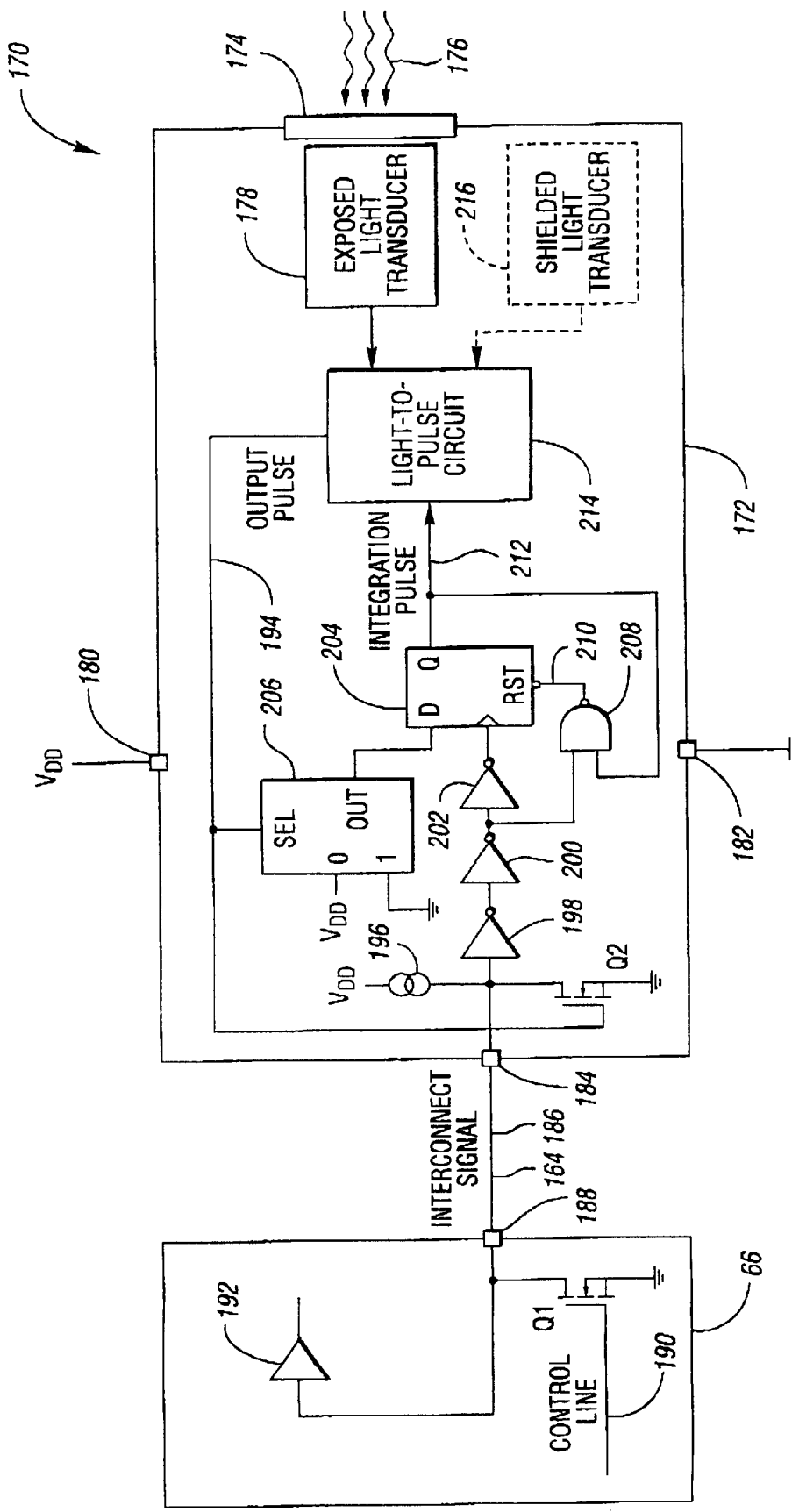
FIG. 5 is schematic diagram of circuitry permitting control logic and a light sensor to be interconnected by a single line carrying both sensitivity control and sensor output.

Referring now to FIG. 5, the control logic 66 and sensors 58, 62, 110, 110a, 150, 150', 158, 158' will be described in greater detail. Light sensor 170 refers generally to a light sensor that can be used to implement any of the sensors 58, 62, 110, 110a, 150, 150', 158, 158'. The control logic 66 and light sensor 170 are interconnected by a single line 164 that carries interconnect signals 186, which can advantageously include both light sensor sensitivity control signals and resultant light sensor output signals. The microcontroller used to implement control logic 66 includes a transistor element Q1 and a buffer 192 connected to an output pin 188, or other input/output (I/O) pin structure, which is connected to signal line 164. The transistor element Q1 may be implemented using a suitable transistor such as a field effect transistor (FET), connected between signal pin 188 and ground. Transistor Q1 is controlled by control line 190 connected to the base of transistor Q1. Buffer 192 is also connected to signal pin 188 to isolate the signal line 164 from signal levels present in the microcontroller.

Light sensor 170 includes enclosure 172 with window 174 admitting light 176 incident on exposed light transducer 178. Enclosure 172 admits power pin 180, ground pin 182, and signal pin 184. "Window" as used herein refers to a path by which light travels through the sensor package to reach the transducer surface, and thus could be an opening in an opaque semiconductor package, a transparent or translucent encapsulant, or the like. The use of only three pins 180, 182, 184 greatly reduces the cost of light sensor 170 and associated control logic 66.

Light sensor 170 is connected to control logic 66 through bus 164, which carries interconnection signal 186 between signal pin 184 in light sensor 170 and signal pin 188 in control logic 66. As will be described below, signal pins 184, 188 are tri-state ports permitting interconnect signal 186 to provide both an input to light sensor 170 and an output from light sensor 170.

Within light sensor 170, transistor Q2, which can be implemented using a suitable transistor such as a FET element, is connected between signal pin 184 and ground. Transistor Q2 is controlled by output pulse 194 connected to the gate of Q2. Constant current source 196 is connected to signal pin 184 so that if neither transistor Q1 nor transistor Q2 are ON (high logic level), interconnect signal 186 is pulled to a high logic level. Constant current source 196 nominally sources about 0.5 mA to pull up interconnect signal 186. The input of Schmidt trigger inverter 198 is connected to signal pin 184. Inverters 200 and 202, which are connected in series, follow Schmidt trigger inverter 198. The output of inverter 202 clocks D flip-flop 204. The output of multiplexer 206 is connected to the D input of flip-flop 204. The select input of multiplexer 206 is driven by output pulse 194 such that when output pulse 194 is asserted, the D input of flip-flop 204 is unasserted, and when output pulse 194 is not asserted the D input of flip-flop 204 is asserted. The output of NAND gate 208 is connected to low asserting reset 210 of flip-flop 204. The output of flip-flop 204 is integration pulse 212. Integration pulse 212 and the output of inverter 200 are inputs to NAND gate 208. Light-to-pulse circuit 214 accepts integration pulse 212 and the output of exposed light transducer 178 and produces output pulse 194.

Light sensor 170 may advantageously include a shielded light transducer 216, which does not receive light 176. Shielded light transducer 216 has substantially the same construction as exposed light transducer 178, being of the same size and material as transducer 178. Light-to-pulse circuit 214 uses the output of shielded light transducer 216 to reduce the affects of noise in exposed light transducer 178.

Figure 6:
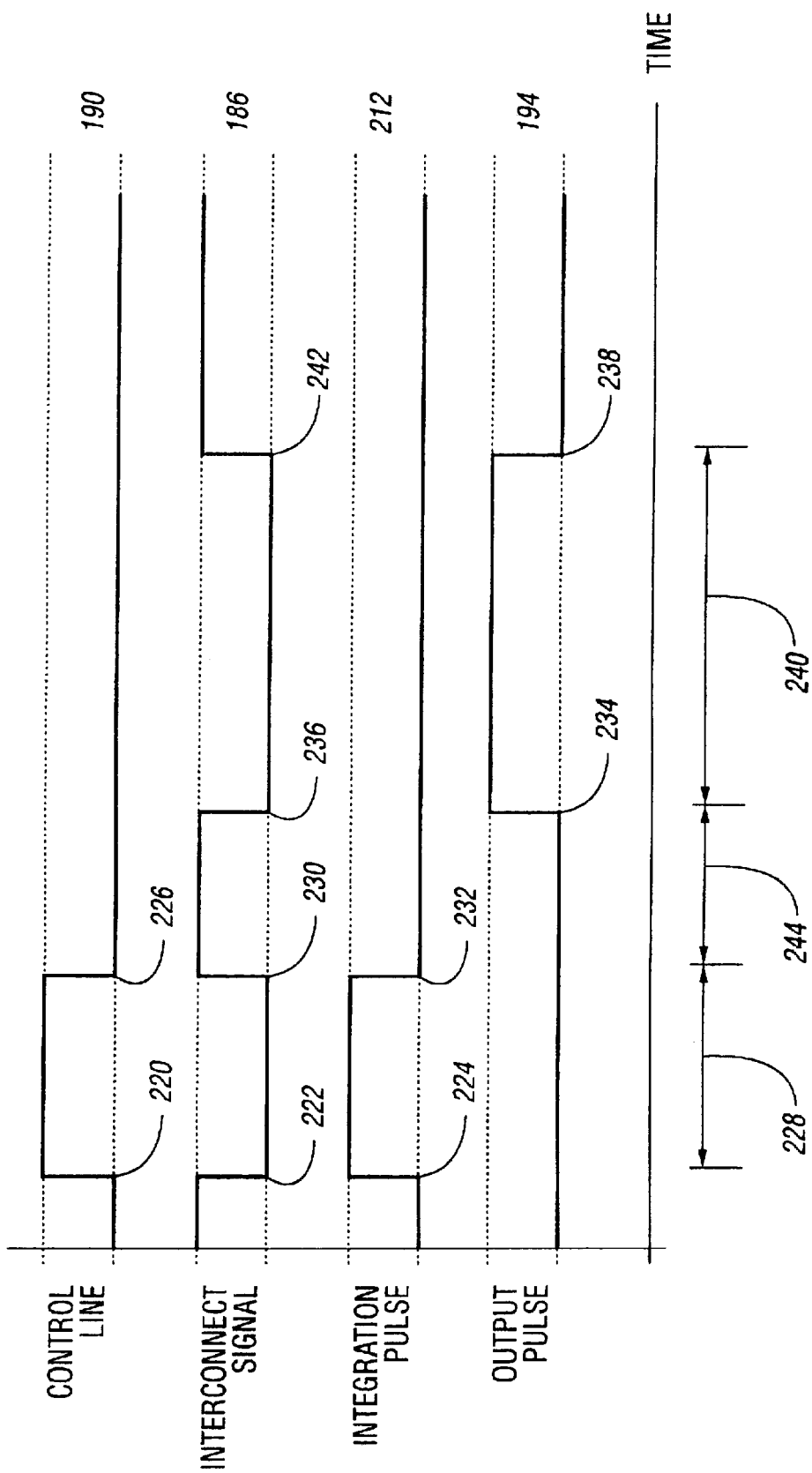
FIG. 6 is a timing diagram illustrating operation of the circuitry of FIG. 5.

Referring now to FIG. 6, a timing diagram illustrating operation of the circuitry of FIG. 5 is shown. Initially, low asserting interconnect signal 186 is high. The state of flip-flop 204 must be zero for, if the state is one, both inputs to NAND gate 208 would be high, asserting reset 210 and forcing the state of flip-flop 204 to zero.

At time 220, control logic 66 asserts control line 190 turning transistor Q1 ON. Interconnect signal 186 is then pulled low at time 222. The output of inverter 202 transitions from low to high setting the state of flip-flop 204 to one (i.e., a high logic level) which causes integration pulse 212 to become asserted at time 224. Light-to-pulse circuit 214 begins integrating light 176 incident on exposed light transducer 178. At time 226, control line 190 is brought low turning transistor Q1 off. The difference between time 226 and time 220 is integration period 228 requested by control logic 66. Since both transistors Q1 and Q2 are off, interconnect signal 186 is pulled high by current source 196 at time 230. Since the output of inverter 200 and integration pulse 212 are both high, reset 210 is asserted causing the state of flip-flop 204 to change to zero and integration pulse 212 to become unasserted at time 232. This signals light-to-pulse circuit 214 to stop integrating light 176 incident on exposed light transducer 178.

At time 234, light-to-pulse circuit 214 asserts output pulse 194 to begin outputting light intensity information. Asserting output pulse 194 turns transistor Q2 on, pulling interconnect signal 186 low at time 236. This causes inverter 202 to output a low-to-high transition clocking a zero as the state of flip-flop 204. Light-to-pulse circuit 214 deasserts output pulse 194 at time 238. The difference between time 238 and time 234 is light intensity period 240 indicating the amount of light 176 incident on exposed light transducer 178 over integration period 228. Transistor Q2 is turned off when output pulse 194 goes low at time 238. Since both transistors Q1 and Q2 are off, interconnect signal 186 is pulled high at time 242. Buffer 192 in control logic 66 detects the transitions in interconnect signal 186 at times 236 and 242. The difference in time between times 242 and 236 is used by control logic 66 to determine the intensity of light 176 received by light sensor 170.

If shielded light transducer 216 is included in light sensor 170, the difference in time between the deassertion of integration pulse 212 at time 232 and the assertion of output pulse 194 at time 234 is due, in part, to the thermal noise in light sensor 170. This difference is expressed as thermal noise period 244. Thermal noise period 244 may be used by control logic 66 to determine the temperature of light sensor 170 or may be more simply used to determine when the noise level in sensor 170 is too high for a reliable reading. Control logic 66 may disable automatic control of vehicle equipment if the temperature of light sensor 170 exceeds a preset limit.

Figure 7:
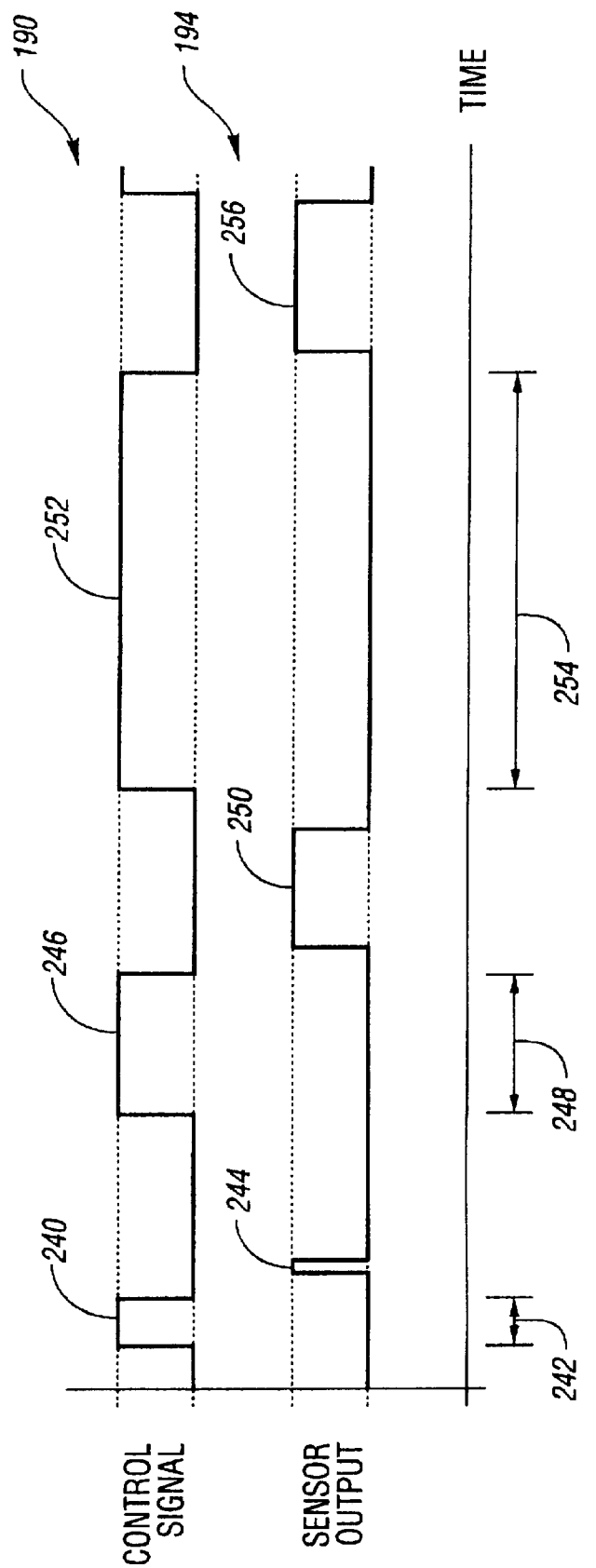
FIG. 7 is a timing diagram illustrating integration duration control and sensor output for a light sensor.

FIG. 7 illustrates a timing diagram of integration duration control and sensor output for a light sensor. Charge accumulating light sensor 170 exhibits increased sensitivity and increased dynamic range through variable integration periods. The total amount of light-induced charge, which can be effectively measured, is limited. Therefore, in the presence of bright light, a short integration time is desirable to prevent saturation. However, if a short integration time is used in low light conditions, the charge signal may be lost in noise inherent in sensor 170 (i.e., the signal-to-noise ratio will be so low that the signal level will be undetectable).

Control line 190 includes a sequence of integration periods having varying lengths. In the example shown, short integration pulse 240 having short integration period 242 is generated. A semiconductor light sensor may output a short pulse in a completely dark environment due to noise. Therefore, any sensor output pulse 194, such as short signal pulse 244, having a duration less than a threshold is ignored by control logic 66. Next, medium integration pulse 246 having medium integration period 248 is generated. Resulting medium signal pulse 250 has a duration indicative of the amount of light incident on sensor 170 during medium integration period 248. Long integration pulse 252 having long integration period 254 is generated. If light sensor 170 is sufficiently bright, saturation will result. Therefore, long signal pulse 256 having a duration greater than a threshold is also ignored by control logic 66. The signal represented by control line 190 may be generated outside of light sensor 170, such as by control logic 66, or may be generated by sensor logic within light sensor 170. By varying the integration period, the sensitivity is adjusted. Varying the sensitivity by providing successive integration periods of different duration allows the appropriate sensitivity to be detected, and responsive thereto, selected. A significant advantage of the sensor having bi-directional interconnect signal 186 is that the control logic 66 can control the sensitivity of the sensor 170 to dynamically compensate for different light conditions by varying the integration periods for the sensor.

Figure 8:
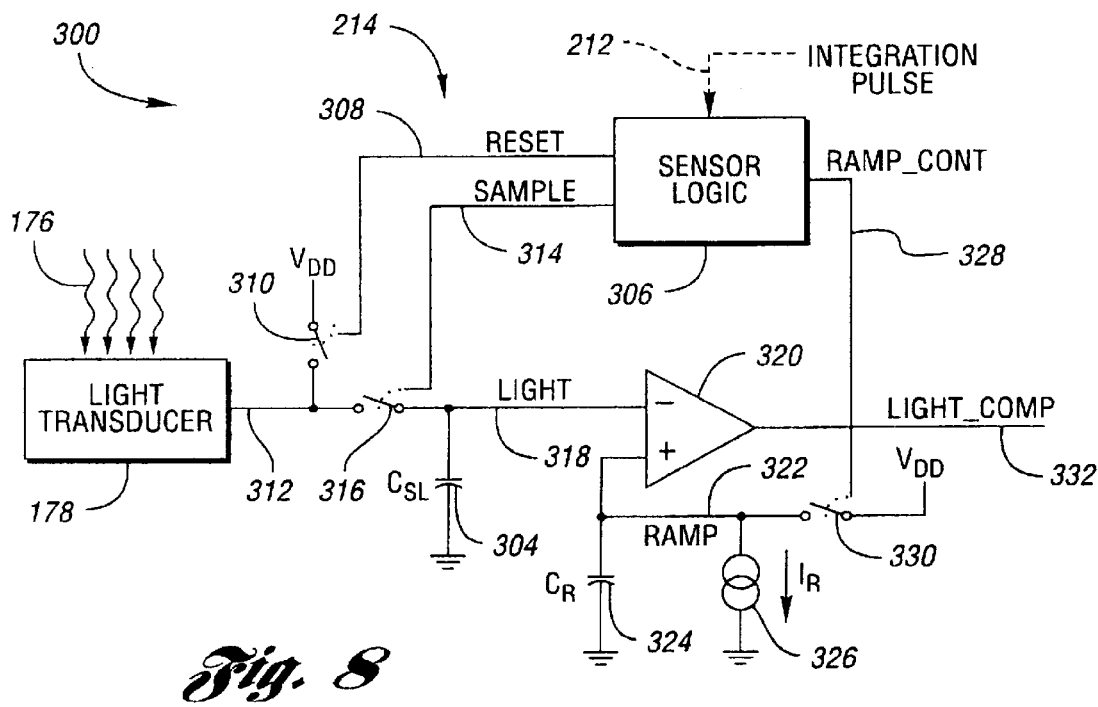
FIG. 8 is a schematic diagram illustrating operation of a light sensor having a pulse output.

Referring now to FIG. 8, a schematic diagram illustrating operation of a light sensor having a pulse output is shown. Light-to-pulse circuit 300 includes exposed light transducer 178 for converting light 176 incident on exposed light transducer 178 into charge accumulated in light storage capacitor 304, indicated by $C_{SL}$. Exposed light transducer 178 may be any device capable of converting light 176 into charge, such as the photogate sensor described in U.S. Pat. No. 5,471,515 titled "Active Pixel Sensor With Intra-Pixel Charge Transfer" to E. Fossum et al. Preferably, light transducer 178 is a photodiode such as is described below. Except as noted, the following discussion does not depend on a particular type or construction for exposed light transducer 178.

Light-to-pulse circuit 300 also includes light-to-pulse circuit 214 (FIG. 8) which is connected to transducer 178, receives an integration pulse 212, and outputs a light comparator signal which is proportional to the amount of light 176 impacting transducer 178 during integration period pulse 212. Light to pulse circuit 214 operates under the control of sensor logic 306. Sensor logic 306 generates reset signal 308 controlling switch 310 connected between exposed light transducer output 312 and $V_{DD}$. Sensor logic 306 also produces sample signal 314 controlling switch 316 between exposed light transducer output 312 and light storage capacitor 304. The voltage across light storage capacitor 304, light storage capacitor voltage 318, is fed into one input of comparator 320. The other input of comparator 320 is ramp voltage 322 across ramp capacitor 324. Ramp capacitor 324 is in parallel with current source 326 generating current $I_R$. Sensor logic 306 further produces ramp control signal 328 controlling switch 330 connected between ramp voltage 322 and $V_{DD}$. Comparator 320 produces comparator output 332 based on the relative levels of light storage capacitor voltage 318 and ramp voltage 322. Sensor logic 306 may generate reset signal 308, sample signal 314, and ramp control signal 330 based on internally generated timing or on externally generated integration pulse 212.

Figure 9:
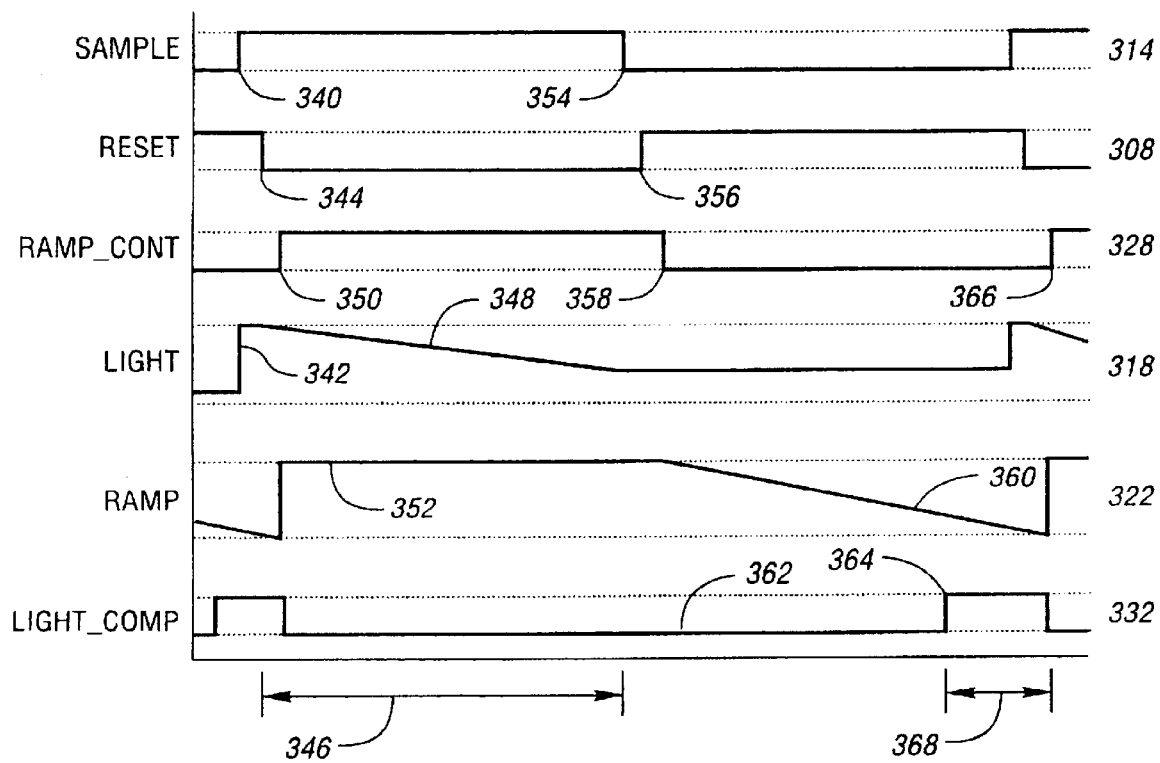
FIG. 9 is a timing diagram illustrating operation of the light sensor of FIG. 8.

Referring now to FIG. 9, a timing diagram illustrating operation of the light sensor of FIG. 8 is shown. A measurement cycle is started at time 340 when sample signal 314 is asserted while reset signal 308 is asserted. This closes switch 316 to charge light storage capacitor 304 to $V_{DD}$ as indicated by voltage level 342 in light storage capacitor voltage 318. Reset signal 308 is then deasserted at time 344, opening switch 310 and beginning integration period 346. During integration period 346, light 176 incident on exposed light transducer 178 generates negative charge causing declining voltage 348 in light storage capacitor voltage 318. At time 350, ramp control signal 328 is asserted closing switch 330 and charging ramp capacitor 324 so that ramp voltage 322 is $V_{DD}$ as indicated by voltage level 352.

Sample signal 314 is deasserted at time 354, causing switch 316 to open, thereby ending integration period 346. At some time 356 following time 354 and prior to the next measurement cycle, reset signal 308 must be asserted closing switch 310. At time 358, ramp control signal 328 is deasserted opening switch 330. This causes ramp capacitor 324 to discharge at a constant rate through current source 326 as indicated by declining voltage 360 in ramp voltage 322. Initially, as indicated by voltage level 362, comparator output 332 is unasserted because ramp voltage 322 is greater than light storage capacitor voltage 318. At time 364, declining voltage 360 in ramp voltage 322 drops below light storage capacitor voltage 318 causing comparator output 332 to become asserted. Comparator output 322 remains asserted until time 366 when ramp control signal 328 is asserted closing switch 330 and pulling ramp voltage 322 to $V_{DD}$. The difference between time 366 and time 364, indicated by pulse duration 368, is inversely related to the amount of light 176 received by exposed light transducer 178 during integration period 346. The integration period 346 can be set directly by the integration pulse 212, or a signal derived from integration pulse 212. It is envisioned that the integration period 346 will be proportional to the width of the integration pulse 212, which is proportional to the pulse width of the control line signal 190, in the circuit of FIG. 5.

Figure 10:
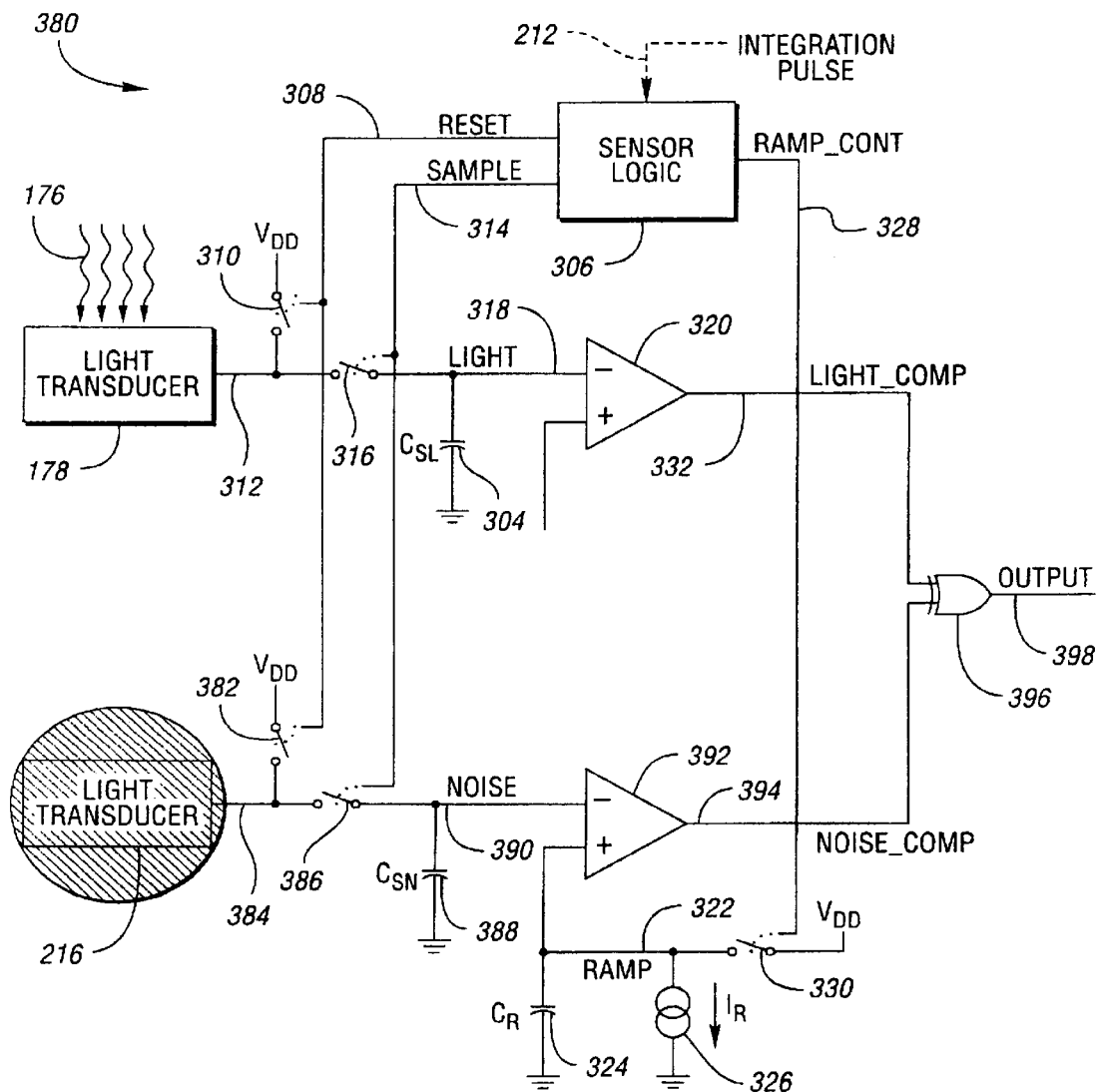
FIG. 10 is a schematic diagram illustrating operation of a light sensor with noise compensation.

Referring now to FIG. 10, a schematic diagram illustrating operation of a light sensor with noise compensation is shown. A light-to-pulse circuit, shown generally by 380, improves upon light-to-pulse circuit 300 by incorporating shielded light transducer 216 and associated electronics. Shielded light transducer 216 preferably has the same construction as exposed light transducer 178. However, shielded light transducer 216 does not receive light 176. Charge generated by shielded light transducer 216, therefore, is only a function of noise. This noise is predominately thermal in nature. By providing shielded light transducer 216 having the same construction as exposed light transducer 178, such that the exposed and shielded transducers have the same surface area and material composition, and may be deposited on the same die, the noise signal produced by shielded light transducer 216 will closely approximate the noise within the signal produced by exposed light transducer 178. By subtracting the signal produced by shielded light transducer 216 from the signal produced by exposed light transducer 178, the effect of noise in light transducer 178 can be greatly reduced.

Reset signal 308 controls switch 382 connected between shielded transducer output 384 and $V_{DD}$. Sample signal 314 controls switch 386 connected between shielded transducer output 384 and noise storage capacitor 388, indicated by $C_{SN}$. The noise storage capacitor voltage 390, which is the voltage across noise storage capacitor 388, is one input to comparator 392. The second input to comparator 392 is ramp voltage 322. The outputs of comparator 392, noise comparator output 394, and comparator output 332, serve as inputs to exclusive-OR gate 396. Exclusive-OR gate 396 generates exclusive-OR output 398 indicating the intensity of light 176.

Figure 11:
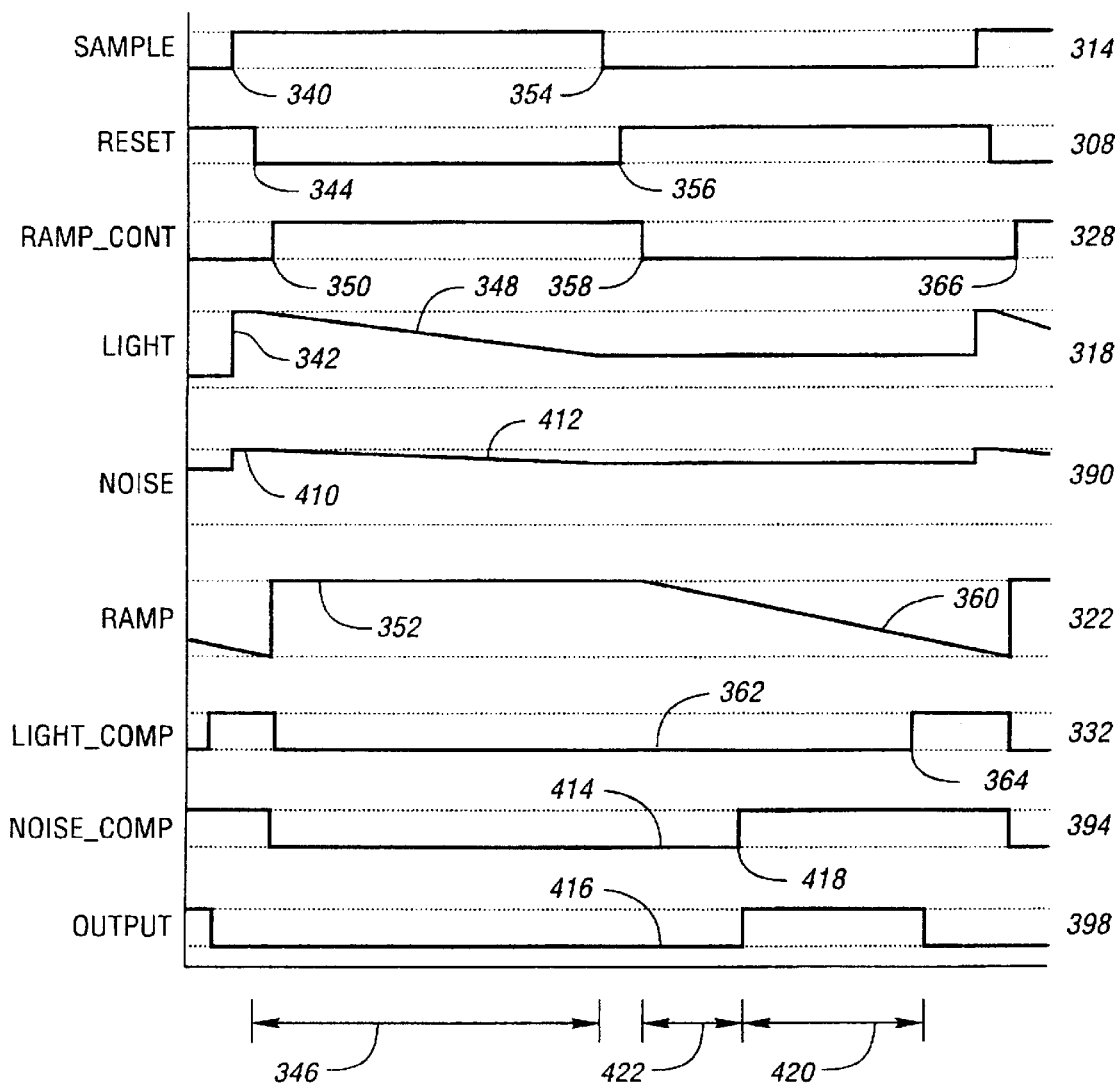
FIG. 11 is a timing diagram illustrating operation of the light sensor of FIG. 10.

Referring now to FIG. 11, a timing diagram illustrating operation of the light sensor of FIG. 10 is shown. Light-to-pulse circuit 380 functions in the same manner as light-to-pulse circuit 300 with regard to reset signal 308, sample signal 314, light storage capacitor voltage 318, ramp voltage 322, ramp control signal 328, and comparator output 332. At time 340, sample signal 314 is asserted while reset signal 308 is asserted. Switches 382 and 386 are both closed charging noise storage capacitor 388 to $V_{DD}$ as indicated by voltage level 410 in noise storage capacitor voltage 390. At time 344, reset signal 308 is deasserted opening switch 382 and causing declining voltage 412 in noise storage capacitor voltage 390 from charge produced by shielded light transducer 216 due to noise. At time 354, sample signal 314 is deasserted ending integration period 346 for noise collection. At time 358, ramp control signal 328 is deasserted causing declining voltage 360 in ramp voltage 322. Initially, as indicated by voltage level 414, noise comparator output 394 is unasserted because ramp voltage 322 is greater than noise storage capacitor voltage 390. Since comparator output 332 is also unasserted, output 398 from comparator 396 is unasserted as indicated by voltage level 416. At time 418, ramp voltage 322 drops below the level of noise storage capacitor voltage 390, causing noise comparator output 394 to become asserted. Since noise comparator output 394 and comparator output 332 are different, output 398 from comparator 396 is asserted. At time 364, ramp voltage 322 drops beneath the level of light storage capacitor voltage 318, causing comparator output 332 to become asserted. Since both noise comparator output 394 and comparator output 332 are now asserted, output 398 from exclusive-OR gate 396 now becomes unasserted. The difference between time 364 and time 418, output pulse duration 420, has a time period proportional to the intensity of light 176 incident on exposed light transducer 178 less noise produced by shielded light transducer 216 over integration period 346. The duration between time 418 and time 358, noise duration 422, is directly proportional to the amount of noise developed by shielded light transducer 216 over integration period 346. Since the majority of this noise is thermal noise, noise duration 422 is indicative of the temperature of shielded light transducer 216. At time 366, ramp control signal 328 is asserted, deasserting both noise comparator output 394 and comparator output 332.

Referring now to FIG. 12, a schematic diagram of an implementation of the light sensor of FIG. 10 using photodiodes as light transducers is shown. Light-to-pulse circuit 380 is implemented using exposed photodiode 430 for exposed light transducer 178 and shielded photodiode 432 for shielded light transducer 216. The anode of exposed photodiode 430 is connected to ground and the cathode connected through transistor Q20 to $V_{DD}$. The base of transistor Q20 is controlled by reset signal 308. Hence, transistor Q20 functions as switch 310. Transistors Q21 and Q22 are connected in series between $V_{DD}$ and ground to form a buffer, shown generally by 434. The base of transistor Q21 is connected to the collector of exposed photodiode 430. The base of load transistor Q22 is connected to fixed voltage $V_B$. The output of buffer 434 is connected through transistor Q23 to light storage capacitor 304. The base of transistor Q23 is driven by sample signal 314, permitting transistor Q23 to function as switch 316. The anode of shielded photodiode 432 is connected to ground and the cathode is connected to $V_{DD}$ through transistor Q24. The base of transistor Q24 is driven by reset signal 308 permitting transistor Q24 to function as switch 382. Transistors Q25 and Q26 form a buffer, shown generally by 436, isolating the output from shielded photodiode 432 in the same manner that buffer 434 isolates exposed photodiode 430. Transistor Q27 connects the output of buffer 436 to noise storage capacitor 388. The base of transistor Q27 is driven by sample signal 314 permitting transistor Q27 to function as switch 386. Typically, light storage capacitor 304 and noise storage capacitor 388 are 2 pF. Ramp capacitor 324, typically 10 pF, is charged to $V_{DD}$ through transistor Q28. The base of transistor Q28 is driven by ramp control signal 328 permitting transistor Q28 to function as switch 330. Ramp capacitor 324 is discharged through current source 326 at an approximately constant current $I_R$ of 0.01 $\mu$A when transistor Q28 is off.

Sensor power-up response is improved, and the effective dynamic range of the sensor is extended, by including circuitry to inhibit output if ramp voltage 322 drops beneath a preset voltage. Light-to-pulse circuit 380 includes comparator 438 comparing ramp voltage 322 with initialization voltage ($V_{INIT}$) 440. Comparator output 442 is ANDed with exclusive-OR output 396 by AND gate 444 to produce AND gate output 446. During operation, if ramp voltage 322 is less than initialization voltage 440, output 446 is deasserted (i.e., is held to a low logic level). The use of comparator 438 and AND gate 444 guarantee that output 446 is not asserted regardless of the state of light-to-pulse circuit 380 following power-up. In a preferred embodiment, the initialization voltage is 0.45 V.

Sensor logic 306 generates control signals 308, 314, 328 based on integration pulse 212 which may be generated internally or provided from an external source. Buffer 447 receives integration pulse 212 and produces sample control 314. An odd number of sequentially connected inverters, shown generally as inverter train 448, accepts sample control 314 and produces reset control 308. A second set of odd numbered sequentially connected inverters, shown generally as inverter train 449, accepts reset signal 308 and produces ramp control signal 328. The circuit shown in FIG. 12 has a resolution of at least 8 bits and a sensitivity of approximately 1 volt per lux-second. The maximum output pulse duration 420 is independent of integration period 346 provided by the duration of integration pulse 212.

It is envisioned that the light signal 318 across capacitor 304 in FIG. 12 and the noise signal 390 across capacitor 388 may be input to differential operational amplifier 321 (FIG. 12a). The output of differential amplifier 321 is an analog signal representative of the difference between the light signal 318 and the noise signal 390. This circuit can be used where the control logic 66 includes an analog-to-digital converter that can convert these digital signals to analog signals.

Figure 13:
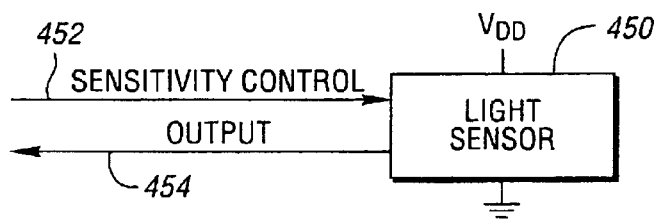
FIGS. 13–16 are block diagrams illustrating various embodiments for light sensor packaging, output, and control.
Figure 14:
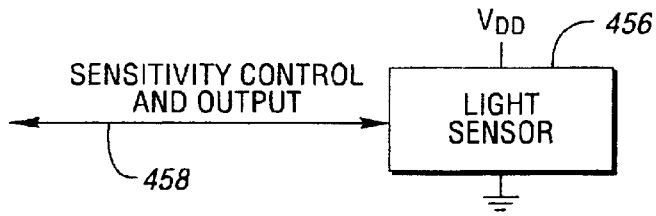
Figure 15:
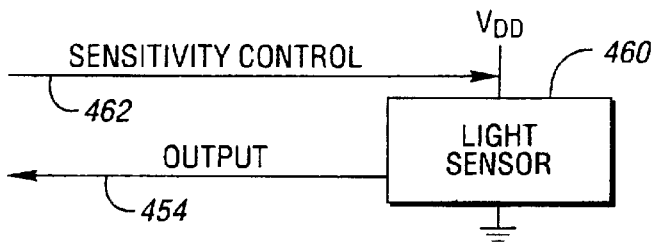
Figure 16:
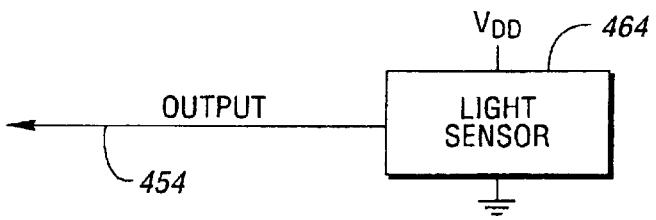

Referring now to FIGS. 13–16, various embodiments for light sensor packaging, output, and control are shown. Each embodiment may include light-to-pulse circuitry as described above. In FIG. 13, light sensor package 450 accepts four pins for supply voltage $V_{DD}$, ground, sensitivity control signal 452, and output signal 454. Sensitivity control signal 452 may be integration pulse 212 used by light-to-pulse circuit 380 to produce output 398, which is sent as output signal 454. In FIG. 14, light sensor package 456 requires only three pins for $V_{DD}$, ground, and combined sensitivity control and output signal 458. Combined signal 458 may be interconnect signal 186 as described above. In FIG. 15, light sensor package 460 admits three pins for output signal 454, ground, and combined $V_{DD}$ and sensitivity control signal 462. As is known in the art, combined signal 462 may be separated into power supply voltage $V_{DD}$ and sensitivity control signal 452 through the use of filters. For example, a low-pass and high-pass filter can be used to separate the signals. In FIG. 16, light sensor package 464 admits three pins for $V_{DD}$, ground, and output signal 454. Sensitivity control signal 452 is generated within light sensor package 464 as described below.

Figure 17:
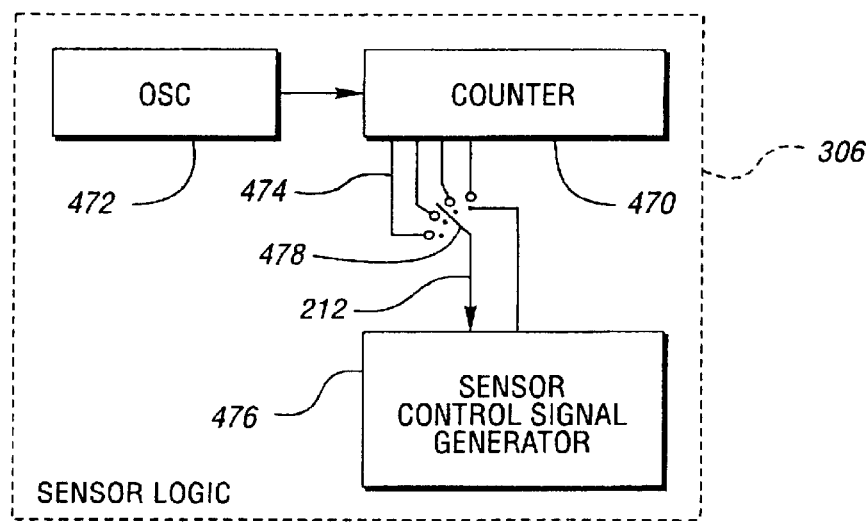
FIG. 17 is a block diagram illustrating sensor logic for internally determining the integration period signal.

Referring now to FIG. 17, a block diagram of sensor logic for determining the integration period signal within sensor 170 is shown. Sensor logic 306 may include free-running counter 470 driven by internal oscillator 472. Counter 470 may have taps, one of which is indicated by 474, connected to different counter bits. For example, one tap 474 may be connected to the $n^{th}$ bit, the next tap 474 to the $n^{th}+2$ bit, the next tap 474 connected to the $n^{th}+4$ bit, and so on, with each successive tap thereby providing a pulse with a period four times longer than the preceding tap 474. Sensor control signal generator 476 controls switch 478 to determine which tap 474 will be used to produce integration pulse 212. Typically, sensor control signal generator 476 sequences through each tap 474 repeatedly. Sensor control signal generator 476 then uses integration pulse 212 to generate control signals such as reset signal 308, sample signal 314, and ramp control signal 328 as described above. It will be recognized that where the sensor generates the integration pulse internally to vary the sensor sensitivity, although the control logic will be unable to alter the integration period, the control logic will receive short, intermediate and long output pulses from the sensor responsive to which measured light levels can be determined bright, intermediate and low light levels.

Figure 18:
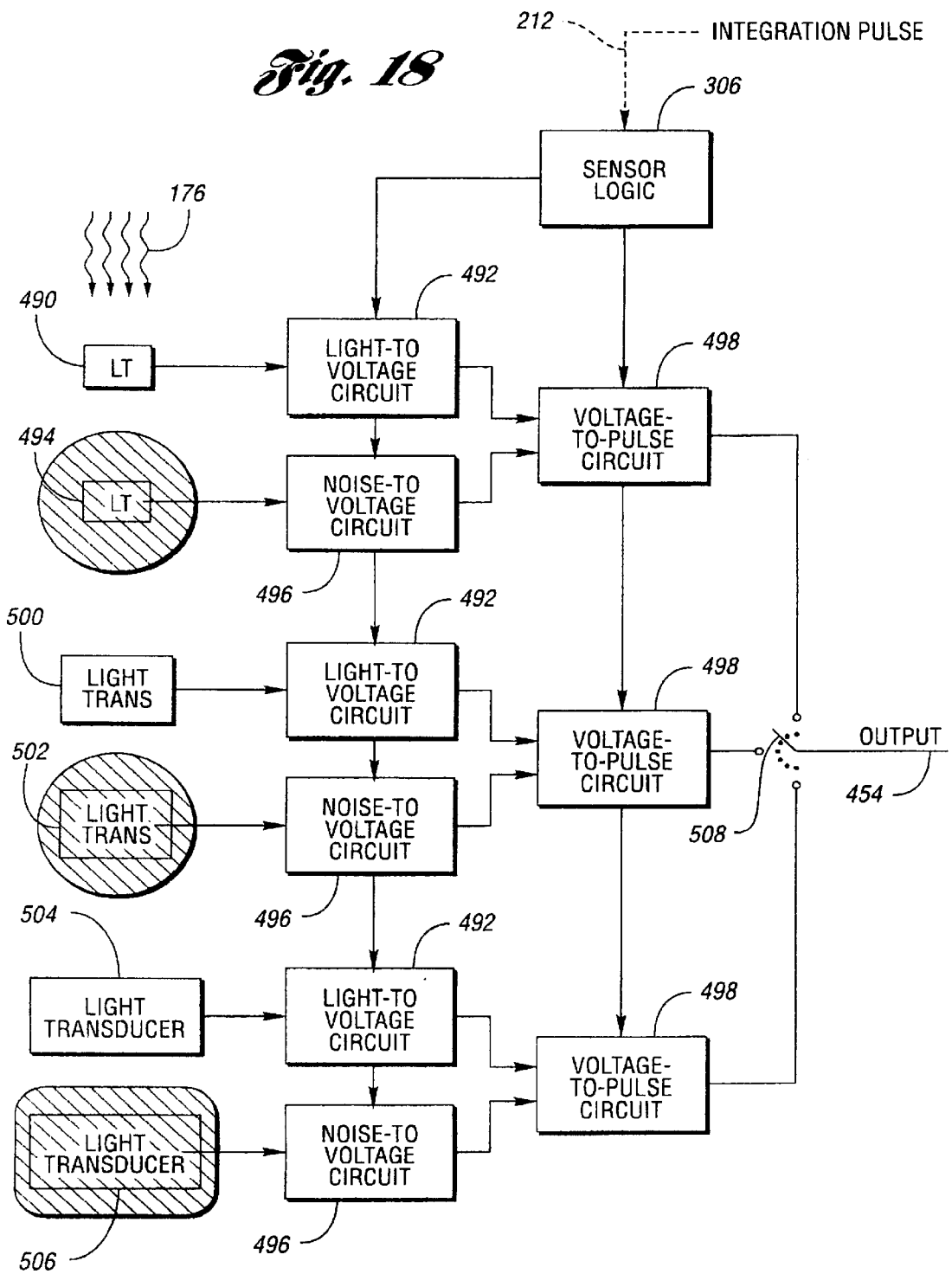
FIG. 18 is a block diagram illustrating the use of light transducers having different effective areas to achieve differing sensitivity.

Referring now to FIG. 18, an alternate embodiment of the light sensor is illustrated wherein light transducers having different effective areas are used to achieve variable sensitivity. As an alternative to varying the integration time, or together with varying the integration time, pairs of exposed light transducer 178 and shielded light transducer 216 having different effective areas may be used. If photodiodes 430, 432 are used as light transducers 178, 216, the effective area is the photodiode collector area. Small exposed light transducer 490 produces charge, which is converted to a voltage by light-to-voltage circuit 492. Light-to-voltage circuit 492 may be implemented using switches 310, 316, and light storage capacitor 304 as described above. Charge produced by small shielded light transducer 494 is converted to voltage by noise-to-voltage circuit 496. Noise-to-voltage circuit 496 may be implemented using switches 382, 386 and noise storage capacitor 388 as described above. The outputs of light-to-voltage circuit 492 and noise-to-voltage circuit 496 are converted to a pulse by voltage-to-pulse circuit 498, with a width based on charge accumulated over an integration period by small exposed light transducer 490 less charge due to noise integrated by small shielded light transducer 494. Voltage-to-pulse circuit 498 may be implemented using comparators 320, 392, capacitor 324, current source 326, and gate 396 as described above. Medium exposed light transducer 500 has an effective area larger than the effective area for small exposed light transducer 490, resulting in increased sensitivity. For example, if the effective area of medium exposed light transducer 500 is four times larger than the effective area of small exposed light transducer 490, medium exposed light transducer 500 will be four times more sensitive to light 176 than will be small exposed light transducer 490. Medium shielded light transducer 502 has an effective area the same as medium exposed light transducer 500. Additional light-to-voltage circuit 492, noise-to-voltage circuit 496, and voltage-to-pulse circuit 498 produce a noise-corrected output pulse with a width based on light 176 incident on medium exposed light transducer 500 over the integration period. Similarly, large exposed light transducer 504 and large shielded light transducer 506 provide still increased sensitivity over medium exposed light transducer 500 and medium shielded light transducer 502 by having still greater effective area.

Switch 508 under the control of sensor logic 306 sets which output from voltage-to-pulse circuits 498 will be used for output signal 454. Output signal 454 may be selected based on a signal generated within sensor logic 306 or may be based on a signal provided from outside of sensor logic 306. In particular, a control signal may be provided by control logic 66 that controls switch 908 to select one of the small, medium and large light transducers for connection to output 454.

In an alternative embodiment, only one shielded light transducer 216 is used. The output of shielded light transducer 216 is scaled prior to each noise-to-voltage circuit 496 in proportion to the varying effective areas of exposed light transducers 178. It will be recognized by one of ordinary skill in the art that, though the examples shown in FIG. 22 have three pairs of exposed light transducers 178 and shielded light transducers 216, any number of pairs may be used.

Figure 19:
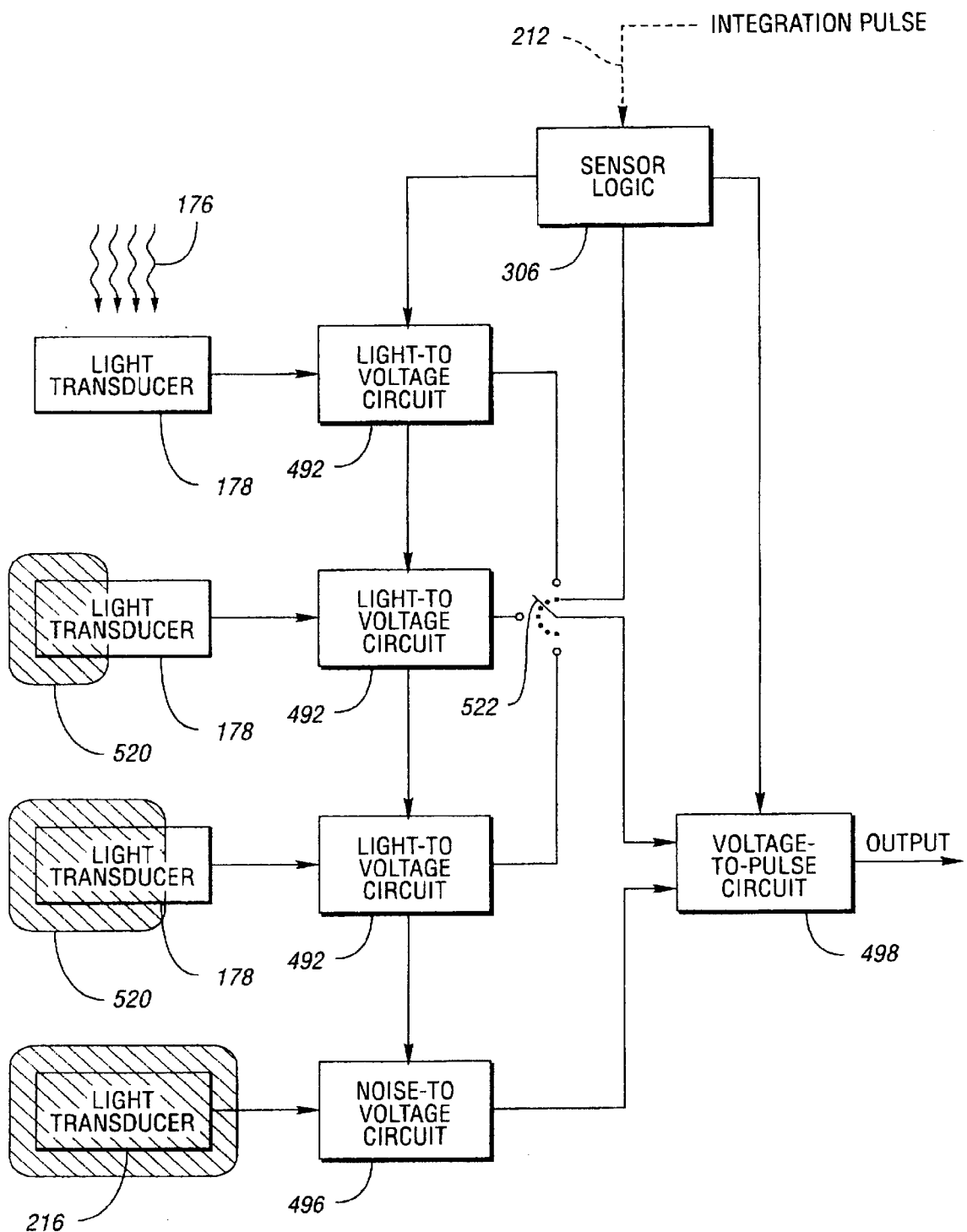
FIG. 19 is a block diagram illustrating the use of light transducers having different apertures to achieve increased dynamic range.

Referring now to FIG. 19, a block diagram illustrating the use of light transducers having different apertures to achieve increased dynamic range is shown. As an alternative to or together with specifying the integration period, exposed light transducers 178 having the same effective area may each have a different aperture admitting area for admitting light 176. Varying apertures may be produced using partial shield 520 blocking light 176 from reaching a portion of exposed light transducer 178. Each exposed light transducer 178 produces charge converted to a voltage by a corresponding light-to-voltage circuit 492. Switch 522 under the control of sensor logic 306 selects which light-to-voltage circuit's 492 output is connected to voltage-to-pulse circuit 498. Voltage-to-pulse circuit 498 produces output signal 454 compensated for noise sensed by shielded light transducer 216 and processed by noise-to-voltage circuit 496. Sensor logic 306 may select output of light-to-voltage circuits 492 based on an internally generated control signal or on a control signal received from control logic 66.

In light sensor 170 with multiple transducers 178, 490, 500, 504, light sensor 170 detects incident light within a target spatial distribution. Each transducer 178, 490, 500, 504 views the same target spatial distribution. Hence, control logic 66 generates at least one equipment control signal 166 based on light signal 164 without mapping light signal 164 to an area within the target spatial distribution.

Figure 20:
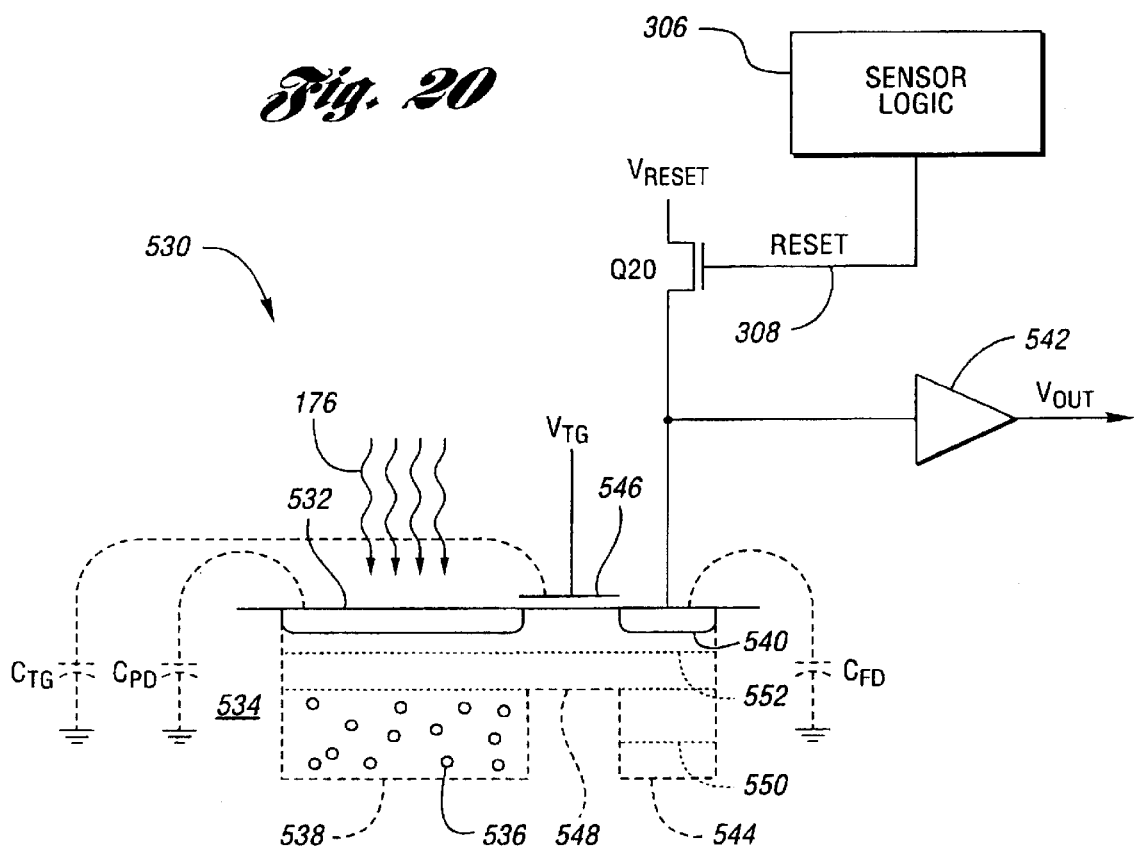
FIG. 20 is a schematic diagram illustrating different transducer capacitances for different amounts of light-induced charge to achieve variable sensitivity.

Referring now to FIG. 20, a transducer that can be used to achieve variable sensitivity is shown. A photodiode, shown generally by 530, is formed by n-type diffusion 532 in p-type substrate 534. Light 176 incident on photodiode 530 generates charge 536 which may be accumulated in photodiode well 538 beneath n-type diffusion 532. Photodiode 530 has intrinsic photodiode capacitance $C_{PD}$. Floating diffusion 540 is also formed by diffusing n-type material in substrate 534. Floating diffusion 540 is connected through transistor Q20 to reset voltage $V_{RESET}$. The gate of transistor Q20 is connected to reset signal 308 under the control of sensor logic 306. Floating diffusion 540 is also connected to the input of buffer 542. The output of buffer 542 is transducer output $V_{OUT}$. Floating diffusion 540 defines diffusion well 544 formed in a region of substrate 534 when reset signal 308 is asserted. Floating diffusion 540 has an intrinsic floating diffusion capacitance $C_{FD}$. Transmission gate 546 is positioned between diffusion 532 and floating diffusion 540. Transmission gate 546 is held at voltage $V_{TG}$ to form transmission well 548 thereunder. Transmission well 548 has a depth shallower than photodiode well 538 and diffusion well 544. Transmission gate 546 has an intrinsic transmission gate capacitance $C_{TG}$.

When reset signal 308 is asserted, bringing floating diffusion 540 to $V_{RESET}$, charge is eliminated in diffusion well 544. Further, when charge is reset in diffusion well 544, any charge 536 in photodiode well 538 above the depth of transmission well 548 flows through transmission well 548, through floating diffusion 540, and is eliminated. During a light integration period, reset signal 308 is unasserted, causing the voltage of floating diffusion 540 to float based on the amount of charge 536 in diffusion well 544. As light 176 strikes diffusion 532, charge 536 is created. Since charge 536 in photodiode well 538 up to the level of transmission well 548 was not eliminated by charge reset, additional charge 536 produced by incident light 176 flows from photodiode well 538 through transmission well 548 and into diffusion well 544. At charge level 550, beneath the level of transmission well 548, only diffusion well 544 is filling with charge 536. Hence, the voltage of floating diffusion 540 is inversely proportional to floating gate capacitance $C_{FD}$. When enough charge 536 has been generated to fill diffusion well 544 above the level of transmission well 548 such as, for example level 552, diffusion well 544, transmission well 548, and photodiode well 538 all fill with charge 536. Hence, the voltage of floating diffusion 540 is now inversely proportional to the sum of floating diffusion capacitance $C_{FD}$, transmission gate capacitance $C_{TG}$, and photodiode capacitance $C_{PD}$. The result is light sensor 170 with a sensitivity determined from the magnitude of the resulting light signal.

Figure 21:
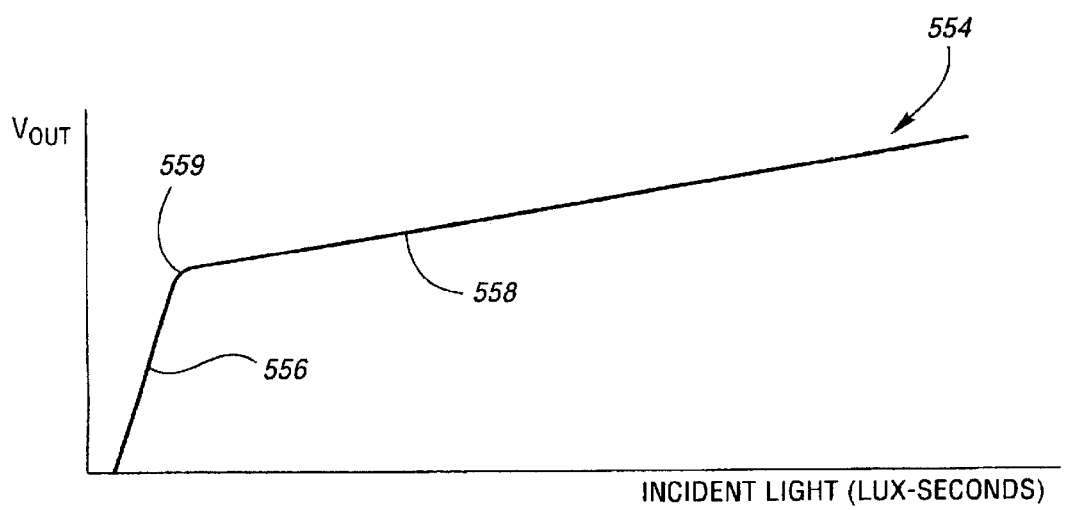
FIG. 21 is a graph of the output potential as a function of accumulated incident light for the transducer of FIG. 20.

Referring now to FIG. 21, a graph of output potential as a function of accumulated incident light for the transducer of FIG. 20 is shown. A curve, shown generally by 554, shows transducer output $V_{OUT}$ as a function of light 176 incident on diffusion 532 and, possibly, floating diffusion 540 over the integration period. During steep portion 556, charge 536 is accumulating in diffusion well 544 alone. Since the conversion gain is based only on floating diffusion capacitance $C_{FD}$, photodiode 530 appears to have a high sensitivity to incident light 176. During shallow portion 558, charge 536 is accumulated in diffusion well 544, transmission well 548, and photodiode well 538. Since the conversion gain is now dependent on the parallel combination of capacitances $C_{FD}$, $C_{TG}$, and $C_{PD}$, photodiode 530 now appears less sensitive to incident light 176. By adjusting voltages $V_{RESET}$ and $V_{TG}$, knee point 559 between steep portion 556 and shallow portion 558 can be shifted affecting the dynamic range. For example, if the maximum voltage swing for floating diffusion 540 is 1 volt; the ratio of $C_{FD}$ to the sum of $C_{FD}$, $C_{TG}$, and $C_{PD}$ is 1:100; and knee point 559 is set at 0.5 volts, the dynamic range of photodiode 530 is increased about 50 times over the dynamic range of a similar photodiode without dual capacitance.

Figure 22:
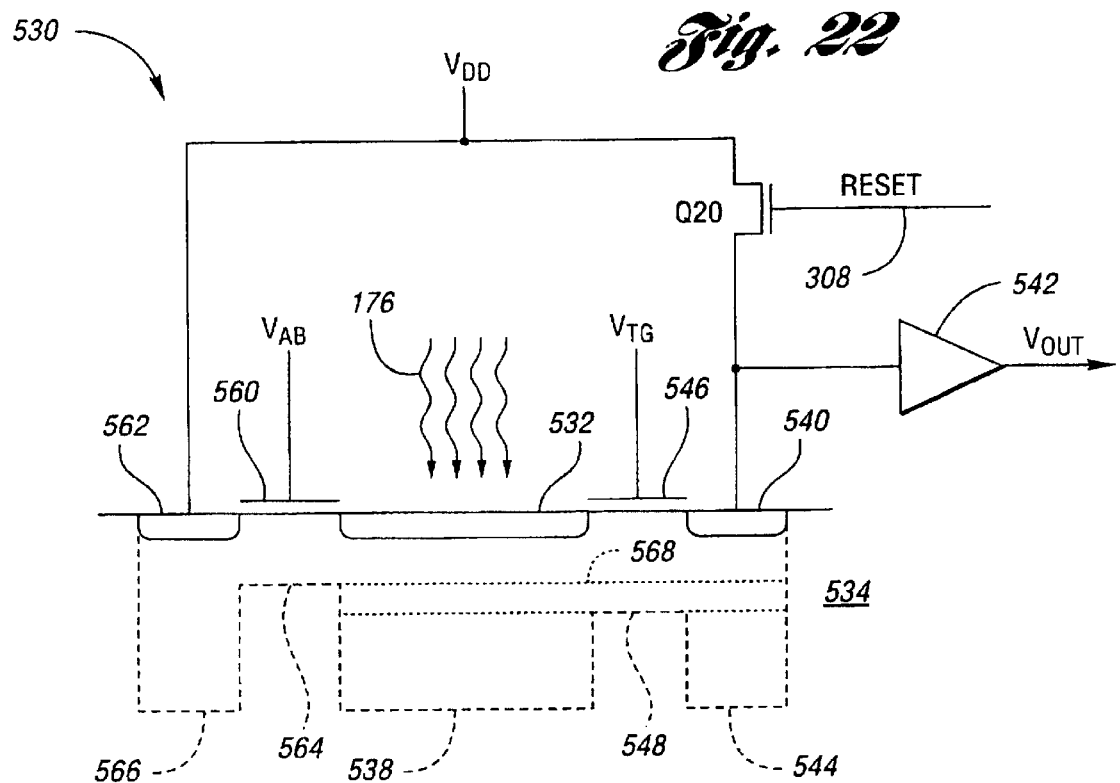
FIG. 22 is a schematic diagram illustrating a photodiode transducer incorporating an anti-bloom gate.

Referring now to FIG. 22, a schematic diagram illustrating a photodiode transducer incorporating an anti-bloom gate is shown. Anti-bloom gate 560 is formed between diffusion 532 and source voltage diffusion 562 tied to $V_{DD}$. Anti-bloom gate 560 is tied to anti-bloom voltage $V_{AB}$. Anti-bloom gate 560 forms anti-bloom well 564 in substrate 534 between photodiode well 538 and source diffusion well 566. Anti-bloom voltage $V_{AB}$ is less than transmission gate voltage $V_{TG}$ well 564, making anti-bloom well 564 shallower than transmission well 548. When accumulated charge generated by photodiode 530 exceeds charge level 568 equal to the depth of anti-bloom well 564, the excess charge flows beneath anti-bloom gate 560 into source voltage diffusion 562 and is eliminated. Anti-bloom gate 560 prevents output voltage $V_{OUT}$ from dropping below a level detectable by comparator 320 in light-to-pulse circuit 380.

Figure 23:
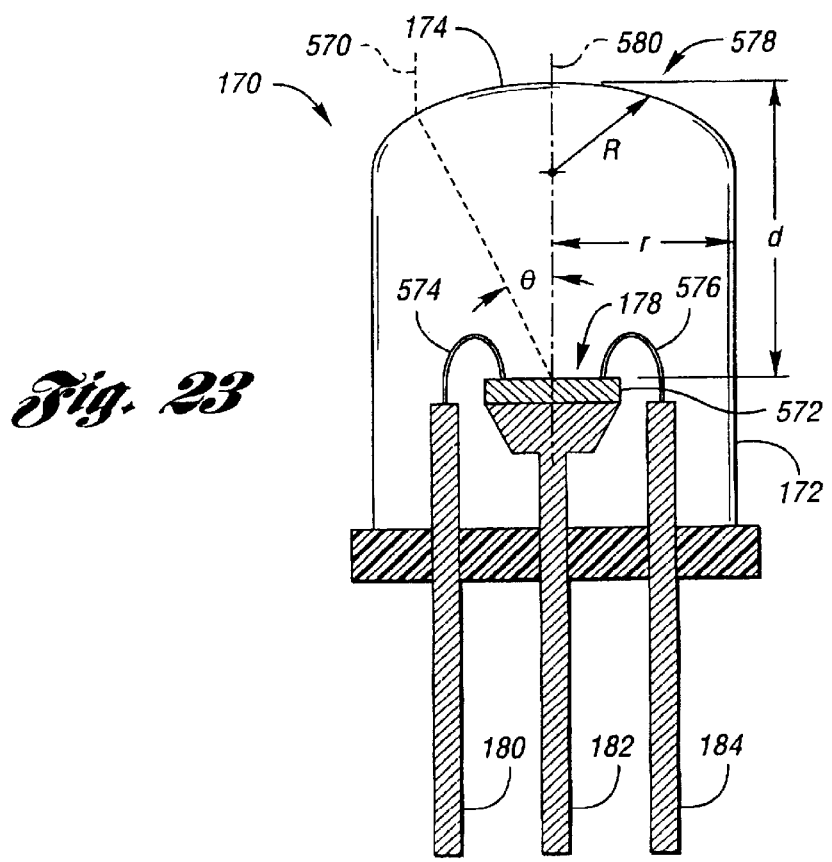
FIG. 23 illustrates an enclosure for a light sensor.

Referring now to FIG. 23, a drawing illustrating enclosure for a light sensor is shown. Light sensor 170 includes enclosure 172 having window 174 for admitting light, one ray of which is indicated by 570. Enclosure 172 admits power pin 180, ground pin 182, and signal pin 184. Semiconductor die 572, encapsulated within enclosure 172, incorporates light transducers 178, 216 and associated electronics as described above. Pins 180, 182, 184 may be wire bonded to die 527, as shown by wire 574 for power pin 180 and wire 576 for signal pin 184, or may be directly bonded to die 527, as shown for ground pin 182.

Enclosure 172 may be the same type used to construct three-terminal light emitting diodes (LEDs). A preferred format is commonly referred to as the T-1¾ or 5 mm package. Encapsulating electronics in such packages is well known in the art of optical electronics manufacturing.

A lens, shown generally by 578, is preferably used to focus light onto exposed light transducer 178. Lens 578 may be provided by a separate discrete lens positioned between light sensor 170 and the source of light rays 570, or the lens may be integral with the encapsulant 172 as shown in FIG. 27. In either case, lens 578 defines the field of view of light sensor 170 and provides improved sensitivity through optical gain. The lens can define the sensor field to have a narrow or wide angle.

Figure 24:
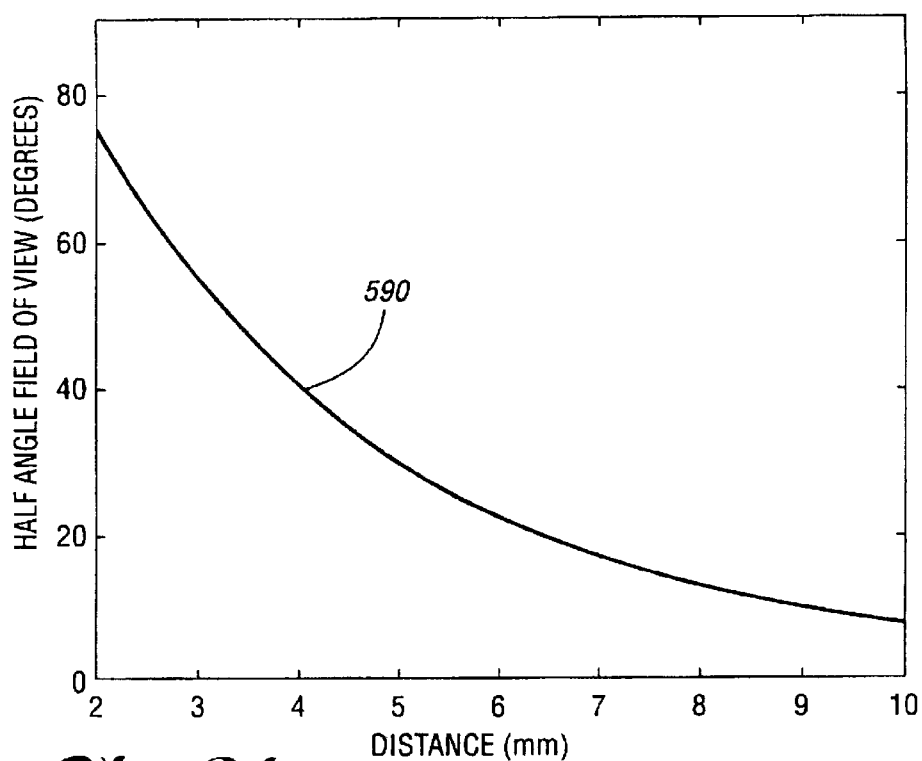
FIG. 24 illustrates a light sensor field of view as a function of light transducer distance from the lens.

Referring now to FIG. 24, a graph illustrating the light sensor field of view as a function of light transducer distance from the lens is shown. The field of view for exposed light transducer 178 in light sensor 170 is defined as view angle θ made by marginal ray 570 with respect to optical axis 580 through exposed light transducer 178. The half-angle field of view for spherical lens 578 is expressed by Equation 1:

$$\theta=90-\arccos\{r/R\}+n_2/n_1*\sin\{\arccos\{r/R\}-\arctan\{(d-(R^2-r^2)^{1/2}))/r\}\}$$

where r is the lens aperture radius, R is the radius of curvature of lens 578, $n_2$ is the index of refraction of material within enclosure 172, $n_1$ is the index of refraction outside of enclosure 172, d is the distance from the center of lens 578 to exposed light transducer 178, and θ is measured in degrees. Typically, T-1¾ enclosure 172 is filled with epoxy and sensor 170 operates in air making the ratio of $n_2$ to $n_1$ approximately 1.5. Curve 590 plots half angle field of view θ as a function of distance d for a T-1¾ enclosure having a spherical lens 578 with radius R of 5.0 mm. As light transducer 178 moves farther from lens 578, the field of view decreases.

Figure 25:
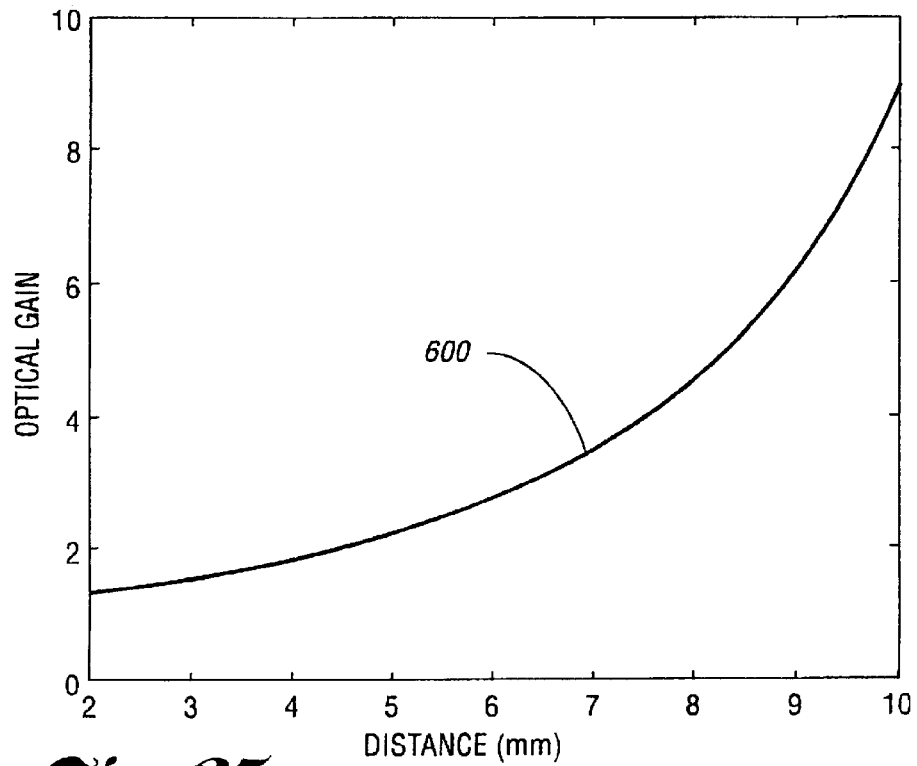
FIG. 25 is a graph illustrating light sensor optical gain as a function of light transducer distance from the lens.

Referring now to FIG. 25, a graph illustrating light sensor optical gain as a function of light transducer distance from the lens is shown. Assuming paraxial approximation for rays 570, the optical gain of lens 578 can be estimated by considering the ratio of additional optical energy collected by light transducer 178 with lens 578 to the optical energy collected by light transducer 178 without lens 578. This can be computed by considering a cone of light with a base at the surface of lens 578 and a point at the focal point f of lens 578. The optical gain G may then be expressed as a function of the ratio of the cross section of the cone to the area of light transducer 178 which reduces to Equation 2:

$$G=f^2/(f-d)^2$$

Curve 600 shows optical gain G as a function of distance d for a T-1¾ enclosure having a spherical lens 578 with radius R of 5.0 mm and a focal length f of 15.0 mm. As light transducer 178 moves farther from lens 578, the optical gain increases.

For use in automatically dimming rearview mirrors, the distance d between lens 578 and light transducer 178 can be adjusted for optimal performance of forward ambient light sensor 58 and glare sensor 62. Forward ambient light sensor 58 should have a wide field of view but need not be as sensitive as glare sensor 62. Glare sensor 62 should have a narrower field of view but must be more sensitive and, therefore, benefits from a higher optical gain. For the lens described above, a distance d of between 2 mm and 3 mm is suitable for forward ambient light sensor 58 and a distance d of between 6 mm and 7 mm is suitable for glare sensor 62. In addition to modifying lens parameters, other lens types such as aspheric, cylindrical, and the like are possible within the spirit and scope of the present invention.

Figure 30A:
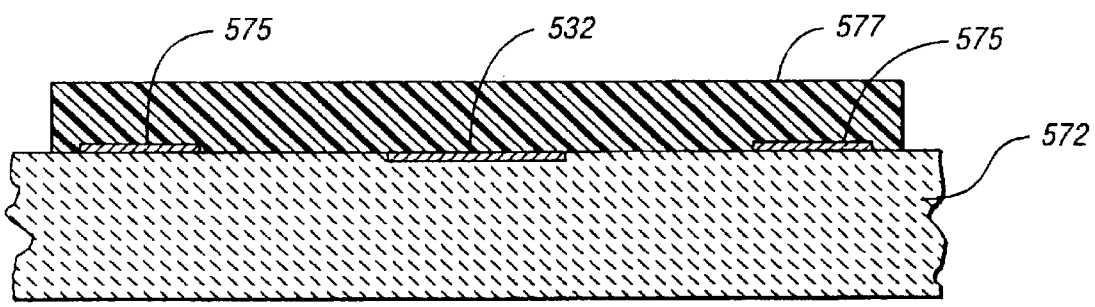
FIGS. 30a–30d illustrate a side view of the light sensor die at four stages during the direct depositing of a film on a sensor transducer.

Referring now to FIG. 26, an alternate light sensor 170' having an alternate encapsulant shape is illustrated. Light sensor 170' has enclosure 172 with curved surface 174 formed as an asymmetrical cylindrical lens, shown generally by 604. Lens 604 may have any desired radius and length, and may for example have a radius r (FIG. 30a) of 1.25 mm and a length of 5 mm. When mounted in the vehicle with the longitudinal axis of the cylindrical lens 604 generally normal with the horizon, horizontal compression without corresponding vertical compression is achieved. This permits observance of a wide region of the sky without sensing a correspondingly wide region of the ground, the vehicle roof, or the vehicle hood, when the sensor is used for the sky sensor. Conversely, when mounted horizontally, a wide horizontal view input is achieved. This characteristic can be advantageously used to implement the glare sensor, as described in greater detail herein below. Additionally, as used herein, light sensor 170 will generally refer to any light sensor shape, such as the spherical light sensor encapsulant of FIG. 23, and the cylindrical light sensor encapsulant of FIG. 26 unless indicated otherwise.

Referring now to FIG. 27, a graph illustrating frequency response of the human eye is shown. Curve 610 represents the relative photopic or daylight frequency response of the human eye. Curve 612 represents the relative scotopic or night frequency response of the human eye. In addition to being more sensitive to light intensity, scotopic response 612 is shifted more towards violet than photopic response 610.

Figure 28:
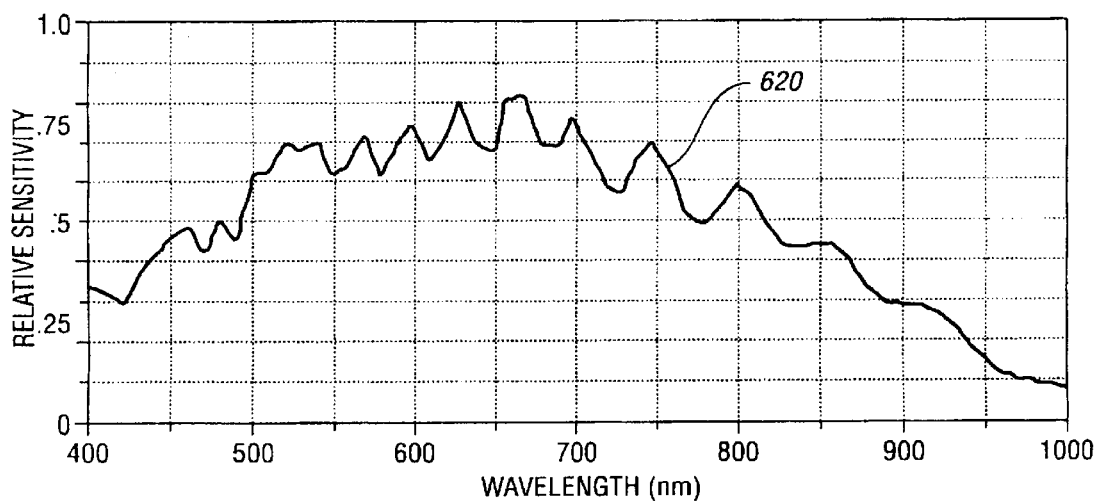
FIG. 28 is a graph illustrating frequency response of a typical light transducer.

Referring now to FIG. 28, a graph illustrating frequency response of a typical light transducer is shown. The relative frequency response of a typical photodiode light transducer 178 is shown as curve 620. When compared to photopic response curve 610 or scotopic response curve 612, the frequency response of exposed light transducer 178 contains significantly more infrared sensitivity. Depending upon the application, a filter may be placed before or incorporated into sensor 170 so that the output of exposed light transducer 178 more closely resembles a desired frequency response. The type of filtration required for light sensor 170 will depend on the application in which the sensor is used.

Figure 29:
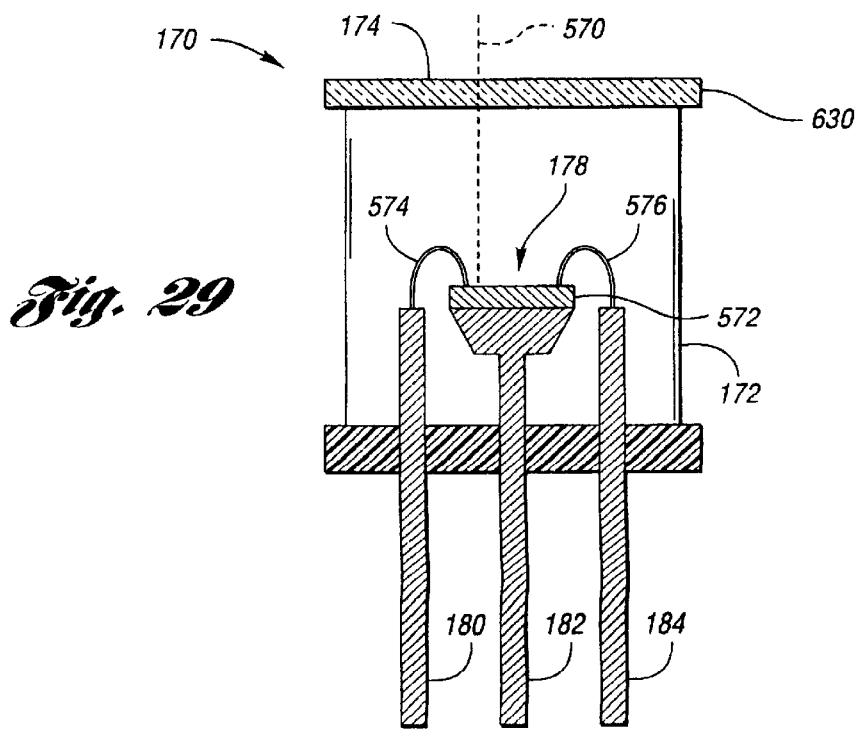
FIG. 29 is a drawing of an enclosure incorporating an infrared filter.

Referring now to FIG. 29, a light sensor package wherein the enclosure incorporates a filter is shown. Window 174 in enclosure 172 includes filter 630 operative to attenuate some components of light rays 570 striking exposed light transducer 178. For example, filter 630may be an infrared filter such as a hot mirror commercially available from Optical Coating Laboratories, Inc. of Santa Rosa, Calif. A lens (not shown) may be placed in front of infrared filter 630 to control the image focused on the transducer. Other examples of filters are described in U.S. Pat. No. 4,799,768 to Gahan and U.S. Pat. No. 5,036,437 to Macks.

It is envisioned that the filter 630 could be provided for the sensor 170 using other constructions. For example, a separate filter (not shown) can be mounted in a common housing with the sensor 170 at a position in front of the light sensor 170. For example, thin glass bandpass filters such as the BG28 or BG18 filters commercially available from Schott Glass Technologies, Inc. of Duryea, Pa., could be employed. These filters reduce the infrared sensitivity of light sensor 170. In yet other embodiment, the spectral characteristics of light sensor 170may be modified by material embedded into enclosure 172, or a thin applique attached to the surface of the sensor encapsulant using an adhesive, or by directly depositing a filter onto semiconductor die 572.

Figure 30B:
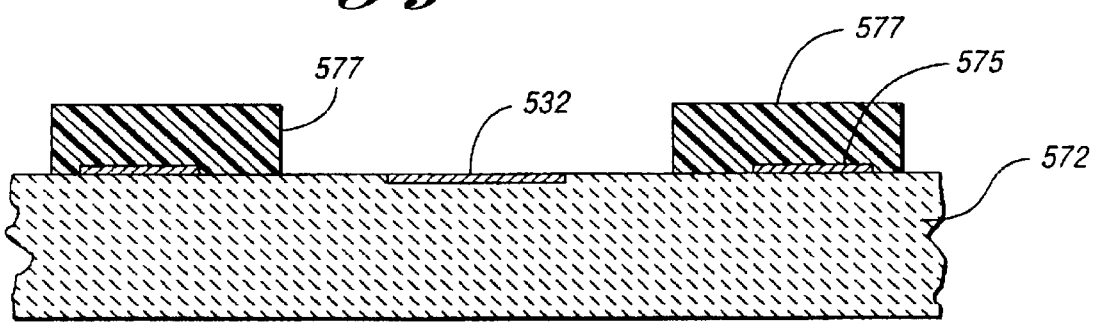
Figure 30C:
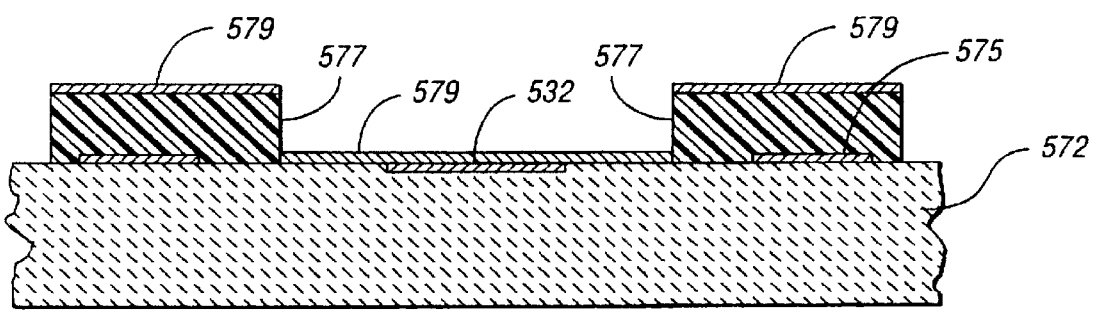
Figure 30D:
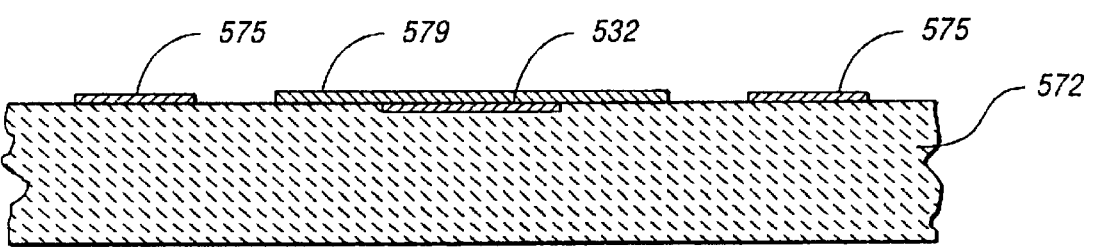

A method by which an interference filter can be directly deposited onto a semiconductor light sensor 170 will now be described with respect to FIGS. 30*a* through 30*d*. In the first step, a photoresist is deposited over the over the entire wafer. The photoresist may be any suitable commercially available photoresist material. The photoresist is then patterned to cover only those areas on the surface of the wafer requiring protection from the optical coating deposition such as the bonding pad, as shown in FIG. 30*b*. The optical film coating 579 is then applied to the surface of the die 572 as shown in FIG. 30*c*. The thin film 579 is deposited directly on the light sensor in multiple layers. The first layer of the interference filter can be a silicon layer 50 to 80 nm thick, and preferably 65 nm thick. The second layer if the interference filter is a layer of silicon dioxide, 100 to 200 nm thick, and preferably 145 nm thick. The third layer of the interference filter is a silicon layer 50 to 80 nm thick, and preferably 60 nm thick. The third layer of the interference filter is a layer of silicon dioxide 100 to 200 nm thick, and preferably 140 nm thick. The fifth layer of the interference filter is a thick layer of silicon dioxide to provide protection, and may be 200 to 500 nm thick. After all five layers are deposited, the photoresist is lifted off using a conventional lift off process, leaving the film deposited over the light sensitive region, but not over the bonding pads, as shown in FIG. 30*d*. The resulting die can be encapsulated to provide conventional packaging, such as the T 1¾ package of FIG. 23. The interference filter described above will filter light above 650 nm. Other materials could be applied in a similar manner to provide other filter characteristics.

Figure 31:
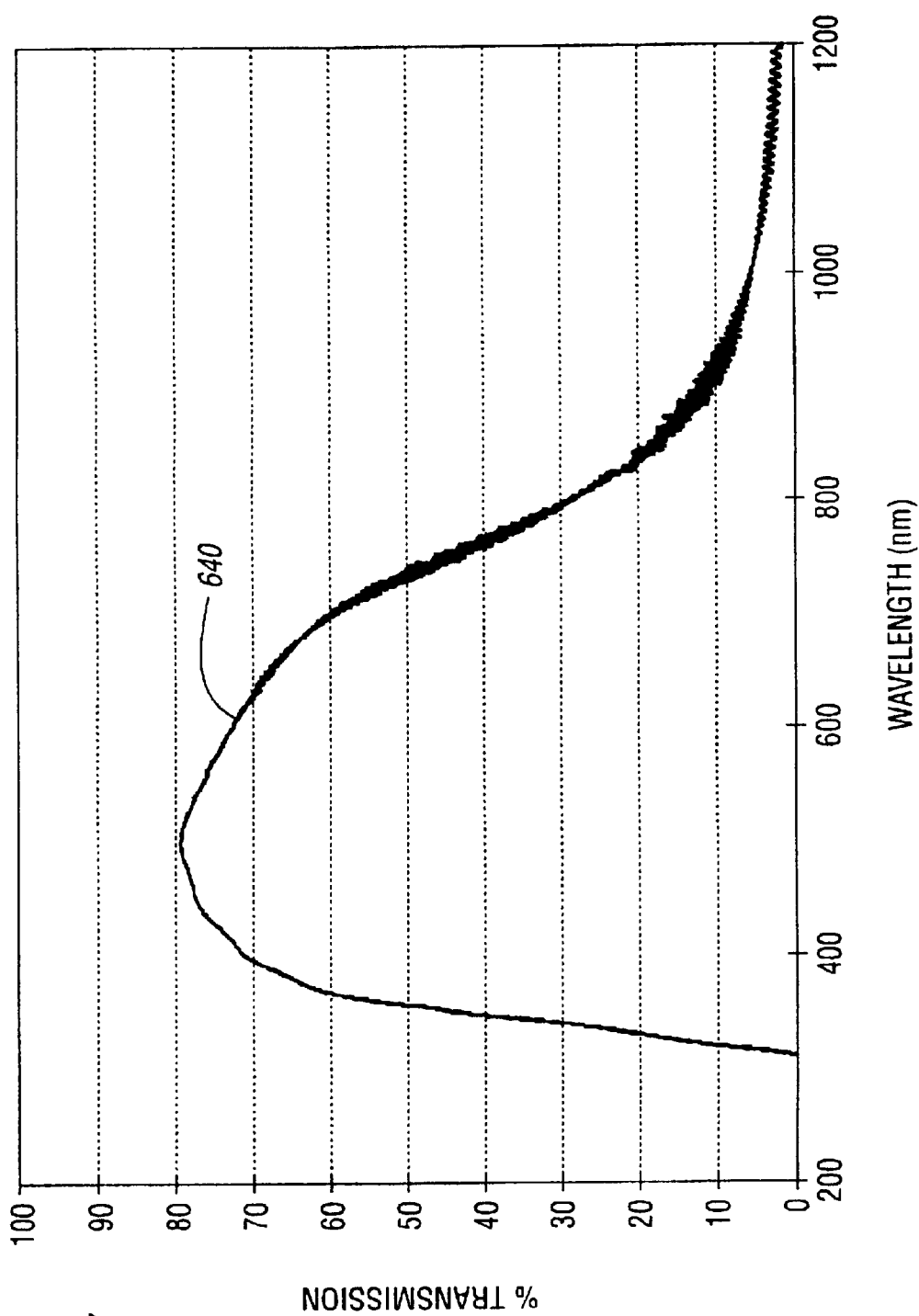
FIG. 31 is a graph of the frequency response of a window film that may be used to implement a light sensor filter.
Figure 32:
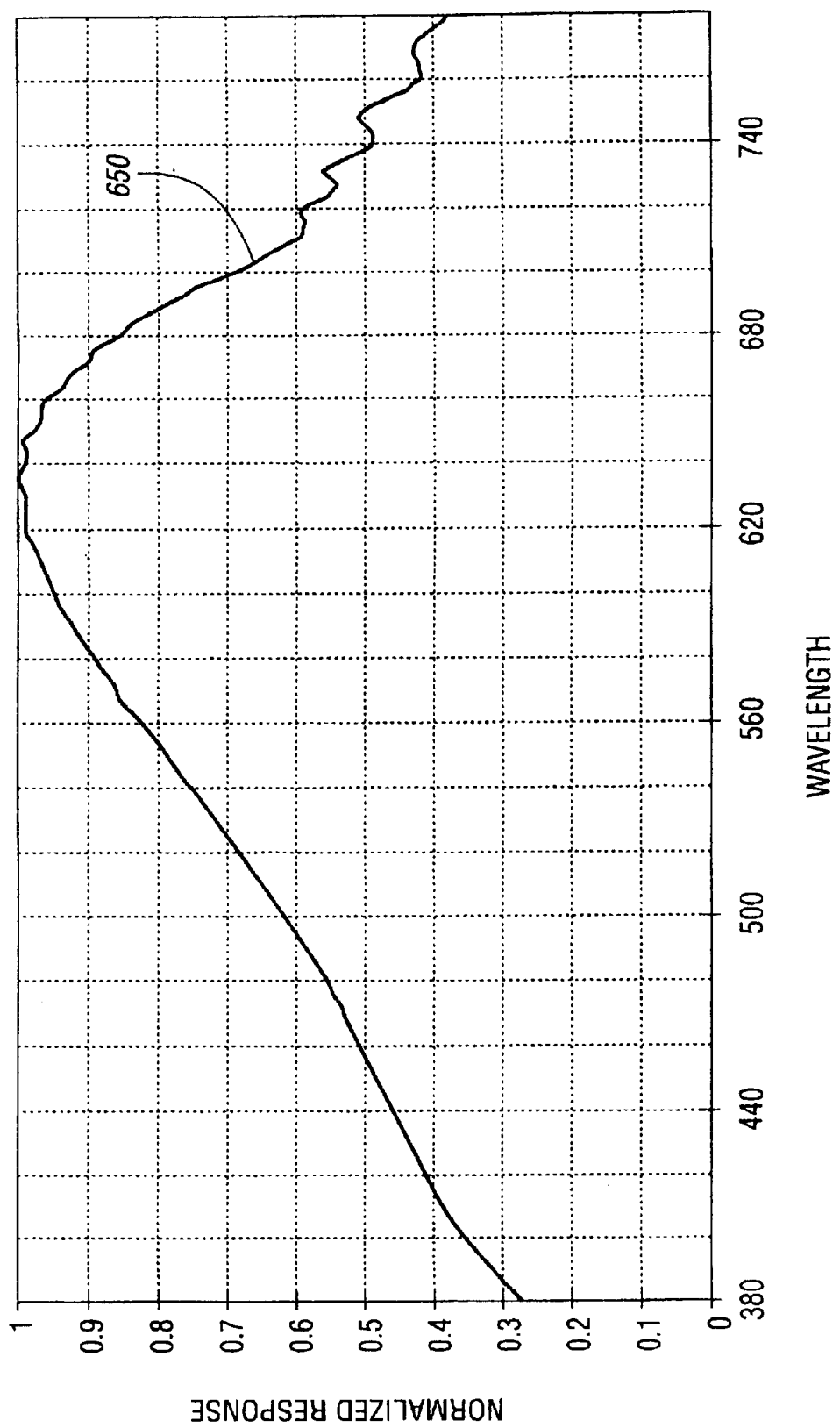
FIG. 32 is a graph of the frequency response of a light sensor incorporating the window film with the frequency response shown in FIG. 31.

Referring now to FIG. 31, a graph of the frequency response of a window film that may be applied to the light sensor filter is shown. A film with desired frequency characteristics such as, for example, XIR-70 from Southwall Technologies of Palo Alto, Calif., may be placed onto the window of light sensor 170. The spectrum of such a film is shown by curve 640. An adhesive such as, for example, 9500 PC from 3M Corporation of Minnesota, is affixed to the film. This adhesive film may then be attached to the surface of light sensor 170. Referring now to FIG. 32, curve 650 illustrates the response of light sensor 170 onto which has been placed an adhesive film having the frequency response shown by curve 640 in FIG. 31.

Figure 33:
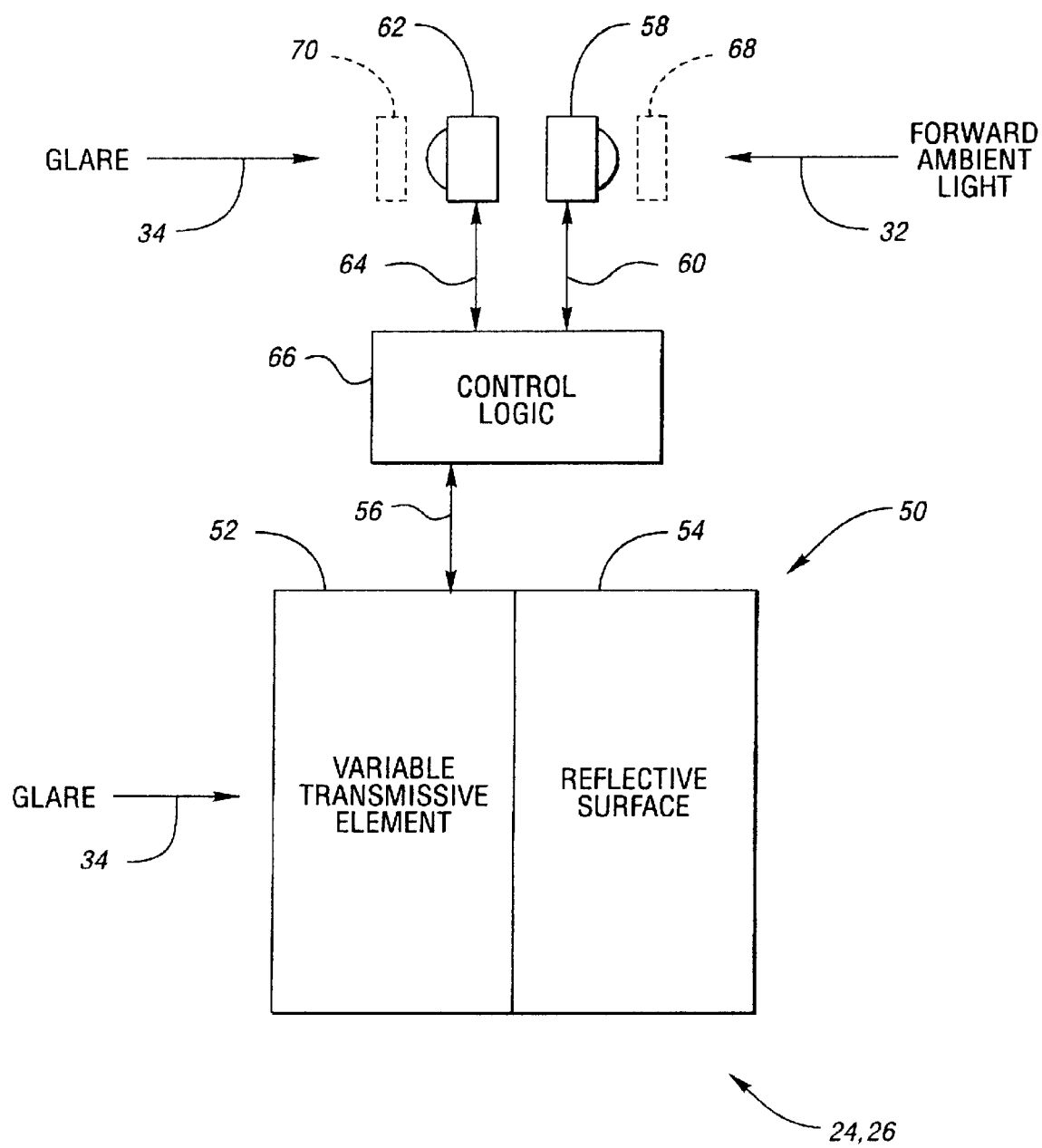
FIG. 33 is a block diagram illustrating circuitry for an automatically dimmed rearview mirror.

Having described the general system operation as well as describing the sensor in detail, the system will now be described in greater detail through some specific examples. Referring first to FIG. 33, an automatically dimmed rearview mirror 24,26 is shown that employs a light sensor. A dimming element, shown generally by 50, includes variable transmittance element 52 and reflective surface 54. Dimming element 50 is constructed such that reflective surface 54 is viewed through variable transmittance element 52. Dimming element 50 exhibits variable reflectance of light in response to dimming element control signal 56. Forward ambient light sensor 58 is positioned to receive forward ambient light 32 from generally in front of vehicle 20. Forward ambient light sensor 58 produces discrete ambient light signal 60 indicating the amount of forward ambient light 32 incident on forward ambient light sensor 58 over an ambient light integration period. Ambient light can be measured using the cyclical, varying integration periods shown in FIG. 7. Glare sensor 62 is positioned to detect glare 34 from generally behind vehicle 20 and may optionally be placed to view glare 34 through variable transmittance element 52. Glare sensor 62 produces discrete glare signal 64 indicating the amount of glare 34 incident on glare sensor 62 over a glare integration period. Control logic 66 receives ambient light signal 60 and determines an ambient light level. Control logic 66 determines the glare integration period based on the level of forward ambient light 32. Control logic 66 receives glare signal 64 and determines the level of glare 34. Control logic 66 outputs dimming element control signal 56, setting the reflectance of dimming element 50 to reduce the effects of glare 34 perceived by operator 22.

Either one of glare sensor 62 and forward ambient light sensor 58 or, preferably both sensors are implemented using a semiconductor light sensor with variable sensitivity. Such sensors include light transducers that convert incident light into charge as described herein above. This charge is collected over an integration period to produce a potential that is converted by sensor 58, 62 into a discrete digital output that does not require analog-to-digital conversion prior to digital processing in control logic 66. Eliminating the ADC conversion reduces the cost of the microprocessor. As can be seen from FIG. 11, the light-to-pulse converter introduces a delay. The delay is the time difference between the sample period and the beginning of the measurement period 420. This delay can be avoided using the analog circuit of FIG. 16*a*. However, the use of the analog circuit increases in two ways. First the number of wires in bus 164 may be doubled as a first wire will be used for the integration period input signal and a second wire will be used as the analog output signal from differential amplifier 321. Secondly, the control logic will require an ADC to convert this analog signal to a digital signal usable by the digital control logic. Regardless of whether a digital or analog signal is generated, as mentioned above, one difficulty with silicon-based sensors is the difference in spectral sensitivity between silicon and the human eye. Accordingly, light filter 68 may be placed before or incorporated within ambient light sensor 50. Similarly, glare filter 70 may be placed before or incorporated within glare sensor 62.

Filters 68, 70 attenuate certain portions of the spectrum that may include visible light, infrared, and ultraviolet radiation such that light striking sensors 58, 62 combines with the frequency response of light transducers within sensors 58, 62 to more closely approximate the response of the human eye and to compensate for tinting in vehicle windows such as windshield 30. For an automatically dimming rearview mirror, an important goal is to decrease the glare experienced by vehicle operator 20 in low light conditions. In order to preserve night vision, which degrades rapidly when exposed to bright light, particularly in the range of scotopic curve 612, exposed light transducer 62, 58 should have a frequency response similar to scotopic curve 612 such that the mirror attenuate light that would otherwise negatively impact the night vision of the vehicle operator 22. If this filter is not used, exposed light transducer 62, 58 should at least have an attenuated infrared response. This is increasingly more important as high intensity discharge (HID) headlamps, which emit more blueish light than do incandescent or halogen lamps, gain in popularity. Accordingly, the filters 68 and 70 preferably provide a filter characteristic similar to scoptic curve 612.

Variable transmittance element 52 may be implemented using a variety of devices, as mentioned above. Dimming may be accomplished mechanically, using liquid crystal cells, suspended particle devices, or advantageously using an electrochromic cell that varies transmittance in response to an applied control voltage. As will be recognized by one of ordinary skill in the art, the present invention does not depend on the type or construction of dimming element 50. If dimming element 50 includes electrochromic variable transmittance element 52, reflective surface 54 may be either incorporated into or external to variable transmittance element 52.

Each interior rearview mirror 24 and exterior rearview mirror 26 must include dimming element 50 for automatic dimming. Preferably, interior rearview mirror 24 also includes control logic 66, light sensors 58, 62, and, if used, filters 68 and 70.

Figure 34:
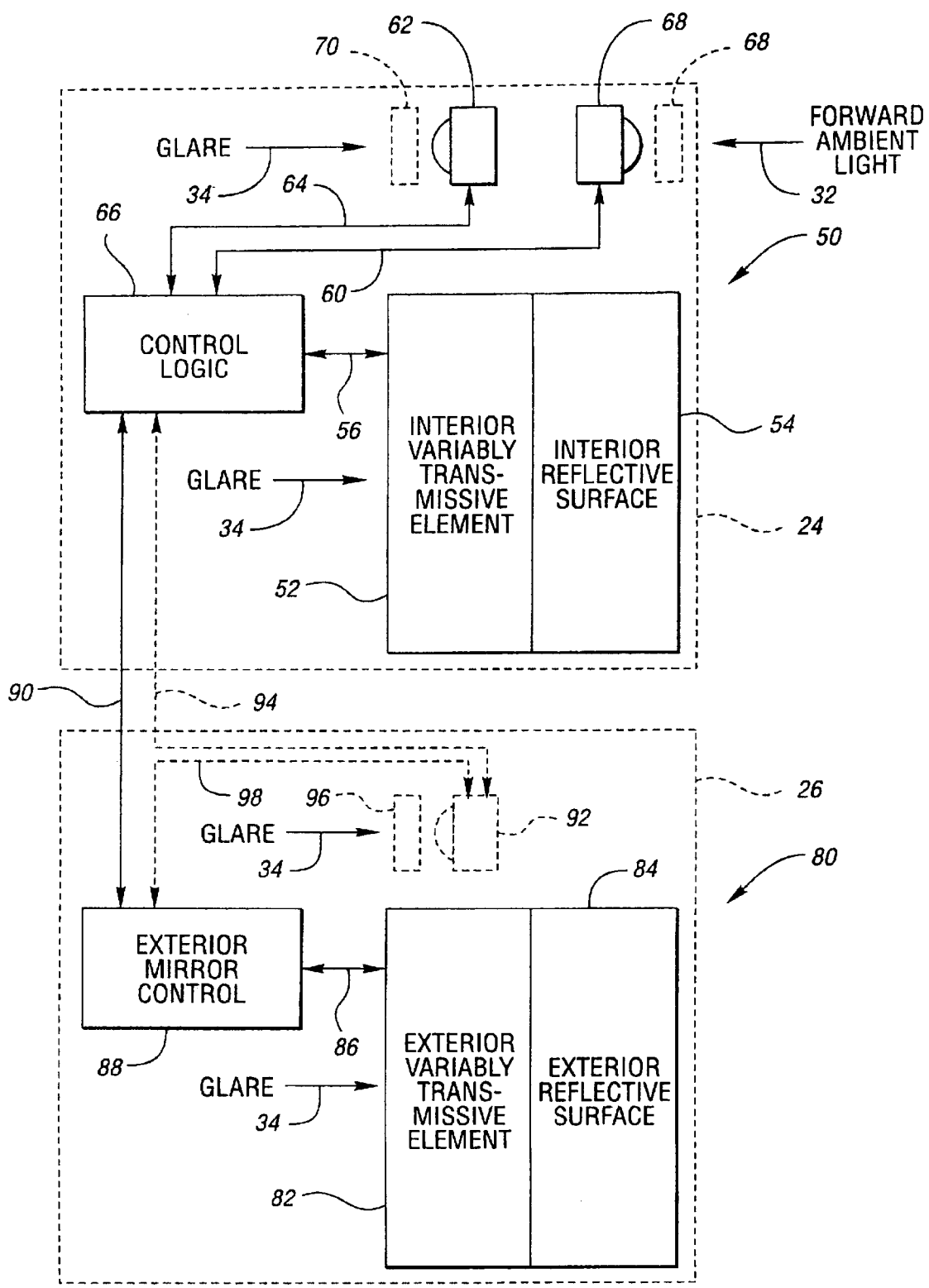
FIG. 34 is a block diagram illustrating a rearview mirror system with interior and exterior rearview mirrors.

Referring now to FIG. 34, a block diagram of a rearview mirror system with interior and exterior rearview mirrors according to embodiments of the present invention is shown. Dimming element 50 in interior rearview mirror 24 operates as described above. Each exterior rearview mirror 26 includes exterior dimming element 80 having exterior variable transmittance element 82 operative to attenuate light from rearward scene 28 both prior to and after reflecting from exterior reflective surface 84. Exterior dimming element 80 provides variable reflectance based on exterior dimming element control signal 86. Exterior dimming element 80 may operate in any manner described with regard to dimming element 50 and, preferably, is an electrochromic mirror. Exterior mirror control 88 generates exterior dimming element control signal 86. Exterior mirror control 88 may be part of exterior rearview mirror 26, interior rearview mirror 24, or may be located outside of any mirror 24, 26. Various embodiments for controlling exterior dimming element 80 depend on the amount of sensing and control to be included within exterior rearview mirror 26.

In one embodiment, control logic 66 in interior rearview mirror 24 determines exterior dimming element control signal 86 based on output from forward ambient light sensor 58 and glare sensor 62. Exterior dimming element control signal 86 may be generated directly by control logic 66 or exterior mirror control 88 may generate exterior dimming element control signal 86 based on a reflectance level calculated in control logic 66 and transmitted to exterior mirror control 88 through inter-mirror signal 90.

In another embodiment, exterior rearview mirror 26 includes exterior glare sensor 92 positioned to receive glare 34 from rearward scene 28 and operative to output exterior glare signal 94 based on the amount of glare 34 incident on glare sensor 92 over a glare integration period. Control logic 66 uses exterior glare signal 94 and ambient light signal 60 to determine the reflectance level for exterior dimming element 80. Again, exterior dimming element control signal 86 may be generated directly by control logic 66 or may be developed by exterior mirror control 88 based on the reflectance level contained in inter-mirror signal 90. Exterior glare filter 96, similar to glare filter 70, may be placed before exterior glare sensor 92 or built into exterior glare sensor 92 to provide exterior glare sensor 92 with a response closer to the response of the human eye. Inter-mirror signal 90 and exterior glare signal 94 may be in the form of a pulse width modulated signal, pulse density signal, serial data stream, or digitized and communicated over an automotive bus such as the CAN bus.

In still another embodiment, exterior glare sensor 92 produces exterior glare signal 98 routed directly to exterior mirror control 88. Exterior mirror control 88 determines exterior dimming element control signal 86 based on exterior glare signal 98 and the level of forward ambient light 32 determined by control logic 66 and sent to exterior mirror control 88 through inter-mirror signal 90.

In yet another embodiment, exterior rearview mirror 26 determines reflectance for exterior dimming element 80 independent of glare 34 or forward ambient light 32 sensed by interior rearview mirror 24. In this embodiment, exterior rearview mirror 26 operates as described above with respect to interior rearview mirror 24.

Figure 35:
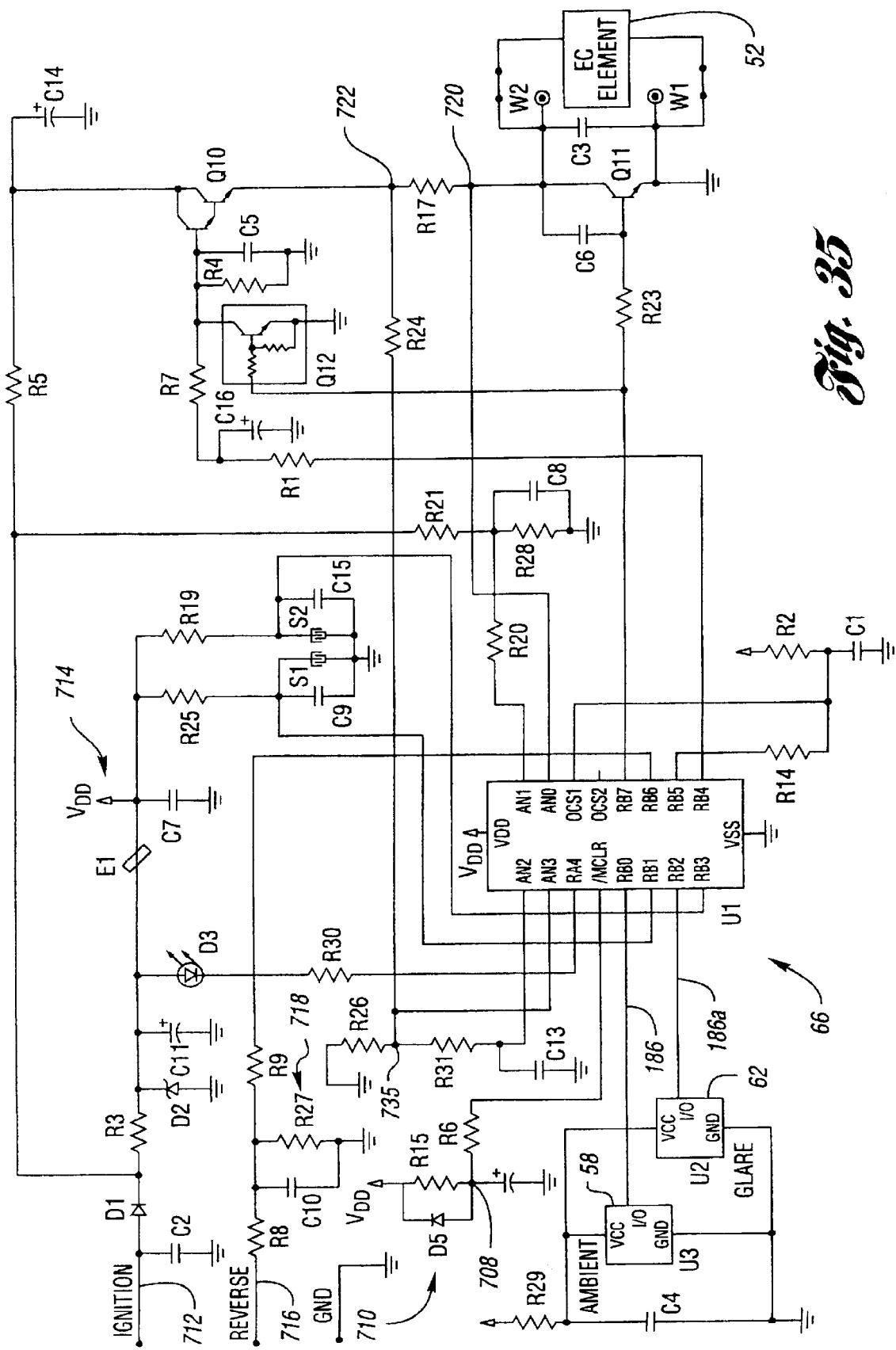
FIG. 35 is a schematic diagram illustrating an embodiment of control logic for an automatically dimming interior rearview mirror.

Referring now to FIG. 35, a schematic diagram illustrating an embodiment of control logic for an automatically dimming interior rearview mirror is shown. The circuit represents an effective yet inexpensive implementation for automatically dimming interior rearview mirror 24. Similar logic may be used to implement automatically dimming exterior mirror control, headlamp control, moisture detection and moisture removal control, electric window control, heating and cooling control, and the like. Control logic 66 utilizes a small, low cost microcontroller, indicated by U1, such as the PIC16C620A from Microchip Technology, Inc. of Chandler, Ariz. Forward ambient light sensor 58 communicates with microcontroller U1 through interconnection signal 186 connected to microcontroller input RB0. Similarly, glare sensor 62 communicates with microcontroller U1 through separate interconnection signal 186a connected to microcontroller input RB2. As described above, each interconnection signal 186 carries integration period 158 from microcontroller U1 to light sensor 58, 62 as well as light intensity period 240 from light sensor 58, 62 to microcontroller U1. Resistor R29 and capacitor C4 connected between $V_{DD}$ and ground provide filtered power for light sensors 58, 62.

Parallel resistor R15 and diode D5 are connected between $V_{DD}$ and node 708. Capacitor C12 is connected between node 708 and ground. Resistor R6 connects common node 708 to input/MCLR of microcontroller U1. Components D5, R15, R6, and C12 form a power-on reset circuit shown generally by 710. Power is supplied to control logic 66 through ignition line 712. Diode D1 protects from reversed polarity on ignition line 712 and diode D2 clamps the voltage derived from ignition line 712 to approximately five volts. Capacitors C2, C7 and C11, resistor R3, and ferrite element E1 form a power conditioning circuit shown generally by 714. Reverse line 716 is asserted when vehicle 20 is placed into reverse. Capacitor C10 and resistors R8, R9, and R27 form a reverse signal conditioning circuit, shown generally by 718. Reverse signal conditioning circuit 718 low pass filters reverse line 716 and provides electrostatic discharge protection for digital input pin RB6 on microcontroller U1. Microcontroller U1 uses the signal on reverse line 716 to clear variable transmittance element 52 whenever vehicle 20 is placed in reverse. Microcontroller U1 is clocked by an RC oscillator formed by resistor R2 connected between the OSC1 pin and $V_{DD}$ and capacitor C1 connected between the OSC1 pin and ground. Resistor R30 and LED D3 connected in series between $V_{DD}$ and open drain output RA4 of microcontroller U1 form an indicator lamp that may be mounted on interior rearview mirror 24 to alert operator 22 of the operating state of control logic 66. Switches S1 and S2 are connected to digital inputs RB1 and RB3, respectively, of microcontroller U1 to permit selecting control options.

Figure 36:
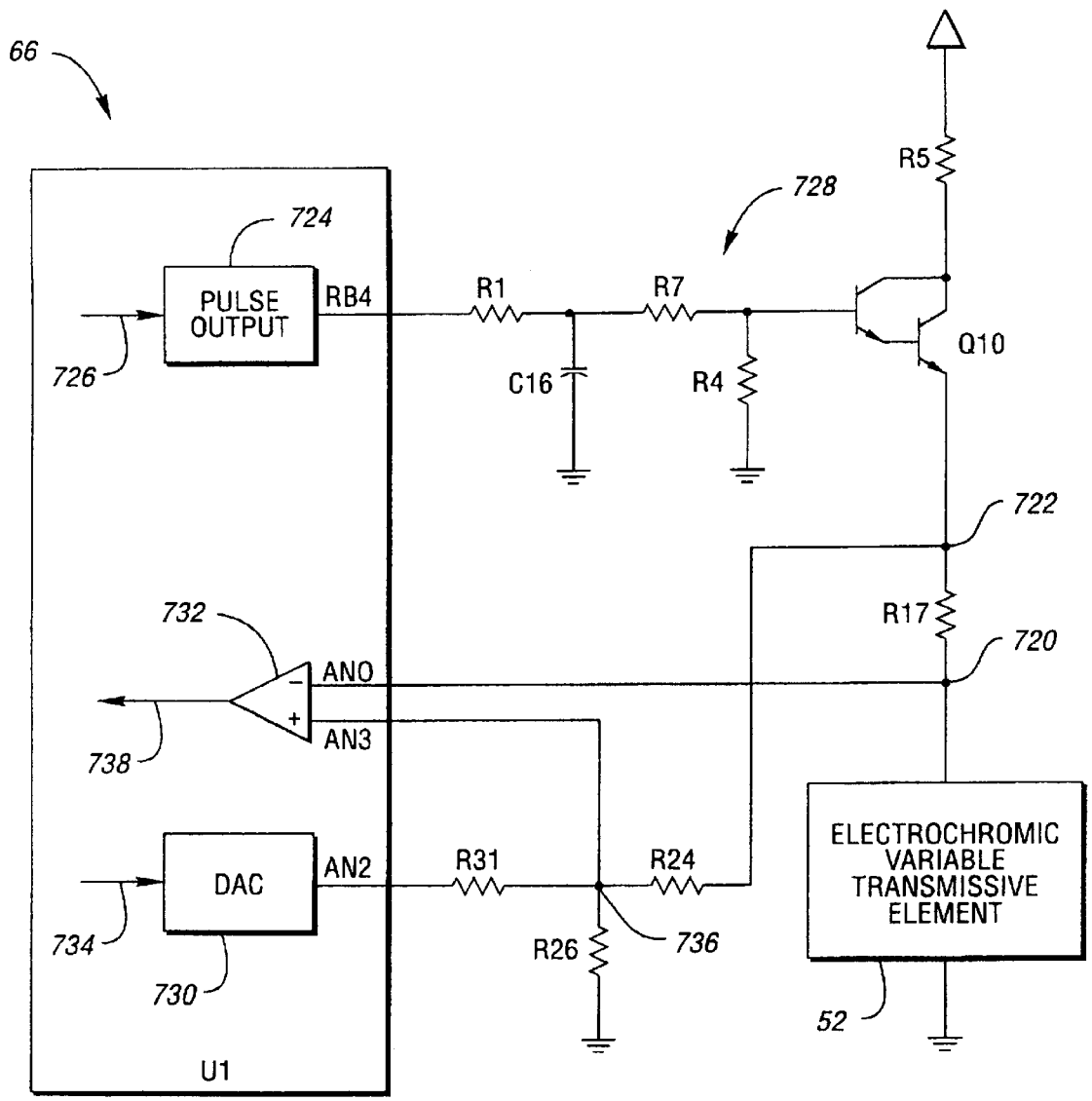
FIG. 36 is a schematic diagram illustrating operation of electro chromic element transmittance control.

Referring now to FIG. 36, a schematic diagram illustrating operation of electrochromic dimmer control is shown. A portion of control logic 66 has been redrawn to more clearly illustrate control of electrochromic variable transmittance element 52. Electrochromic variable transmittance element 52 can be implemented using any suitable variable reflectance device, and may for example comprise the electrochromic element described in U.S. Pat. No. 4,902,108 titled "Single-Compartment, Self-Erasing, Solution-Phase Electrochromic Devices, Solutions For Use Therein, And Uses Thereof" issued to Byker. Electrochromic variable transmittance element 52 darkens in response to a control voltage applied at input node 720. If the applied control voltage is removed, electrochromic variable transmittance element 52 will self discharge, passing an increasing amount of light. Electrochromic variable transmittance element 52 may be rapidly cleared by shorting input node 720 to ground.

Resistor R17 connects input node 720 to the emitter of Darlington pair Q10 at node 722. The collector of Q10 is connected to a power supply through current limiting resistor R5, which may for example have an impedance of 27 Ω. The base of Darlington pair Q10 is connected to digital output RB4 of microcontroller U1 through resistors R1 and R7. The base of Q10 is also connected to ground through resistor R4 and through resistor R7 and capacitor C16. Digital output pin RB4 is driven by pulse output 724 in response to pulse control 726 generated by software running on microcontroller U1. Pulse output 724 may produce a pulse signal such as, for example, a pulse width modulated signal. Preferably, pulse output 724 functions as a switch, setting output pin RB4 to either a high voltage or a low voltage once during each transition period as described below. Capacitor C16 and resistors R1, R4, and R7 form a low pass filter, shown generally by 728, to smooth the signal appearing on digital output RB4. This smoothing results in a substantially constant applied control voltage at input node 720 for a fixed desired control level. Additionally, the base-to-emitter diode drops in Q10 together with the voltage divider formed between resistor R4 and the sum of resistors R1 and R7 set the operating voltage for electrochromic variable transmittance element 52. Typical values for components are 1 kΩ for R1 and R4, 100 Ω for R7, and 100 µF for C16. With digital output RB4 at 5 volts and nominal current draw by electrochromic variable transmittance element 52, input node 720 is approximately 1.2 Volts.

The performance of control logic 66 can be improved through feedback of electrochromic variable transmittance element 52 applied control voltage at input node 720. Microcontroller U1 includes comparison logic to cause pulse output 724 to deliver a low voltage if the applied control voltage is greater than the desired control level and to deliver a high voltage otherwise. Typically, the high voltage is near $V_{DD}$ and the low voltage is near ground. This comparison may be made by comparing a digital number representing the desired control level with the digitized applied control voltage obtained using an analog-to-digital converter (DAC). Alternately, DAC 730 and comparator 732 are used. DAC 730 produces a desired voltage level on analog output AN2 in response to the desired control level on DAC control 734 supplied by software running on microcontroller U1. Resistor R31 is connected between analog output AN2 and node 736 and resistor R26 is connected between node 736 and ground. One input of comparator 732, at analog input AN3, is connected to node 736. The other input of comparator 732, at analog input AN0, is connected to input node 720. The output of comparator 732 indicates if the desired voltage level is greater than the applied control voltage. Values for resistors R31 and R26 are chosen so that the voltage at node 736 is within the range of expected applied control voltages at input node 720 throughout the range of desired control voltages output from DAC 730. Typical values for R31 and R26 are 390 kΩ and 200 kΩ, respectively.

Positive feedback is achieved by connecting resistor R24 between node 736 and node 722. Resistor R17 is used to sense the drive current through electrochromic variable transmittance element 52 and, hence, is typically a low value such as 10 Ω. Resistor R24 is typically a high value such as 1.3 MΩ. As the drive current through resistor R17 increases, the voltage across resistor R17 increases pulling up the voltage at node 736. This increase in the voltage on the positive input terminal of comparator 732 has the regenerative effect of increasing the duty cycle from pulse output 724. This regenerative effect provides better system response at higher temperatures when electrochromic variable transmittance element 52 has an increased current draw together with an increase in maximum operating voltage. Positive feedback also offsets the effects of internal resistances within electrochromic variable transmittance element 52.

Figure 37:
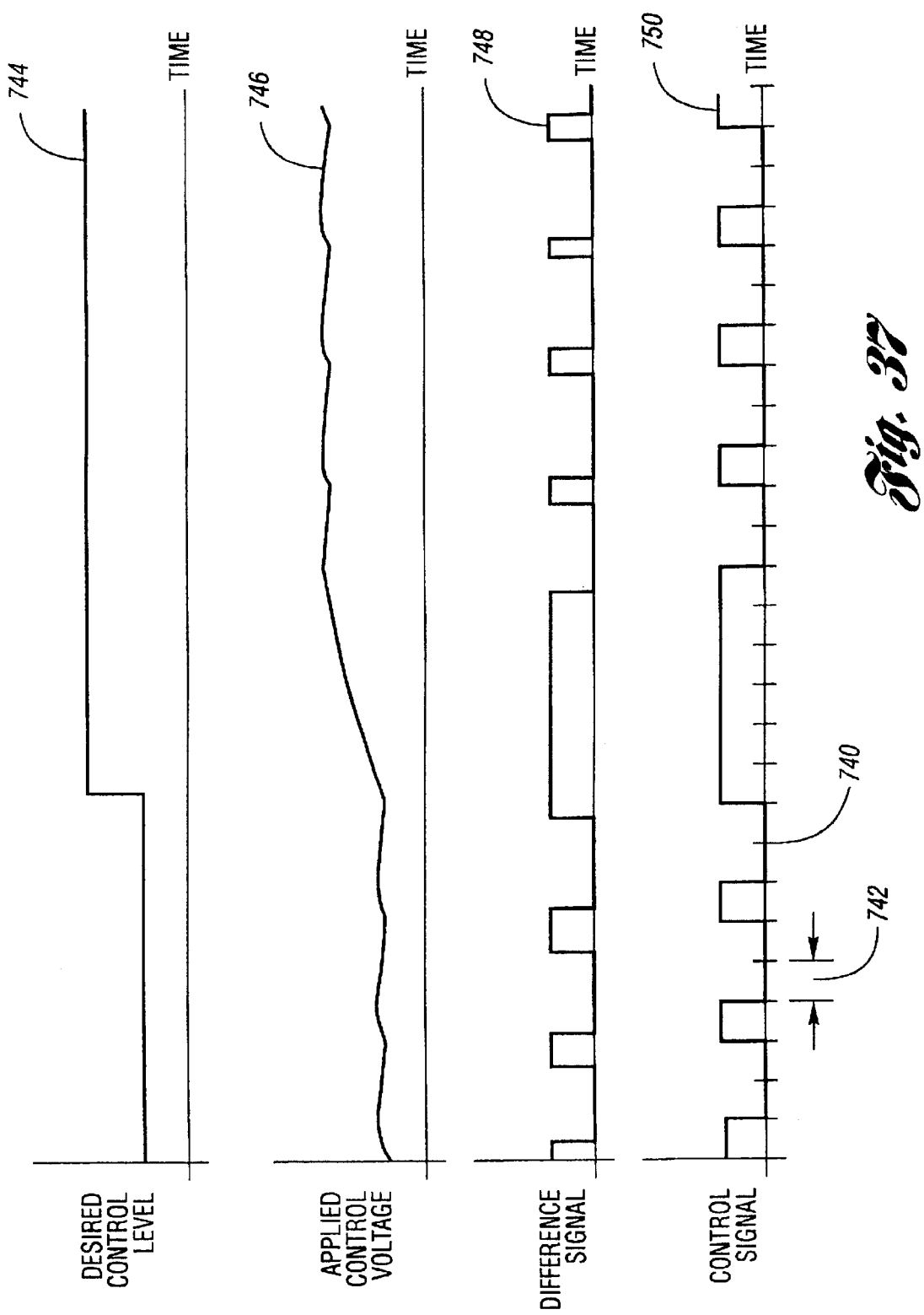
FIG. 37 is a timing diagram illustrating electrochromic element transmittance control.

Referring now to FIG. 37, a timing diagram illustrating electrochromic element transmittance control is shown. During automatic dimming operation, software executing in microcontroller U1 is initiated at transition points, one of which is indicated by 740, separated by fixed transition period 742. Desired control level 744 indicates the desired level of transmittance for electrochromic variable transmittance element 52. Desired control level 744 may be an analog value or, preferably, is a digital number determined by microcontroller U1. Desired control level 744 is compared to applied control voltage 746 by comparison logic. Comparator 732 accepts applied control voltage 746 and the desired control voltage appearing at node 736. Comparator output 738 produces difference signal 748, which is asserted when the desired voltage level representing desired control level 744 is greater than applied control voltage 746. Comparator output 738 is used to generate control signal 750 on output RB4. If desired control level 744 is greater than applied control voltage 746, digital output RB4 is switched high. If desired control level 744 is less than applied control voltage 746, digital output RB4 is switched low. Preferably, low pass filter 728 filters control signal 750 to produce applied control voltage 746.

The duration of transition period 742 is set to inhibit flicker in electrochromic element 52 that may be noticed, for example, by vehicle operator 22. Transition period 742 may preferably be between two seconds and two microseconds. For the system described above, five milliseconds may be used for transition period 742.

Figure 38:
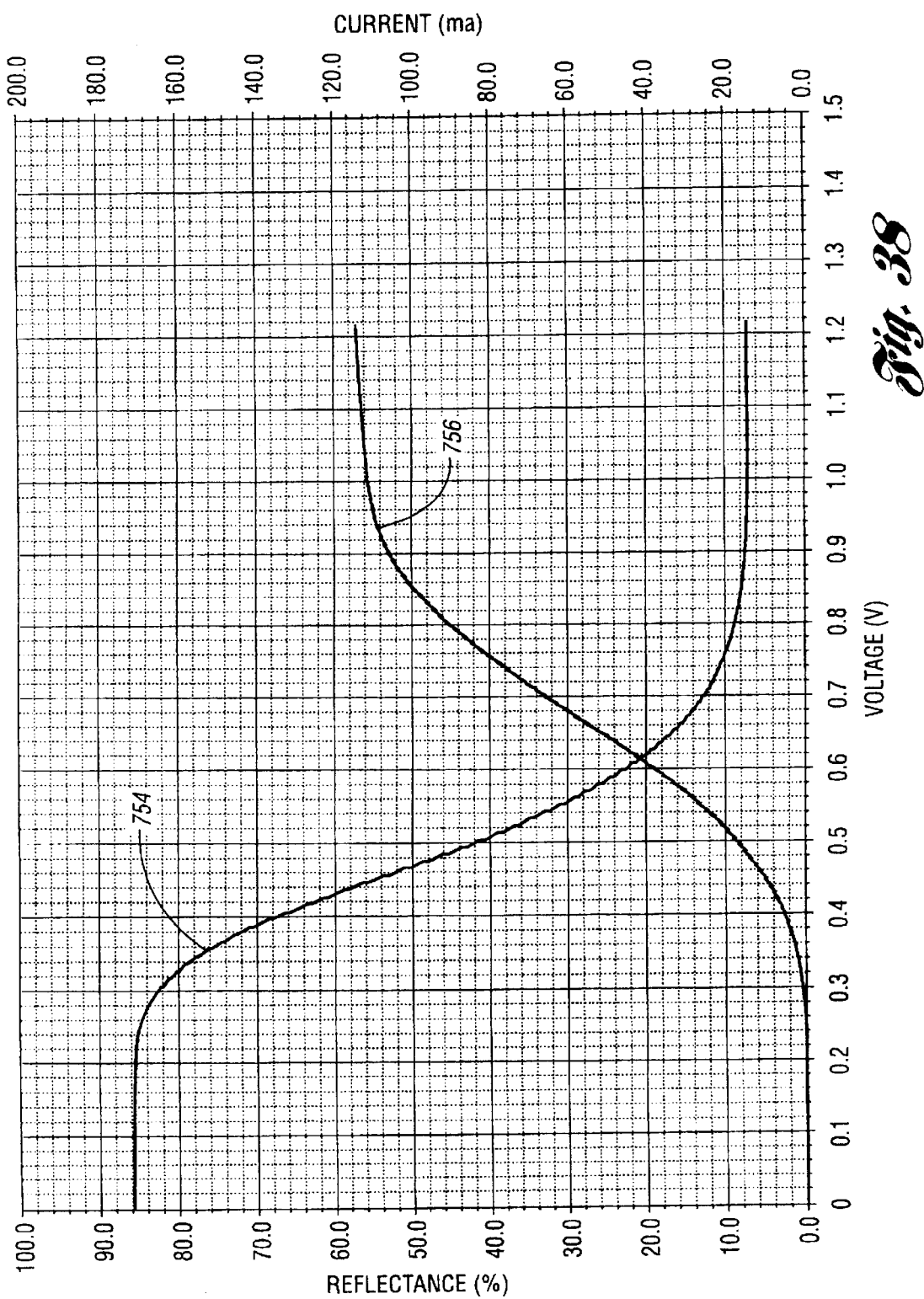
FIG. 38 is a graph indicating dimmer reflectance as a function of dimmer control signal duty cycle.

Referring now to FIG. 38, a graph indicating dimmer reflectance as a function of applied control voltage is shown. Curve 754 plots percent reflectance for dimming element 50, containing electrochromic variable transmittance element 52, as a function of applied control voltage 756. Curve 754 indicates a decrease in reflection from about 86% to about 8% as the applied control voltage is increased from about 0.2 V to about 0.9 V. FIG. 38 also includes curve 756 illustrating current draw as a function of applied control voltage 756 for typical electrochromic variable transmittance element 52.

Referring again to FIG. 35, additional circuitry is provided to rapidly clear variably transmissive electrochromic element 50. Transistor Q11 is connected across variably transmissive electrochromic element 50 with collector at node 720 and emitter at ground. The base of transistor Q11 is connected through resistor R23 to digital output RB7. When digital output RB7 is asserted, transistor Q11 turns on, acting as a switch to rapidly discharge electrochromic variable transmittance element 52. Capacitor C6 is connected between the collector and base of transistor Q11 to reduce electromagnetic interference created as transistor Q11 switches. Transistor Q12 is connected between the base of transistor Q10 and ground and is also controlled by digital output RB7. Transistor Q11 turns on with transistor Q12 to shut off transistor Q10 thereby preventing simultaneously attempting to darken and clear electrochromic variable transmittance element 52. Resistor R7 is placed between capacitor C16 and the collector of transistor Q12 to limit the discharge current from capacitor C16 through transistor Q12.

Figure 39:
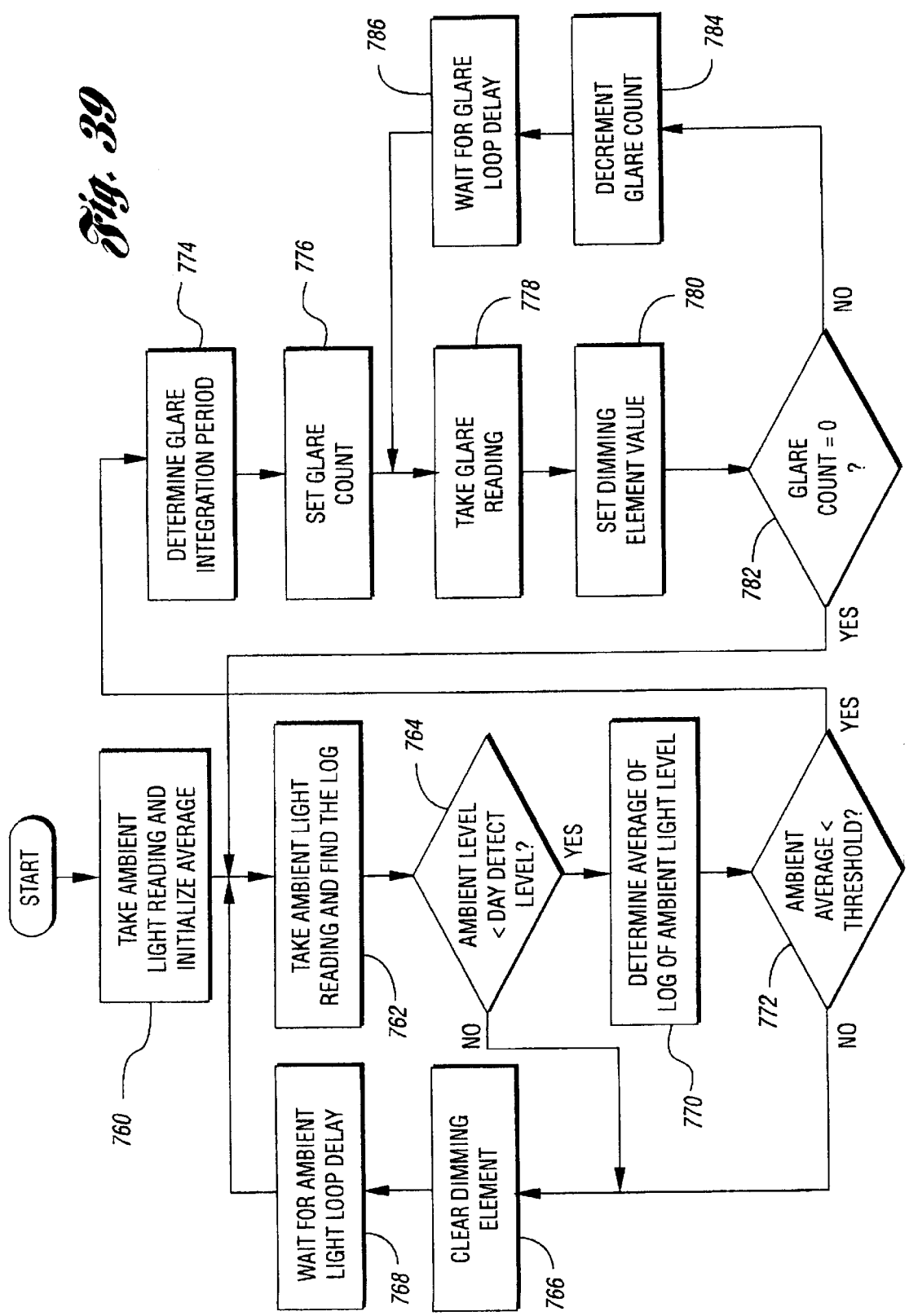
FIG. 39 is a flow diagram illustrating operation of automatically dimming rearview mirror control logic.

Referring now to FIG. 39, a flow diagram illustrating operation of control logic 66 for the rearview mirror 24,26 is shown. As will be appreciated by one of ordinary skill in the art, the operations illustrated in FIG. 39 and other flow diagrams are not necessarily sequential operations. Also, though the operations are preferably implemented by software executing in microcontroller U1, operations may be performed by software, hardware, or a combination of both. The present invention transcends any particular implementation and aspects are shown in sequential flow chart form for ease of illustration.

An ambient light reading is taken and the average ambient light is initialized in block 760. When the automatic dimming system is initially powered up, the average ambient light level is initialized by taking a first reading of forward ambient light 32 using forward ambient light sensor 58. Acquiring an ambient light reading and the average ambient light level are described with regard to blocks 762 and 770, respectively, below.

An ambient light reading is taken and the log of the ambient light reading is found in block 762. The use of semiconductor forward ambient light sensor 58 with integral charge collection produces ambient light signal 60 having good resolution over a wide range of ambient light levels 32. As described above, this is accomplished by taking various readings of forward ambient light 32 using different integration periods 242, 248, 254 (FIG. 7). In one embodiment, four separate integration periods are used such as, for example, 600 $\mu$s, 2.4 ms, 9.6 ms, and 38.4 ms. Each of these integration periods differs by a factor of four from adjacent periods. Therefore, for example, the 2.4 ms integration period causes forward ambient light sensor 58 to be four times more sensitive to forward ambient light 32 than does integrating with the 600 $\mu$s integration period. Typically, the shortest integration pulse 242 is first used by forward ambient light sensor 58 to produce short signal pulse 244. The width of short signal pulse 244 is measured by control logic 66. Since forward ambient light sensor 58 in complete darkness may still develop short signal pulse 244 having a width less than 100 $\mu$s, a minimum threshold is set for accepting short signal pulse 244 as accurately reflecting the level of forward ambient light 32. Typically, this threshold may be 300 $\mu$s. If short signal pulse 244 does not exceed the threshold, the next longest integration period is used by forward ambient light sensor 58. If the longest integration time does not yield a suitably long signal pulse, forward ambient light 32 is at an extremely low level and mirror 24, 26 can be operated at maximum sensitivity to glare 34.

Using the logarithm of ambient light signal 60 permits the use of an inexpensive microcontroller such as U1, which may have only 8-bit internal registers and no multiplication instructions. Since microcontrollers are binary devices, base two logarithms require fewer instructions to compute than base ten logarithms or natural logarithms. An algorithm is now described for obtaining an 8-bit, binary logarithm having the most significant four bits representing an integer part and the least significant four bits a fractional part. The 8-bit ambient light signal 60 resulting from the proper integration period is examined bit-by-bit starting with the most significant bit until the first binary one is found. The bit position containing the first binary one becomes the integer portion of the logarithm. The four most significant bits following the bit position containing the first binary one become the fractional portion of the logarithm. This value is incremented by one-sixteenth to better approximate the logarithm. An example of the binary logarithm approximation is now provided. Suppose ambient light signal 60 is determined to be 44 (00101101 in base two). The most significant asserted bit is bit five, so the integer portion of the resultant value is binary 0101. The next four bits following bit five are 0110 so the fractional part of the resultant value is 0110 for a total value of 0101.0110. After incrementing, the binary logarithm approximation becomes 0101.0111.

Figure 40:
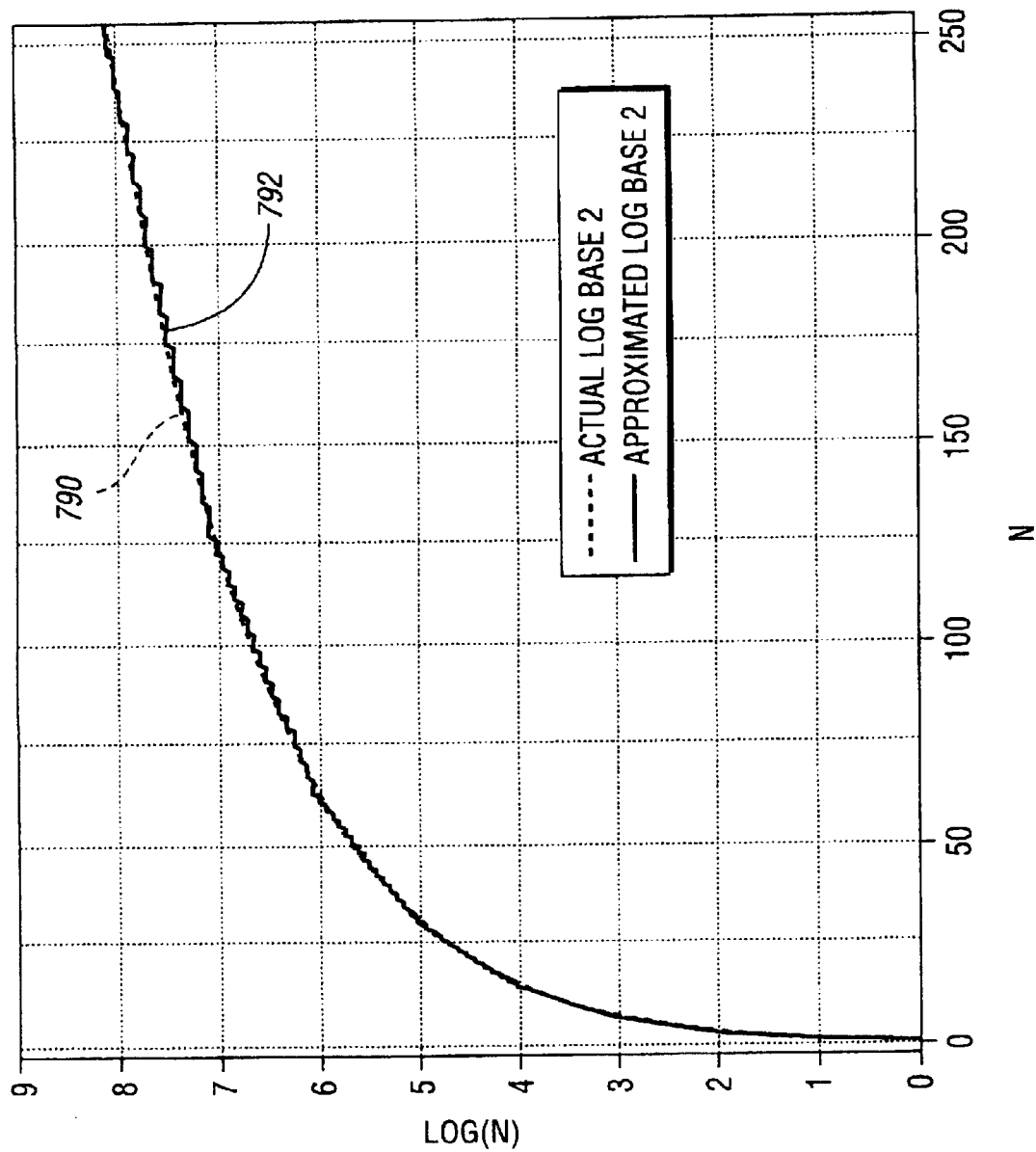
FIG. 40 is a graph illustrating binary logarithmic approximation implemented in an embodiment of control logic for an automatically dimming rearview mirror.

Referring now to FIG. 40, a graph illustrating binary log approximation according to the above algorithm is shown. The binary logarithm is plotted for values of N between 1 and 255. Curve 790 shows the actual binary logarithm. Curve 792 shows the approximated binary logarithm.

Ambient light signal 60 must be scaled to compensate for different possible integration periods. This may be accomplished by adding a scaling factor to the binary logarithm of ambient light signal 60. For example, if the longest integration time (38.4 ms) is used to measure forward ambient light 32, a scale factor of 0 is added. If the next longest integration time (9.6 ms) is used, a scale of factor of 2 is added. If the next longest integration time (2.4 ms) is used, 4 is added. If the shortest integration time (600 $\mu$s) is used, 6 is added. Since the largest value resulting from the binary logarithm approximation is 8 (1000.0000), no overflow results from adding the scale factor.

Referring again to FIG. 39, the logarithm of the ambient light level is compared to the day detect level in block 764. The day detect level is a calibrated value stored in microcontroller 66, read only memory, electronically erasable read-only memory, or the like, during manufacture. The day detect level is used to prevent dimming of, or to more rapidly clear dimming element 50, during rapid transitions from dark to bright such as if vehicle 20 emerges from a tunnel into daylight. If the logarithm of forward ambient light 32 exceeds a preset day detect level, variable transmittance element 52 is cleared to set dimming element 50 to maximum reflectance in block 766. Processing is then delayed in block 768. A wait loop is entered having a time sufficiently long to make the period between taking ambient light readings equal a constant ambient light loop delay. This period may be, for example, 400 ms. Following the wait in block 768, another reading of forward ambient light 32 is taken in block 762. If the logarithm of forward ambient light 32 does not exceed the day detect level, an average is obtained in block 770.

The average of the logarithm of ambient light level is determined in block 770. Averaging readings first converted to the logarithm of forward ambient light 32 reduces the effect of a temporary bright light in front of vehicle 20 from dramatically skewing the average reading of an otherwise dark forward ambient light 32. A running average of the log of ambient light signals 50 may be obtained from a digital low pass filter such as is described by Equation 3:

$$y(n)=x(n)/64+63y(n-1)/64$$

where x(n) is the most recently obtained binary log approximation of ambient light signal 60 correctly scaled for the integration period, y(n−1) is the previous filter output, and y(n) is the current filter output. The use of averaged logarithms with analog light signals is described in U.S. Pat. No. 5,204,778 titled "Control System For Automotive Rearview Mirrors" issued to Bechtel.

The average of the log of the ambient light level is compared to a threshold in block 772. The day detect level can be a calibrated value stored in microcontroller 66, read only memory, electronically erasable read-only memory, or the like, during manufacture. If forward ambient light 32 is sufficiently bright, vehicle operator 22 will not be dazzled by any reasonable amount of glare 34, allowing mirror 24, 26 to be set to maximum reflectance. Therefore, if the average of the log of ambient light signal 60 is not less than the threshold, dimming element 50 is cleared in block 766 and the wait of block 768 is executed. If the average of the log of ambient light signals 50 is less than the threshold, glare processing occurs beginning in block 774. Typically, the threshold used for comparison in block 772 is less than the day detect level used in the comparison of block 764.

The glare integration period is determined in block 774. The integration period for glare sensor 62 is determined based on ambient light signal 60. The glare integration period is inversely proportional to the binary antilogarithm of the average of the log of ambient light signal 60 as described by Equation 4:

$$T_G(n)=antilog_2(K_1-y(n))-K_2$$

where $T_G(n)$ is the integration period for glare sensor 62 for the filter output at sample time n, $K_1$ is a multiplicative constant, and $K_2$ is an additive constant. Constants $K_1$ and $K_2$ are determined experimentally. If the average of the log of ambient light signal 60 is below a certain level, a maximum glare sensitivity integration period is used.

A glare count is set in block 776. The glare count indicates the number of glare readings taken between ambient light readings. The product of the glare count and the glare loop delay should equal the time between taking ambient light readings. For example, the glare count may be three and the time between taking glare readings may be 133 ms.

A glare reading is taken in block 778. The pulse width returning from glare sensor 62 as glare signal 64 is measured for the glare integration period determined in block 774. It is envisioned that a pre-measurement of the glare reading can optionally be made, prior to taking the measurement using the glare integration period determined in step 774, using a very short predetermined integration period similar to the integration period resulting from pulse 240 used for the forward light sensor, and may be an integration period as short as 30 to 40 μs. If this short pre-measurement of glare is greater than a threshold level, the glare sensor is determined to be subject to a very high level of light indicating that the rear sensor is saturated. The mirror may be fully dimmed in response to this condition. If this pre-measurement does not exceed the threshold level, the processing will continue using the glare signal period determined in block 774.

The dimming element value is set in block 780. Glare signal 64 is used to determine desired control level 744 setting the reflectance for dimming element 50. This may be accomplished, for example, through the use of a look-up table which associates a lower reflectance with longer glare signal period. The precise relationship between the level of glare 34 and the setting for variable transmittance element 52 depends upon factors including the construction of mirror 24, 26, the configuration of vehicle 20, and preferential settings by operator 22. Desired control level 744 may be used to control variable transmittance element 52 as described above. For example, a manual actuated mechanism may be provided on the mirror to permit the user to adjust the relationship between the glare level and the transmittance of element 52.

A check of the glare count is made in block 782. If the glare count is zero, the next ambient light reading is taken in block 762. If the glare count is not zero, the glare count is decremented in block 784. A wait loop is then entered in block 786. The glare loop delay period is set so that glare readings are taken at regular, predetermined intervals.

A system for detecting moisture on window 100 (FIG. 41), shown generally by 102, includes light emitter 104 directed at window 100. Window 100 may be windshield 30, rear window 36, or any other window on vehicle 20. Emitter 104 generates emitted radiation 106 that strikes window 100. A portion of emitted radiation 106 is reflected from window 100 as reflected radiation 108. The intensity of reflected radiation 108 is based on the amount of moisture on window 100.

Moisture light sensor 110 receives reflected radiation 108 and accumulates charge in response to light 108 incident over an integration period. Moisture light sensor 110 outputs light signal 112 based on the amount of light 108 incident on moisture light sensor 110 over the light integration period. The determination of the sensitivity for light sensor 110 may be generated within moisture light sensor 110 using the sensor logic of FIG. 17, or may be supplied by light sensitivity signal 114.

Ambient light 116 represents a source of noise that may mix with reflected radiation 108, affecting light signal 112. If window 100 is vehicle windshield 30, ambient light 116 may result from solar radiation, reflected sunlight, headlamps from oncoming vehicles, street lights, and the like, and may come from forward ambient light 32, skyward ambient light 46, or other light direction depending on the mounting and construction of sensor system 102. Ambient light 116 may vary over a wide dynamic range. Removing the effects of ambient light 116 improves the ability of moisture detecting system 102 to detect moisture. Various designs may be used to reduce the amount of ambient light 116 striking moisture light sensor 110 including channels and baffles for deflecting light away from moisture light sensor 110 and surfaces to reflect or refract ambient light 116 away from moisture light sensor 110 as is known in the art.

Control logic 66 is connected to light emitter 104 and moisture light sensor 110. Control logic 66 generates emitter signal 118 to turn on and off light emitter 104. In an embodiment, control logic 66 receives a first light signal 112 from moisture light sensor 110 with emitter 104 turned off to obtain an indication of the level of ambient light 116. Emitter 104 is then turned on. Control logic 66 receives a second light signal 112 from moisture light sensor 110. The presence of moisture on window 100 is then determined based on first and second light signals 112. If moisture is detected, control unit 66 may signal wiper control 120 to activate windshield wiper motor 112 to move wipers 38 over window 100. Control logic 66 may also signal defogger control 124 to activate defogger 40. Control logic 66 may also signal defroster control 126 to activate defroster 42. Other means for removing moisture from window 100 may also be used within the spirit and scope of the present invention.

Figure 41:
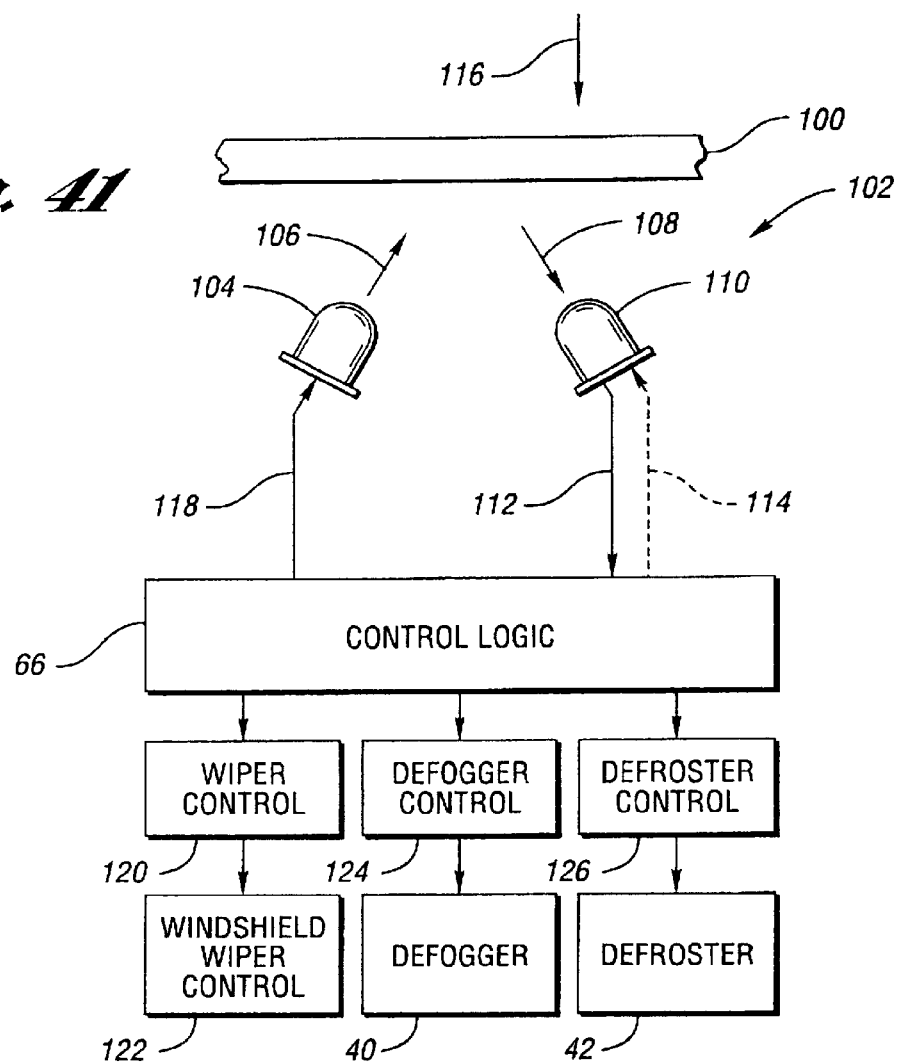
FIG. 41 is a block diagram illustrating equipment for detecting the presence of moisture on a vehicle window.

In the embodiment shown in FIG. 41, a single light emitter 104 and a single moisture light sensor 110 are shown. However, it is within the spirit and scope of the present invention to include more than one emitter 104, more than one moisture light sensor 110, or a plurality of both emitters 104 and sensors 110. Also, control logic 66 may be adapted to control a wide variety of functions including closing windows, cleaning windows, activating lamps, and the like.

Figure 42:
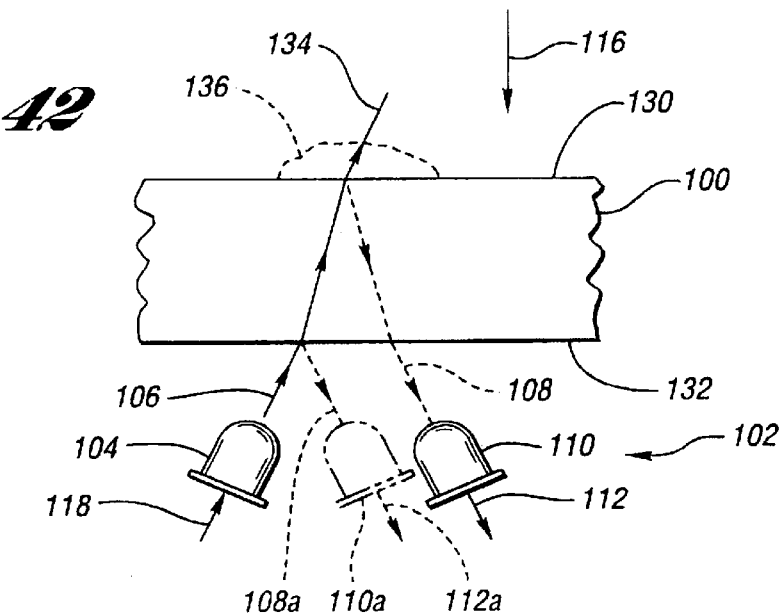
FIG. 42 is a ray diagram illustrating moisture detection on an outside surface causing an increase in reflected light.

Referring now to FIG. 42, a ray diagram illustrating moisture detection on an outside surface causing an increase in reflected light is shown. Window 100 has outer surface 130 and inner surface 132. In the absence of moisture, emitted radiation 106 passes through inner surface 132 and outer surface 130 to become exiting ray 134. Moisture on outer surface 130, such as droplet 136, causes at least some of emitted radiation 106 to be reflected as reflected radiation 108, which is detected by moisture light sensor 110 and converted to discrete light signal 112. A second light sensor, indicated by 110a, may be positioned to detect moisture on inner surface 132. Emitted radiation 106 may reflect off moisture, such as fog or frost, on inner surface 132 producing reflected radiation 108a. Second moisture light sensor 110a generates discrete light signal 112a indicating the presence of moisture on inner surface 132.

Figure 43:
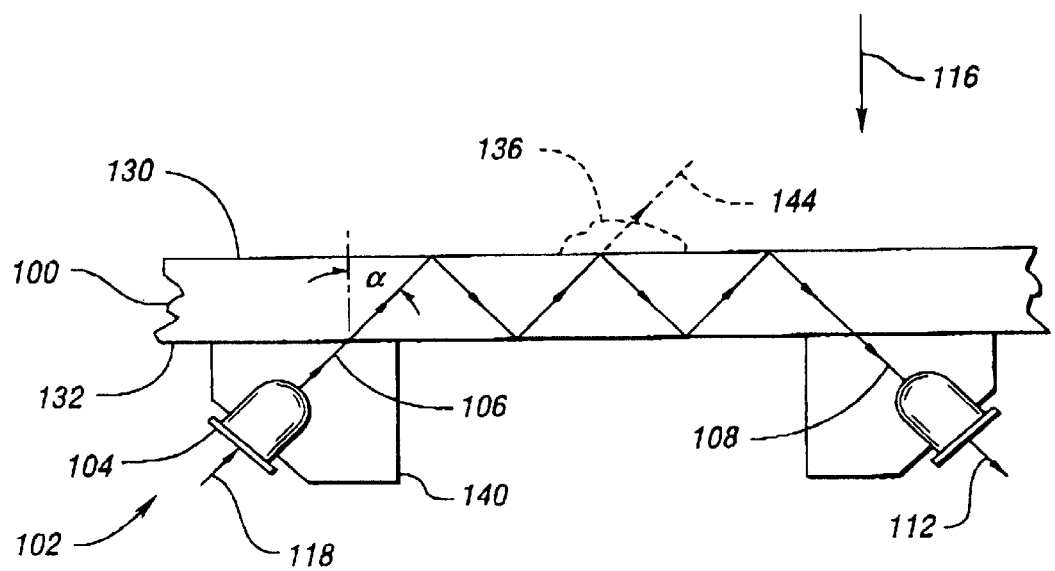
FIG. 43 is a ray diagram illustrating moisture detection on an outside surface causing a decrease in reflected light.

Referring now to FIG. 43, a ray diagram illustrating moisture detection on an outside surface causing a decrease in reflected light is shown. Light emitter 104 is positioned such that emitted radiation 106 strikes inner surface 132 at an angle of incidence α allowing emitted radiation 106 to pass through inner surface 132 and be totally reflected between outer surface 130 and inner surface 132 at least once before exiting as reflected radiation 108. To facilitate emitted radiation 106 entering inner surface 132, emitter 104 is placed in input coupler 140, which is attached to inner surface 132. To facilitate reflected radiation 108 exiting inner surface 132, moisture light sensor 110 is placed in output coupler 142, which is attached to inner surface 132. Input coupler 140 and output coupler 142 are constructed of a material having an index of refraction similar to the index of refraction of window 100. For window 100 constructed of glass and surrounded by air, the index of refraction is approximately 1.49 and the angle of incidence α must be greater than 42°. If moisture, such as droplet 136, is present on outer surface 130 or inner surface 132, total reflection between outer surface 130 and inner surface 132 is impaired, permitting exiting ray 144. This decreases reflected radiation 108 received by moisture light sensor 110. Moisture light sensor 110 outputs discrete light signal 112 indicating the intensity of reflected radiation 108.

Input coupler 140 and output coupler 142 may be designed to reduce the effect of ambient light 116 reaching moisture light sensor 110. In particular, reflective and refractive surfaces on coupler 140, 142 serve to direct reflected radiation 108 into moisture light sensor 110 and direct ambient light 116 away from moisture light sensor 110. Flanges, baffles, shields, and the like may also block ambient light 116. Couplers may further be designed to prevent spurious reflected radiation from layers within window 100. Various designs for couplers 140, 142 are well known in the art.

The designs represented by FIGS. 42 and 43 may be combined in a single device to provide greater sensitivity to moisture and to permit detecting moisture on both outer surface 130 and inner surface 132. For use in detecting moisture on windshield 30, light emitter 104 and moisture light sensor 110 are preferably mounted to monitor moisture in a region of windshield 30 wiped by windshield wipers 38. Mounting locations include within or beside the interior rearview mirror mounting foot or just above the dashboard.

Figure 44:
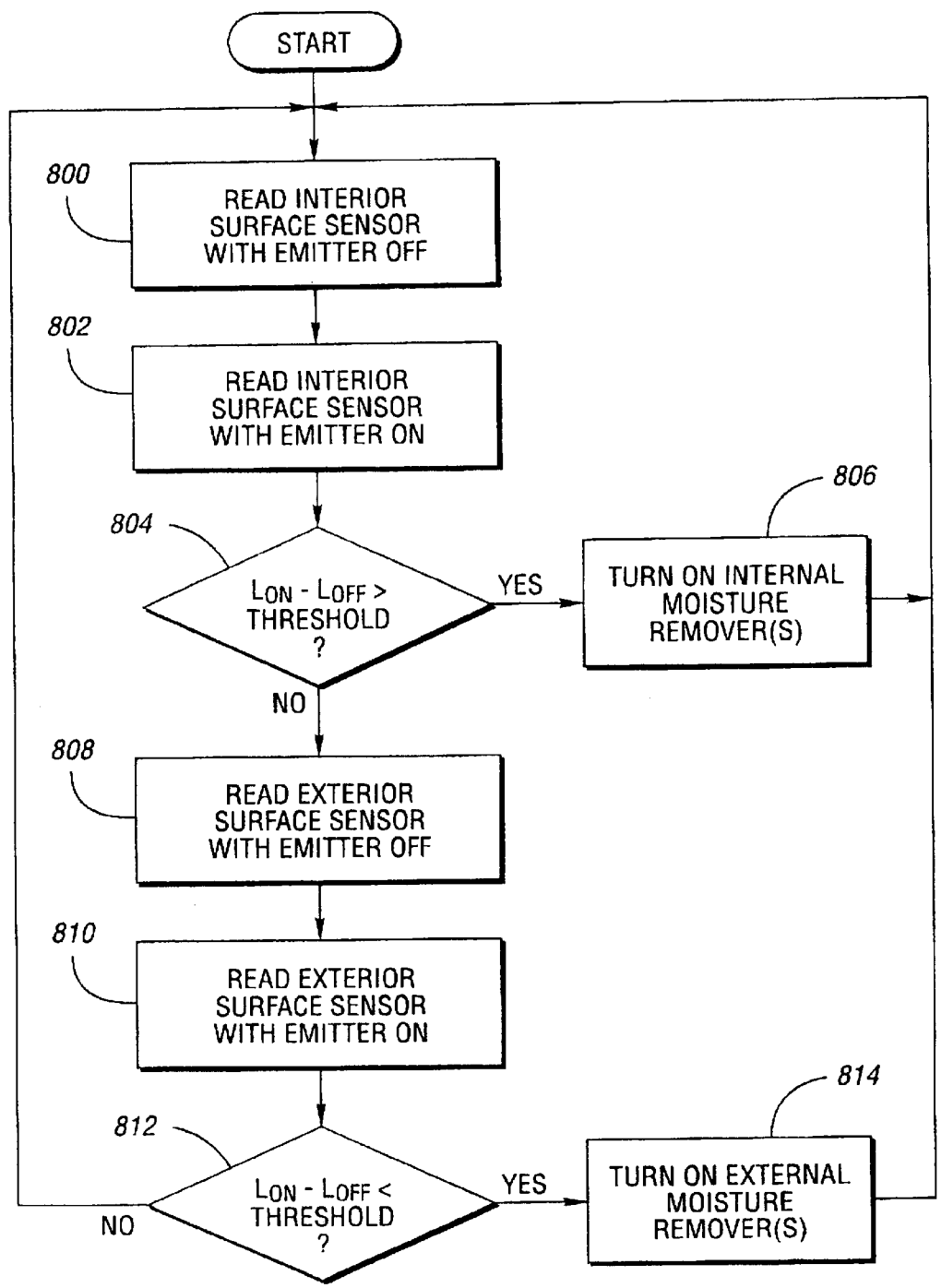
FIG. 44 is a flow diagram illustrating operation of control logic for automatically removing moisture from a vehicle window.

Referring now to FIG. 44, a flow diagram illustrating operation of control logic for automatically removing moisture from a vehicle window is shown. Operations may be executed using control logic 66 as described above or similar circuitry. The present invention transcends any particular implementation and aspects are shown in sequential flow chart form for ease of illustration.

Moisture light sensor 110a is read with light emitter 104 switched off to obtain a level of ambient light 116 in block 800. Emitter 104 is activated and light sensor 110a is read a second time to determine the amount of reflected radiation 108a from interior surface 132 in block 802. In an embodiment, the integration period for the second reading is based on the level of ambient light obtained in block 800, such that the brighter the previous ambient light measurement, the shorter the integration period used in the current measurement. In another embodiment, the intensity of emitted radiation 106 from emitter 104 is modified based on the level of light determined in block 800. The level of intensity of emitted radiation 106 may be controlled by using a pulse width modulated voltage for emitter signal 118.

Light signal 112a produced with emitter 104 turned on is compared to light signal 112a produced with emitter 104 turned off in block 804. If the difference between light signal 112a produced with emitter 104 on and light signal 112a produced with emitter 104 off exceeds an interior surface threshold, one or more means for removing moisture from interior window surface 132 are turned on in block 806. If the difference is not greater than the interior surface threshold, a check is made to determine if means for removing moisture from exterior window surface 130 should be activated beginning with block 808.

In an embodiment of the present invention, the interior surface threshold, which can be a calibrated value, is based on the level of ambient light 116 obtained in block 800. In another embodiment, two thresholds are used. In addition to the interior surface threshold, a second, greater threshold is used to determine if a check should be made after activating the means for removing moisture 38 from exterior window surface 130. If reflected radiation 108a is too great, excessive moisture is present on inside surface 132, and an accurate reading of the moisture on outer surface 130 cannot be obtained. If the level of reflected radiation 108a is between the two thresholds, the means for removing moisture from interior window surface 132 is activated and then a check is made whether to activate means for removing moisture from exterior window surface 130.

Moisture light sensor 110 is read with light emitter 104 switched off to obtain a level of ambient light 116 in block

808. Emitter 104 is activated and light sensor 110 is read a second time to determine the amount of reflected radiation 108 from exterior surface 130 in block 810. In an embodiment, the integration period for the second reading is based on the level of ambient light obtained in block 808. In another embodiment, the intensity of emitted radiation 106 from emitter 104 is modified based on the level of ambient light 116 obtained in block 808 and on the level of reflected light 108a detected by light sensor 110a.

Light signal 112 produced with emitter 104 on is compared to light signal 112 produced with emitter 104 off in block 812. In a preferred embodiment, the configuration of emitter 104 and light sensor 110 described above is used. Hence, if the difference between light signal 112 produced with emitter 104 on and light signal 112 produced with emitter 104 off is less than an exterior surface threshold, means for removing moisture from exterior window surface 130 are turned on in block 814. The check for activating means for removing moisture from interior window surface 132 beginning with block 800 is then repeated.

In an embodiment, the comparison of block 812 includes the level of reflected radiation 108a off inner surface 132. This is because reflected radiation 108 can be no greater than emitted radiation 106 less reflected radiation 108a. In another embodiment, the exterior threshold is based on the level of ambient light 116 obtained in block 808.

Many other algorithms for determining the presence of moisture on a window of vehicle 20 may be used within the spirit and scope of the present invention. Some of these algorithms are described in U.S. Pat. No. 5,796,106 to Noack; U.S. Pat. No. 5,386,111 to Zimmerman; U.S. Pat. No. 5,276,389 to Levers; U.S. Pat. No. 4,956,591 to Schierbeek et al.; U.S. Pat. No. 4,916,374 to Schierbeek et al.; U.S. Pat. No. 4,867,561 to Fujii et al.; U.S. Pat. No. 4,859,867 to Larson et al.; U.S. Pat. No. 4,798,956 to Hochstein; U.S. Pat. No. 4,355,271 to Noack; and U.S. Pat. No. RE. 35,762 to Zimmerman.

A moisture detection system may use emitter 104 having a principal emission band across any of the visible or invisible light spectrum. Moisture light detector 110 must be constructed based on the desired spectrum emitted by emitter 104. A preferred spectrum is weighted to the infrared range. Consequently, no filtration may be required for moisture light detector 110, 110a. Alternatively, a filter that limits non-infrared light may be used for the moisture detector.

Figure 45:
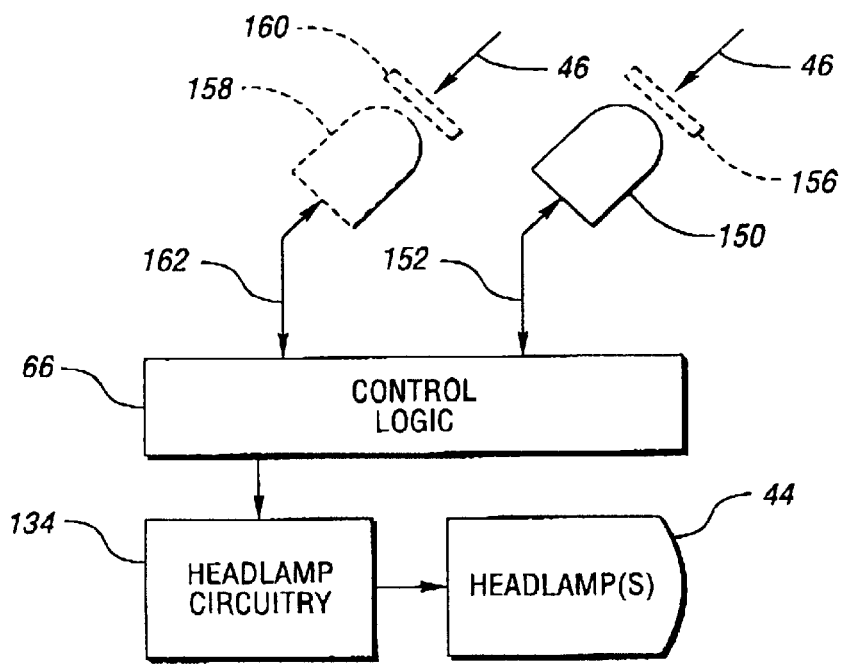
FIG. 45 is a block diagram illustrating circuitry for controlling headlamps.
Figure 48:
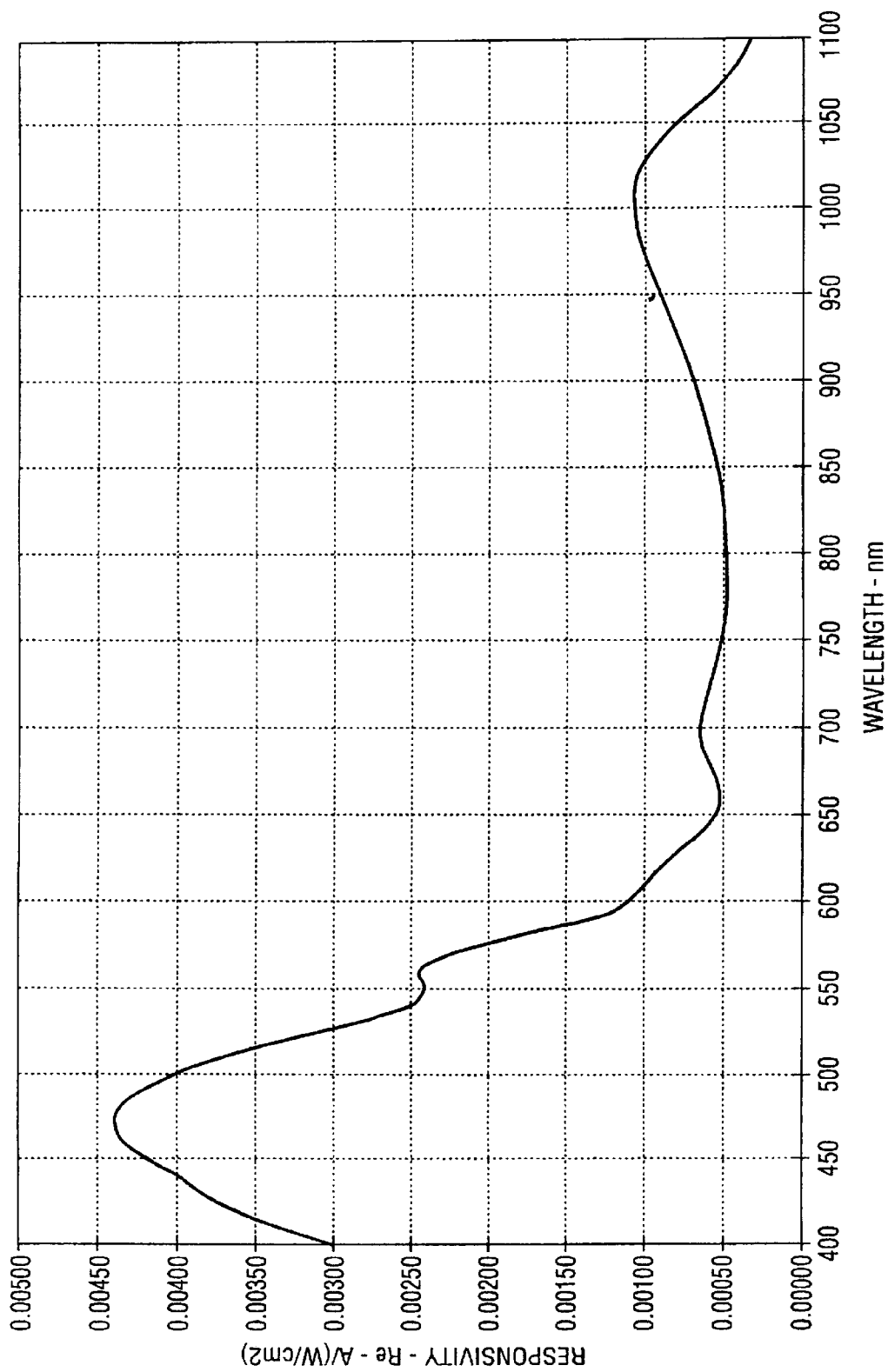
FIG. 48 is a chart illustrating wavelength responsivity of a filter that can be advantageously utilized for the headlight dimmer sky sensor.

Referring now to FIG. 45, a system for controlling headlamps is shown. Skyward ambient light sensor 150 is mounted to view light illuminating the view seen by operator 22. Preferably, skyward ambient light sensor 150 is positioned to receive skyward ambient light 46 from an area generally above and in front of vehicle 20. Skyward ambient light sensor 150 generates skyward ambient light signal 152 based on the amount of light incident on skyward ambient light sensor over an integration period. The integration period may be advantageously varied according to the control signal of FIG. 7. Control logic 66 uses skyward ambient light signal 152 to activate headlamp control circuitry 154 activating one or more headlamps 44. Preferably, ambient light filter 156 filters skyward ambient light 46 reaching skyward ambient light sensor 150 to attenuate infrared components of skyward ambient light 46. The filter characteristics of the ambient light filter 156 are shown in FIG. 48. As can be seen from FIG. 48, the filter has a peak response at approximately 475 nm. Such a filter will be highly sensitive, capable of detecting light under both cloudless and cloudy conditions. Alternatively, the filter may be selected to provide the light sensor 150 with a spectral response similar to photopic response curve 610. The filter should at least attenuate infrared light to be input to sensor 150.

An advantageous embodiment permits compensating for weather conditions in determining the state for headlamps 44. This is accomplished using a second skyward ambient light sensor 158 with ambient light filter 160 generating skyward ambient light signal 162 for control logic 66 is included. In this embodiment, the ambient light filters 156, 160 attenuate different portions of skyward ambient light 46. As examples, one filter may be cyan and the other red or one may be blue and the other near infrared. Since the spectral composition of skyward ambient light 46 is different on clear days than on cloudy days, the ratio of the incident light represented by ambient light signals 152 and 162 will give an indication of the type of day. Thresholds for determining the state of headlamps 44 can then be varied based on the determined ratio.

Figure 46:
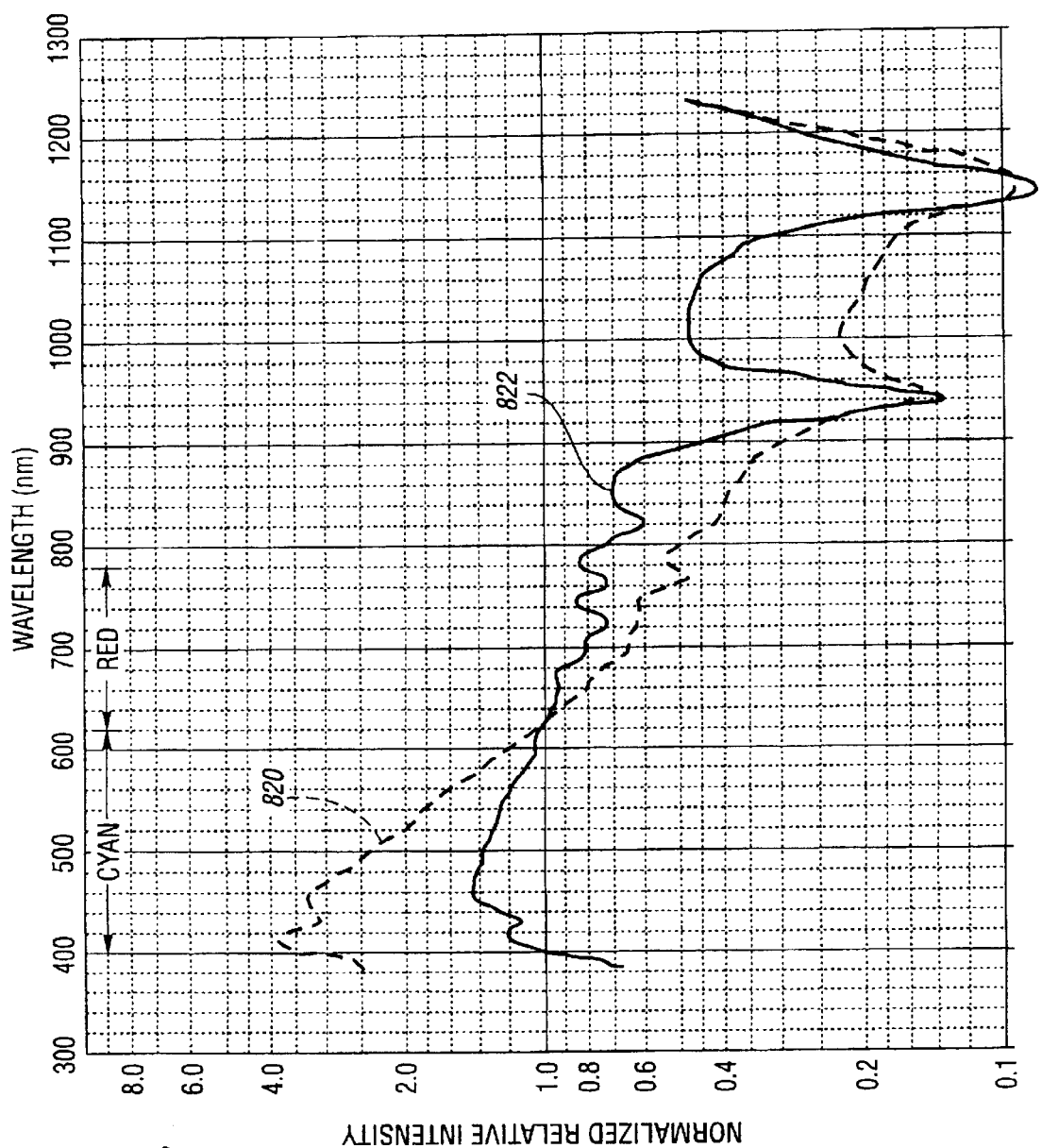
FIG. 46 is a graph illustrating the differences in the spectral content of ambient light on a cloudy day and ambient light on a clear day.

Referring now to FIG. 46, a graph illustrating the differences in the spectral content of ambient light on a cloudy day and ambient light on a clear day is shown. The spectral characteristics of skyward ambient light 46 vary depending on weather conditions. A typical cloudless day may have a spectrum, normalized to a relative intensity of 1.0 at 620 nm, as shown by curve 820. A typical cloudy day may have a spectrum, normalized to a relative intensity of 1.0 at 620 nm, as shown by curve 822. Comparing curves 820 and 822 shows that clear days have a significantly blueish spectrum as compared to cloudy days. Since vehicle operator 22 perceives dim ambient light 46 from a cloudless sky as being brighter than ambient light 46 of a similar intensity from a cloudy sky, this difference in spectral composition may be used to modify the one or more thresholds used to control vehicle headlamps 44.

Figure 47:
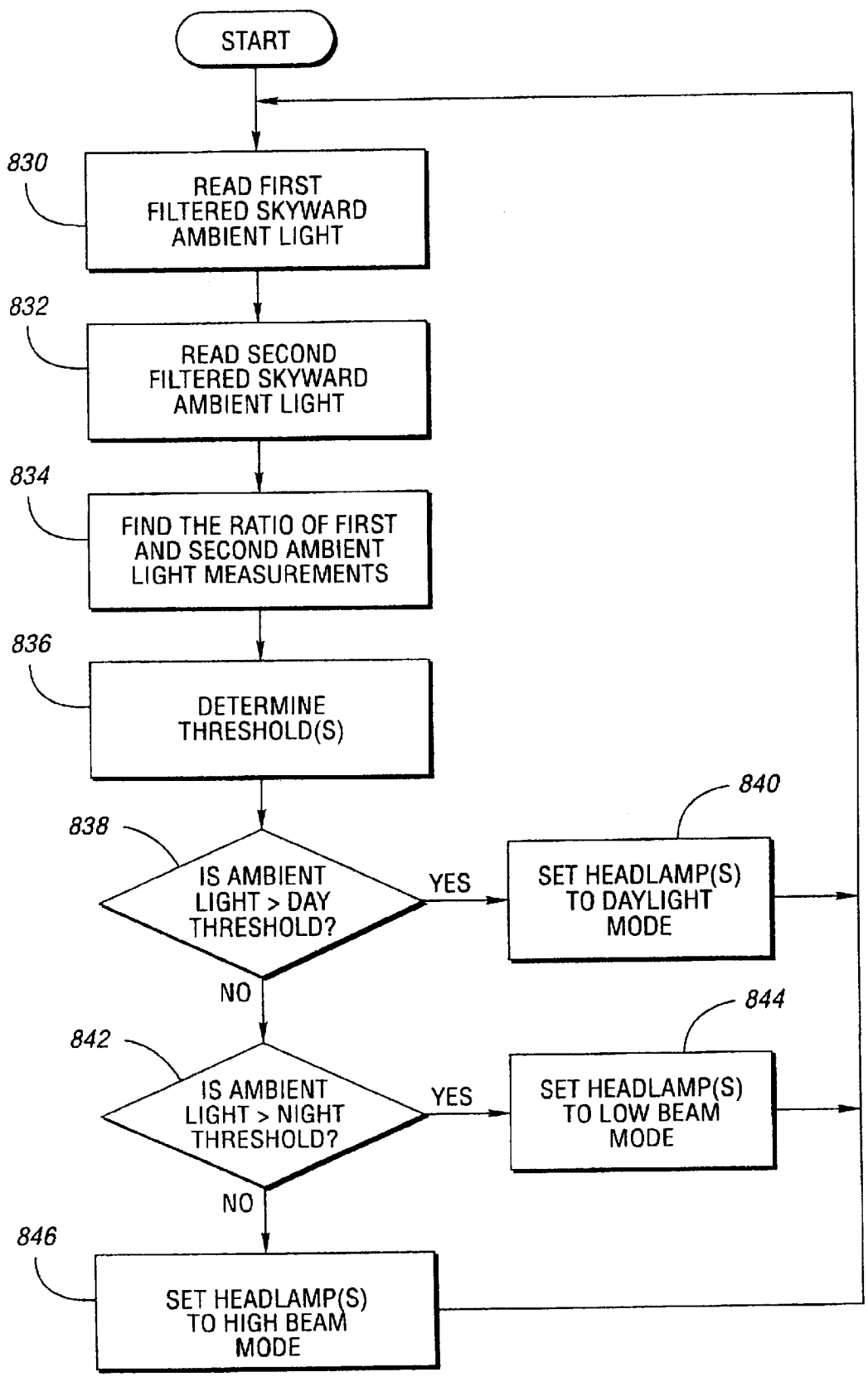
FIG. 47 is a flow diagram illustrating operation of control logic for automatically controlling vehicle headlamps.

Referring now to FIG. 47, a flow diagram illustrating operation of control logic for automatically controlling vehicle headlamps is shown. Operations may be executed using control logic 66 as described above or similar circuitry. The present invention transcends any particular implementation and aspects are shown in sequential flow chart form for ease of illustration.

Skyward ambient light 46 is read using skyward ambient light sensor 150 in block 830. Skyward ambient light 46 is read using skyward ambient light sensor 158 in block 832. Light sensors 150, 158 filter ambient light 46 through filters 156, 160 respectively. The spectral characteristics of filters 156, 160 are chosen so that ambient light 46 detected by light sensor 150 is bluer than ambient light 46 detected by light sensor 158. This may be accomplished, for example, by using cyan filter 156 and red filter 160, blue filter 156 and infrared filter 160, or the like. Filters 156, 160 may be incorporated into light sensors 150, 158 or may be separate elements as described above.

The relative cloudiness is estimated in block 834. In particular, the ratio of the outputs from light sensors 150, 158 may be obtained to indicate the relative blue content of ambient light 46. This ratio is used to determine one or more thresholds in block 836. Each threshold is used as a basis of comparison to determine control of headlamps 44. It is envisioned that the value may be calibrated. Calibration as used in this application, can refer to a sensor or a threshold being calibrated using a coefficient value stored in microcontroller 66, read only memory, electronically erasable read-only memory, or the like, during manufacture, which coefficient value can represent the ratio of a standard value to an actual measurement for a subject sensor exposed to known light levels measured in a tester prior to, or after, being installed in a circuit. It is envisioned that the control logic 66 will obtain thresholds from a look-up table, although they may be calculated using a formulae, or a combination of a look-up table and a formula.

The level of ambient light 46 is compared against a day threshold in block 838. If the intensity of ambient light 46 is greater than the day threshold, headlamps 44 are set to daylight mode. This may be turning headlamps 44 off or setting headlamps 44 on at a daylight running intensity. The output of either of light sensors 150, 158 may be used in the comparison. In an alternative embodiment, a daylight threshold is calculated for each light sensor 150, 158, with daylight running mode set if the intensity measured by either sensor 150, 158 exceeds its threshold. In another embodiment, daylight running mode is set if the output from both sensors 150, 158 exceeds their respective thresholds.

If the level of ambient light 46 is less than the day threshold, a comparison is made with the night threshold in block 842. If the level of ambient light 46 is greater than the night threshold, headlamps 44 are set to low beam mode in block 844. If not, headlamps 44 are set to high beam mode in block 846. While the headlamp control system described by FIG. 44 shows three states for headlamps 44, one of ordinary skill in the art will recognize that the present invention may be used in other systems, including dual state headlamps 44 and continuously variable headlamps 44.

It is further envisioned that a skyward sensor 150 and/or 158 can be used in combination with forward sensor 58 to detect a condition under which the headlights should be turned on without delay. For example, when vehicle 20 enters a tunnel. It is desirable for the headlights to turn ON immediately upon the sky sensor detecting a night condition, as opposed to subjecting the change to a delay, when entering a tunnel. A tunnel can be detected using a sky ambient light sensor looking through a lens with a narrow focus and the forward sensor looking through a lens with a broad focus. For such an embodiment, 156 (FIG. 7) can comprise a lens providing a narrow focus for sky sensor 150 and 68 can comprise a lens providing a wide field of view for sensor 58. It is envisioned that the lenses could be incorporated into the encapsulant shapes of the sensor or provided by discrete lenses positioned in front of the sensors to control the field of view for the sensors. When the forward sensor 58 detects a darker image than the sky sensor 150, the control unit may anticipate a tunnel. Under such conditions, as soon as the sky sensor detects night conditions, the headlights will turn ON with no delay or a very short delay, such as a delay of 1–2 seconds. Under other conditions, such as where the forward sensor 58 detects light, it is may be desirable for the system to delay for 10–30 seconds turning the headlights ON so that the headlights do not flash ON and OFF.

In particular, in one embodiment, a high threshold and a low threshold are used for the sky sensor. The forward ambient light sensor 58 can be used for selecting the timing adjustments such that the delay for changing the headlight state is dependent upon the forward measurement through light sensor 58. The short delay for transitioning from OFF to ON can be 1 second, such that if the sky sensor 150 measurement drops below the low threshold for more than 1 second, the headlights will turn ON. The long delay for transitioning the headlight from OFF to ON can be 15 seconds, such that if the sky sensor 150 measurement drops below the low threshold for more than 15 seconds, the headlights will turn ON. The short delay for transitioning from ON to OFF can be five seconds, such that if the sky sensor 150 measurement is above the high threshold for more than five seconds, the headlights will turn OFF. The long delay for transitioning from ON to OFF can be 15 seconds, such that if the sky sensor 150 measurement remains above the high threshold for more than 15 seconds, the headlights will turn OFF. The ON short period will be initiated when the forward sensor 58 detects darkness while the sky ambient sensor detects light conditions and the lights are OFF. The OFF short period will be initiated when the forward sensor 58 detects daylight conditions while the sky sensor detects night conditions and the lights are ON. The long delays can be used for other conditions. Headlights ON refers to nighttime lights (e.g., high or low beams) and headlights OFF refers to daylight lights (e.g., no headlights or daylight running lights). The low threshold can correspond to 1300 to 1500 lux seen by the sky sensor. The high threshold can correspond to 1800 to 2100 lux seen by the sky sensor. The ratio of the high to low thresholds can be 1.3 to 1.5. It is further envisioned that if either the forward sensor 58 or sky sensor 150 detects a light level below a very low level, such as 40 to 100 lux, the headlamps will switch on without significant delay regardless of any other sensed conditions. It is also envisioned that the time periods described herein can be proportional to the vehicle's speed, such that the faster the vehicle is traveling, the shorter will be the delays.

Figure 2:
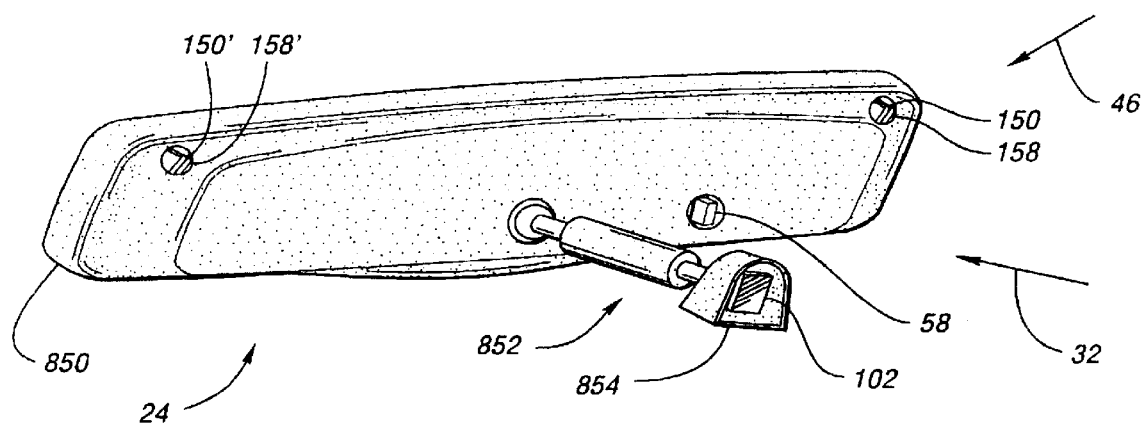
FIG. 2 is a top, rear perspective view of a rearview mirror including a forward ambient hight sensor and a skyward ambient light sensor.

As illustrated in FIG. 2, the mirror can include skyward sensors 150, 158 on one end of mirror 24 and skyward sensors 150', 158' on the other end of the mirror. It will be recognized that cars are manufactured for drivers on either right side or left side of the vehicle depending upon the country where the vehicle will be sold. The optional provision of two sets of sensors will result in one set being positioned on the end of the mirror closest to the window regardless of whether the mirror is installed in a vehicle having right side or left side driver operation. In operation, the control logic 66 will monitor the outputs from sensors 150, 150' 158, 158' to determine which of the light sensors is collecting more light in high ambient light conditions while the vehicle is traveling at a relatively high speed. The side of the mirror containing the sensors with the highest light output will be used for the ambient sky sensors. The other light sensor outputs will not be used as the vehicle roof will shade them. In this manner the vehicle can automatically detect whether the mirror is angled for a driver on the right or left side of the vehicle.

The use of cylindrical light sensor 170' to implement the glare sensor 62 orientated with the longitudinal axis horizontal provides significant advantages for the automatic control of the electrochromic mirror. The lens radius r (FIG. 26*a*) for this sensor can for example be 1.25 mm, producing a focal distance f of 2.5 mm, and the distance d between the exposed surface of the light transducer and the tip of the light sensor encapsulant can be 2.15 mm. The glare sensor 62 encapsulant can be transparent, having no diffusant therein. In particular, with the glare sensor positioned in the rearview mirror housing such that the longitudinal axis of the cylindrical lens is oriented horizontally, a wide horizontal viewing angle is achieved.

Figure 49:
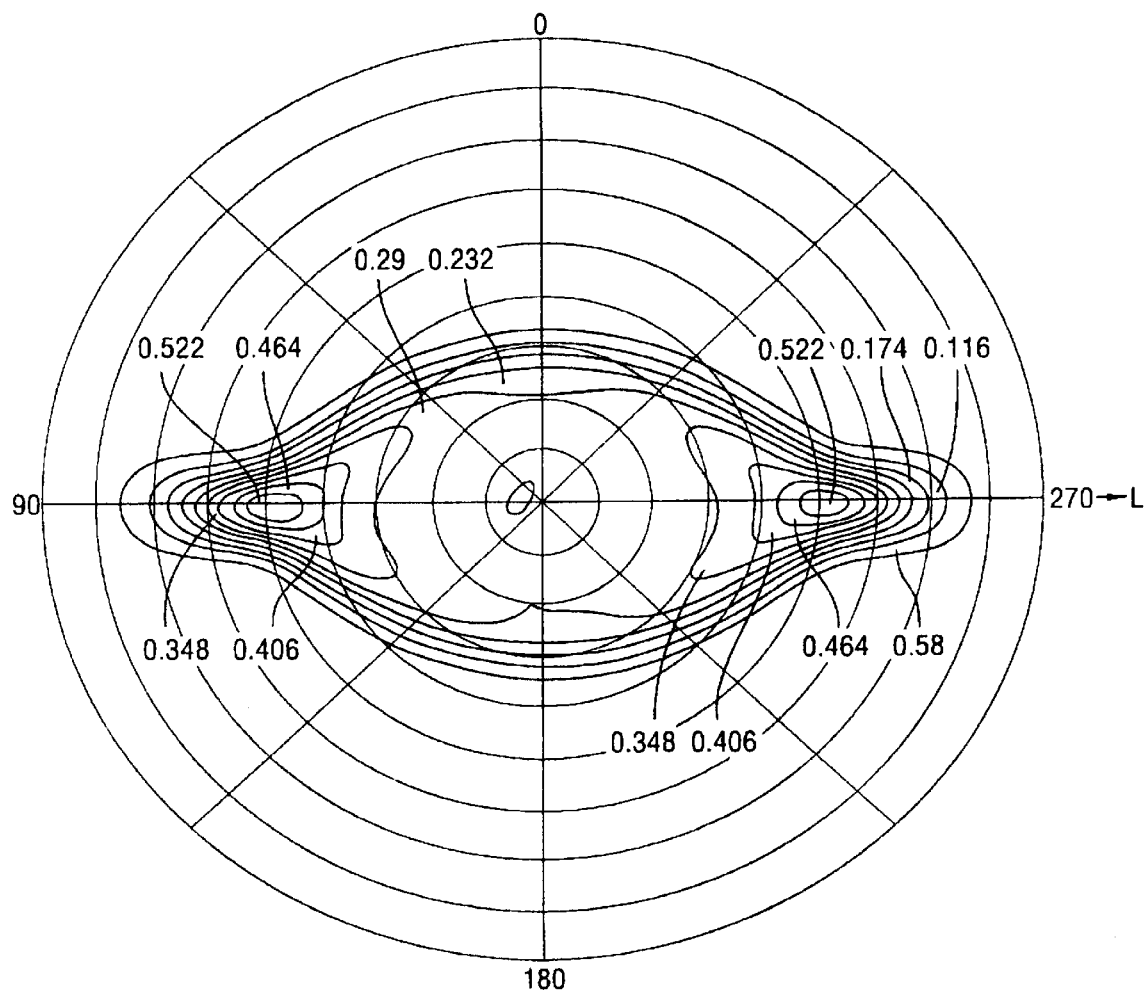
FIG. 49 is a polar iso-candela plot of the light sensor according to FIGS. 26 and 26a having a cylindrical lens.
Figure 50:
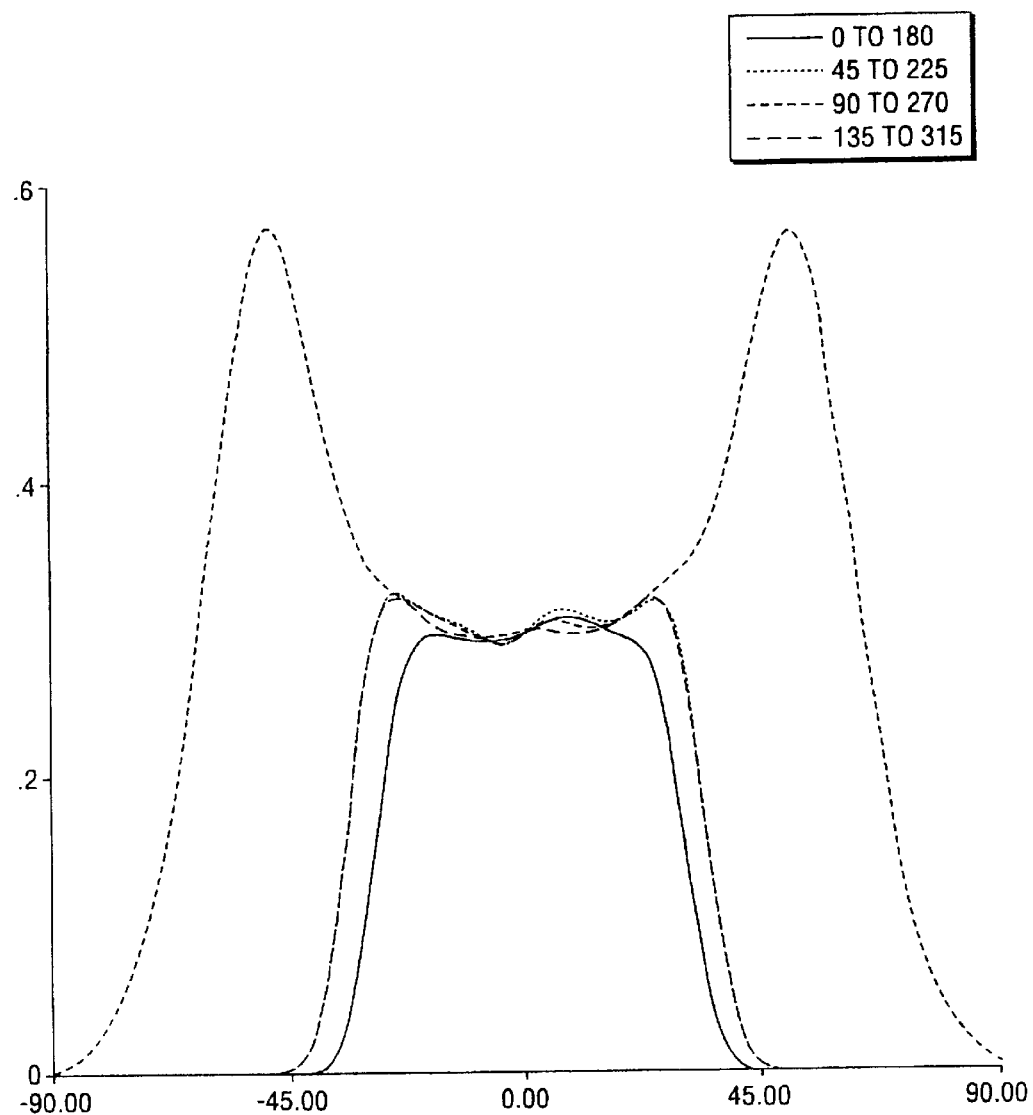
FIG. 50 is a rectangular iso-candela plot according to FIG. 49 viewed orthogonally to the longitudinal axis of the cylindrical lens.

Of particular advantage is the off axis light sensitivity distribution of the lens 170', which is shown in FIG. 49. In FIG. 49, the center axis corresponds to the center of the transducer region 532. As can be seen, the cylindrical lens has high off-axis sensitivity along its longitudinal axis. This is better illustrated in the rectangular view of the sensitivity curve, shown in FIG. 50. The peak off-axis sensitivity occurs at an angle of approximately 50. This characteristic can be used to improve detection of light from a passing vehicle which is of particular interest when the inside mirror controls the outside mirror. In particular, a passing vehicle's headlights will be off axis from the glare sensor located in the interior rearview mirror 24 even though it is shinning on the exterior rearview mirror 26. A conventional glare sensor located on the interior mirror will detect diminished light from the passing vehicle, and thus increase the mirror reflectance, when the lights from the passing vehicle no longer shines directly through the rear window. The improved glare sensor 170' has increased sensitivity to off-axis light, and thus will be increasingly sensitive to lights within viewing angle β. Thus, the reduced reflectivity of mirror 26 will be maintained until the passing vehicle headlights are no longer visible to operator 22 through mirror 26. Those skilled in the art will recognize that the off axis distribution of the light sensors can be significantly reduced by adding a diffusant or diffusing projections to the encapsulant, which is preferably done if the cylindrical lens sensor is used to implement ambient sensors 58, 150, 150', 158, 158'.

In addition to separately controlling headlamps 44, automatic dimming of mirrors 24, 26, and various means for removing moisture from windows such as wipers 38, defogger 40, defroster 42, and the like, benefit may be achieved by combining light sensors 170 and control logic 66 from different applications. For example, control logic 66 can control the state of headlamps 44 based on the level of light detected by at least one sky ambient light sensor 150, 158. Control logic 66 may also control dimming of at least one rearview mirror 24, 26 based on levels of light detected by forward ambient light sensor 58 and glare light sensor 62. Control logic 66 may then also turn ON headlamps 44 when the level of light detected by forward ambient light sensor 58 is below a threshold level. This would turn ON headlamps 44 in situations such as tunnels or extended overpasses when overhead lighting may provide sufficient light detected by sky ambient light sensor 150, 158 to turn headlamps 44 off, but the area in front of vehicle 20 is relatively dimly lit.

In another example, control logic 66 determines the amount of moisture on a cleared area of a window of vehicle 20, such as windshield 30 or rear window 36, based on the output from at least one moisture sensor 102. Control logic 66 controls means for removing moisture 38, 40, 42 based on the determined amount of moisture. Control logic 66 further controls the dimming of rearview mirror 24, 26 based on the amount of moisture and the levels of light detected by forward ambient light sensor 58 and glare light sensor 62. This would permit control logic 66 to undim mirror 24, 26 if a window through which light was received by forward ambient light sensor 58 or glare light sensor 62 was covered by moisture such as frost, snow, fog, and the like. Also, for a window cleaned by wipers 38, readings from forward ambient light sensor 58 or glare light sensor 62 may be ignored during intervals when one of the wipers 38 passes in front of light sensor 58, 62.

In still another example where control logic 66 determines the amount of moisture on a cleared area of a window of vehicle 20 and controls means for removing moisture 38, 40, 42, the control of headlamps 44 may be based on detected moisture as well as the level of light detected by one or more sky ambient light sensors 150, 158. Again, this would permit control logic 66 to set headlamps 44 to a predetermined state if a window through which light was received by forward skyward light sensor 150, 158 was covered by moisture. Also, for a window cleaned by wipers 38, readings from skyward ambient light sensor 150, 158 may be ignored during intervals when one of the wipers 38 passes in front of light sensor 150, 158.

The present invention may be readily adapted to controlling other equipment on vehicle 20 besides or in addition to headlamps 44, automatic dimming of mirrors 24, 26, and various means for removing moisture from windows 38, 40, 42. For example, electrically powered windows, sunroofs, moon roofs, convertible tops, and the like may be automatically closed when moisture such as rain is detected. Also, various lighting in addition to headlamps 44, such as running lights, park lights, puddle lights, courtesy lights, dashboard lights, and the like may be automatically controlled based on one or more of ambient lighting conditions, the detection of moisture, the running state of vehicle 20, and the like. The state of passenger compartment heating and cooling systems, including air conditioning, heater, vent positions, windows, and the like may be automatically controlled based on one or more of ambient lighting conditions, the detection of moisture, the running state of vehicle 20, internal temperature, external temperature, and the like.

Control logic 66 for receiving light signals 164 from multiple light sensors 170 and generating control signals 166 for equipment of vehicle 20 may be in one housing or may be distributed throughout vehicle 20. Elements of control logic 66 may even be included within light sensors 170. Elements of control logic 66 may be interconnected through a variety of means including discrete wiring, buses, optical fiber, radio, infrared, and the like. Control logic 66 may comprise many cooperating processors or a single multi-tasking processor. Operations may be implemented in software, firmware, custom hardware, discrete logic, or any combination. The present invention does not depend on the method or means of implementing control logic 66.

It is envisioned that outside fog of the type requiring activation of front and/or rear fog lights could be automatically detected using a reflected light detection system substantially similar to that provided for the moisture detector. To detect such outside fog, a light source and sensor are spaced by a distance such that light from the emitter that will be detected by the sensor is reflected from a point several meters from the vehicle. Under circumstances where the detected reflected light level is substantially constant, and greater than a threshold level, and continuously detected over a substantial period of time, front and/or rear vehicle fog lamps can be turned on automatically.

Thus it can be seen that improved equipment control system is disclosed. The system is easier to manufacture since variations in the performance of the light sensors can be compensated for in the microcontroller. The mirror is readily manufacturable by automated means. Additionally, the system can be provided at a lower cost as low cost control logic can be utilized. The system reliably detects light over a wide light range and with significantly reduced temperature dependence.

While embodiments of the invention have been illustrated and described, it is not intended that these embodiments illustrate and describe all possible forms of the invention. Rather, it is intended that the following claims cover all modifications and alternative designs, and all equivalents, that fall within the spirit and scope of this invention.

What is claimed is:

1. A system for automatically controlling equipment in an automotive vehicle, each piece of vehicle equipment controlled by an equipment control signal, the system comprising:

at least one semiconductor light sensor, each semiconductor light sensor operative to output a discrete light signal based on light incident over a variable integration period; and a control logic in communication with the vehicle equipment and the at least one semiconductor light sensor, the control logic operative to generate at least one equipment control signal based on the discrete light signal, wherein the at least one light sensor comprises:
a light transducer exposed to light, the light transducer operative to accumulate charge in proportion to light incident over the integration period; and
a sensor logic in communication with the exposed light transducer, the sensor logic operative output the discrete light signal according to the accumulated exposed light transducer charge.

2. A system for automatically controlling vehicle equipment as in claim 1 wherein the at least one light sensor further comprises a light transducer shielded from ambient light, the shielded light transducer operative to accumulate charge in proportion to noise over the integration period, and wherein the sensor logic is farther operative to output the discrete light signal based on the difference between the measured accumulated exposed light transducer charge and the measured accumulated shielded light transducer charge.

3. A system for automatically controlling vehicle equipment as in claim 1, wherein the sensor logic is operative to
(a) determine the light integration period prior to beginning integration,
(b) reset the charge accumulated in the exposed light transducer at the beginning of the determined light integration period,
(c) measure the charge accumulated by the exposed light transducer over the determined light integration period, and
(d) output a pulse having a width based on the measured accumulated exposed light transducer charge.

4. A system for automatically controlling vehicle equipment as in claim 3 wherein the at least one light sensor further comprises a comparator with one input connected to the exposed light transducer and the other input connected to a switched capacitor circuit, the switched capacitor circuit operative to charge a capacitor to a fixed voltage when the switch is closed and to discharge the capacitor at a constant rate when the switch is open, wherein the sensor logic is further operative to close the switch during the determined light integration period and open the switch after the determined light integration period, thereby creating the pulse at the comparator output.

5. A system for automatically controlling vehicle equipment as in claim 4 wherein the at least one light sensor further comprises a second comparator with one input connected to a threshold voltage and the other input connected to the switched capacitor circuit, the second comparator output operative to inhibit output of the determined pulse if the capacitor voltage is less than the threshold voltage.

6. A system for automatically controlling vehicle equipment as in claim 3 wherein the at least one light sensor further comprises a light transducer shielded from ambient light, the shielded light transducer substantially similar to the exposed light transducer, the shielded light transducer operative to accumulate charge in proportion to noise over the integration period, wherein the sensor logic is further operative to:
reset the charge accumulated in the shielded light transducer at the beginning of the determined light integration period;
measure the charge accumulated by the shielded light transducer over the determined light integration period; and
output a pulse having a width based on the difference between the measured accumulated exposed light transducer charge and the measured accumulated shielded light transducer charge.

7. A system for automatically controlling vehicle equipment as in claim 1, wherein the at least one light sensor further comprises an enclosure having a window for receiving light, the light transducer being an exposed light transducer disposed within the enclosure, the exposed light transducer operative to accumulate charge in proportion to light received through the window incident on the exposed light transducer and wherein the sensor logic being disposed within the enclosure, the sensor logic in communication with the exposed light transducer, the sensor logic operative to receive an integration signal and to output a light signal based on the light incident on the exposed light transducer during a duration determined from the integration signal.

8. A system for automatically controlling vehicle equipment as in claim 1, wherein the at least one light sensor further comprises:
an enclosure having a window for receiving light, the enclosure admitting a power pin, a ground pin, and a signal pin;
the light transducer being an exposed light transducer disposed within the enclosure, the exposed light transducer operative to accumulate charge in proportion to light received through the window incident on the exposed light transducer;
a light-to-pulse circuit disposed within the enclosure and in communication with the exposed light transducer, the power pin, and the ground pin, the light-to-voltage circuit operative to output an output pulse, the output pulse width based on charge accumulated by the exposed light transducer over an integration period; and
the sensor logic disposed within the enclosure, the sensor logic in communication with the light-to-pulse circuit, the power pin, the ground pin, and the signal pin, the sensor logic operative to:
(a) receive an integration pulse on the signal pin,
(b) determine the integration period based on the width of the integration pulse, and
(c) output the output pulse on the signal pin.

9. A system for automatically controlling vehicle equipment as in claim 8 wherein the control logic comprises at least one signal pin connected to the signal pin of the at least one light sensor, the control logic further operative to:
set the control logic signal pin to output mode;
determine an integration period;
generate an integration pulse on the control logic signal pin, the width of the integration pulse based on the determined integration period;
set the control logic signal pin to input mode;
receive the at least one light sensor output pulse; and
determine a light level received by the at least one light sensor based on the light sensor output pulse.

10. A system for automatically controlling vehicle equipment as in claim 1 further comprising:
a housing operative to be positionally adjusted relative to the vehicle, the housing containing at least one of the at least one semiconductor light sensor; and
a mirror disposed within the housing, the mirror permitting a vehicle operator to view a scene generally behind the vehicle.

11. A system for automatically controlling vehicle equipment as in claim 1, wherein the at least one light sensor comprises:

a lens operative to focus light from a viewing area, the discrete light signal based on the intensity of the focused light; and an adhesive film disposed on the lens, the adhesive film operative to filter out components of the focused light.

12. A system for automatically controlling vehicle equipment as in claim 1, wherein the vehicle equipment comprises at least one headlamp and wherein the at least one light transducer comprises at least one ambient light sensor positioned to receive light generally in front of and above the vehicle.

13. A system for automatically controlling vehicle equipment as in claim 12 wherein the at least one ambient light sensor restricts the amount of light collected from an angle generally beneath the horizon.

14. A system for automatically controlling vehicle equipment as in claim 13 wherein the at least one ambient light sensor comprises at least one from a set including an asymmetric lens and a housing to restrict the collected light.

15. A system for automatically controlling vehicle equipment as in claim 12 wherein the at least one ambient light sensor comprises an infrared filter.

16. A system for automatically controlling vehicle equipment as in claim 15 wherein the infrared filter comprises a film adhered to the at least one light sensor.

17. A system for automatically controlling vehicle equipment as in claim 1, wherein the vehicle equipment comprises a rearview mirror, the mirror comprising a dimming element having a variably reflective surface, the degree of reflectivity based on the equipment control signal, and wherein the at least one semiconductor light sensor is at least one from a set including an ambient light sensor positioned to receive light generally in front of the vehicle and a glare sensor positioned to view a scene generally behind a vehicle operator.

18. A system for automatically controlling vehicle equipment as in claim 17 wherein the glare sensor comprises a glare lens providing the glare sensor with a narrower field of view than the field of view of the ambient light sensor, the glare lens further providing the glare sensor with a higher optical gain than the optical gain of the ambient light sensor.

19. A system for automatically controlling vehicle equipment as in claim 17 wherein the dimming element is an electrochromic element.

20. A system for automatically controlling vehicle equipment as in claim 19 wherein the control logic generates the equipment control signal as a constant voltage between transition points, the time between adjacent transition points being a fixed transition period, wherein, at each transition point, the control logic outputs a high voltage if an actual electrochromic element input voltage is less than a desired electrochromic element input voltage and outputs a low voltage otherwise.

21. A system for automatically controlling vehicle equipment as in claim 20 wherein the control logic comprises a low pass filter operative to filter the equipment control signal to produce the actual electrochromic element input voltage.

22. A system for automatically controlling vehicle equipment as in claim 20 further comprising a switch connected across the electrochromic element, the control logic further operative to close the switch when the actual electrochromic element input voltage exceeds the desired electrochromic element input voltage by more than a preset amount.

23. A system for automatically controlling vehicle equipment as in claim 17 wherein the control logic is operative to:
determine an ambient light level based on the ambient light sensor signal; and
determine an ambient light sensor integration period based on the ambient light level.

24. A system for automatically controlling vehicle equipment as in claim 17 wherein the control logic is operative to:
determine an ambient light level based on the ambient light sensor signal; and
determine a glare sensor integration period based on the ambient light level.

25. A system for automatically controlling vehicle equipment as in claim 17 wherein the control logic is operative to:
determine an ambient light level based on the ambient light sensor signal;
obtain the ambient light level as a binary number;
determine a first binary number portion based on the bit position of the most significant binary one in the ambient light level binary number;
determine a second binary number portion based on the bit pattern following the most significant binary one in the ambient light level binary number;
determine as the ambient light level binary logarithm as the concatenation of the first binary number portion and the second binary number portion; and
determine a glare sensor integration period based on the binary logarithm of the ambient light level.

26. A system for automatically controlling vehicle equipment as in claim 1, wherein the vehicle equipment is at least one of a set comprising an electrochromic mirror, a window wiper, a window defogger, a window defroster, and a headlamp, the equipment control signal based on the detected presence of moisture, and wherein at least one semiconductor light sensor is positioned to receive light through a vehicle window.

27. A system for automatically controlling vehicle equipment as in claim 1, wherein the vehicle equipment is at least one of a set comprising an electrochromic mirror, a window wiper, a window defogger, a window defroster, and a headlamp, the equipment control signal based on the detected presence of moisture, and wherein at least one semiconductor light sensor is positioned to receive light from a light emitter directed at a vehicle window, the resulting light signal based on the presence of moisture on the window.

28. A system for automatically controlling vehicle equipment as in claim 27 wherein the light emitter emits light in the infrared range.

29. A system for automatically controlling vehicle equipment as in claim 27 wherein the presence of moisture causes an increase in the level of light received by the light sensor from the light emitter reflected off the vehicle window.

30. A system for automatically controlling vehicle equipment as in claim 27 wherein the presence of moisture causes a decrease in the level of light received by the light sensor from the light emitter reflected off the vehicle window.

31. A system for automatically controlling vehicle equipment as in claim 27 wherein the control logic is operative to detect an ambient light level.

32. A system for automatically controlling vehicle equipment as in claim 31 wherein the control logic is operative to generate an integration period based on the detected ambient light level.

33. A system for automatically controlling vehicle equipment as in claim 1, wherein the control of vehicle equipment is based on detecting the presence of moisture on a window having an inner surface and an outer surface, the system further comprising an emitter operative to emit light at the window, the at least one semiconductor light sensor comprising a light sensor positioned to receive light from the emitter reflected from the window outer surface.

34. A system for automatically controlling vehicle equipment as in claim 33 wherein the control logic is operative to:
- receive a first light signal from the light sensor with the emitter turned off;
- turn on the emitter;
- receive a second light signal from the light sensor; and
- determine the presence of moisture based on the first light signal and the second light signal.

35. A system for automatically controlling vehicle equipment as in claim 34 wherein the at least one semiconductor light sensor comprises a second light sensor positioned to receive light from the emitter reflected from the window inner surface, the control logic further operative to:
- receive a third light signal from the second light sensor with the emitter turned off;
- turn the emitter on;
- receive a fourth light signal from the second light sensor; and
- determine the presence of moisture on the inner surface based on the third light signal and the fourth light signal.

36. A system for automatically controlling vehicle equipment as in claim 1, wherein the at least one semiconductor light sensor is a plurality of light sensors, each light sensor detecting incident light within a target spatial distribution, the control logic generating the at least one equipment control signal independent of a mapping of the discrete light signal to an area within the target spatial distribution.

37. A system for automatically controlling equipment in an automotive vehicle, each piece of vehicle equipment controlled by an equipment control signal, the system comprising:
- at least one semiconductor light sensor, each semiconductor light sensor operative to output a discrete light signal based on light incident over a variable integration period; and
- a control logic in communication with the vehicle equipment and the at least one semiconductor light sensor, the control logic operative to generate at least one equipment control signal based on the discrete light signal,
- wherein the at least one light sensor is further operative to:
  - receive an integration pulse, the width of the integration pulse determining the integration period; and
  - generate an output pulse as the discrete output signal, the output pulse generated after receiving the integration pulse.

38. A system for automatically controlling vehicle equipment as in claim 37 wherein the difference in time between the end of the integration pulse and the start of the output pulse is indicative of the amount of thermal noise in the light sensor.

39. A system for automatically controlling vehicle equipment as in claim 38 wherein the control logic is further operative to disable automatic control of vehicle equipment if the amount of thermal noise exceeds a preset limit.

40. A system for automatically controlling vehicle equipment as in claim 38 wherein the control logic is further operative to disregard the discrete light signal if the output pulse is not within a predetermined range.

41. A system for automatically controlling equipment in an automotive vehicle, each piece of vehicle equipment controlled by an equipment control signal, the system comprising:
- at least one semiconductor light sensor, each semiconductor light sensor operative to output a discrete light signal based on light incident over a variable integration period; and
- a control logic in communication with the vehicle equipment and the at least one semiconductor light sensor, the control logic operative to generate at least one equipment control signal based on the discrete light signal wherein the control logic determines an integration period by cycling through a sequence of predetermined integration periods.

42. A system for automatically controlling equipment in an automotive vehicle, each piece of vehicle equipment controlled by an equipment control signal, the system comprising:
- at least one semiconductor light sensor, each semiconductor light sensor operative to output a discrete light signal based on light incident over a variable integration period; and
- a control logic in communication with the vehicle equipment and the at least one semiconductor light sensor, the control logic operative to generate at least one equipment control signal based on the discrete light signal,
- wherein the at least one light sensor has an input for receiving a light integration period signal specifying the light integration period, the control logic further operative to determine the light integration period based on at least one previously determined light level and to output the light integration period signal based on the determined light integration period.

43. A system for automatically controlling vehicle equipment as in claim 42 wherein the light integration period is based on an ambient light level measurement.

44. A system for automatically controlling equipment in an automotive vehicle, each piece of vehicle equipment controlled by an equipment control signal, the system comprising:
- at least one semiconductor light sensor, each semiconductor light sensor operative to output a discrete light signal based on light incident over a variable integration period; and
- a control logic in communication with the vehicle equipment and the at least one semiconductor light sensor, the control logic operative to generate at least one equipment control signal based on the discrete light signal,
- wherein the at least one light sensor has an input for receiving a light integration period signal specifying the light integration period and wherein the light signal is a pulse having a pulse width indicative of the light level, the control logic further operative to:
  - generate a sequence of integration period signals, each integration period signal in the sequence specifying a different light integration period; and
  - determine the light level based on a resulting light signal having a pulse width within at least one preset width threshold.

45. A system for automatically controlling equipment in an automotive vehicle, each piece of vehicle equipment controlled by an equipment control signal, the system comprising:
- at least one semiconductor light sensor, each semiconductor light sensor operative to output a discrete light signal based on light incident over a variable integration period, and
- a control logic in communication with the vehicle equipment and the at least one semiconductor light sensor, the control logic operative to generate at least one equipment control signal based on the discrete light signal, wherein the vehicle equipment comprises at least one headlamp and wherein the at least one semiconductor light sensor comprises a first ambient light sensor admitting light in a first band of frequencies and a second ambient light sensor admitting light in a second band of frequencies different than the first band of frequencies.

46. A system for automatically controlling vehicle equipment as in claim 45 wherein the control logic is further operative to determine a first filtered ambient light level from the light signal output from the first ambient light sensor;

determine a second filtered ambient light level from the light signal output from the second ambient light sensor;

determine a threshold based on the first filtered ambient light level and the second filtered ambient light level; and generate a headlamp control signal based on the threshold and at least one of the first filtered ambient light level and the second ambient light level.

47. A system for automatically controlling vehicle equipment as in claim 46 wherein the threshold is determined based on a ratio between the first filtered ambient light level and the second filtered ambient light level.

48. A system for automatically controlling vehicle equipment as in claim 45 wherein the first ambient light sensor substantially passes light from a cloudless day and the second ambient light sensor substantially passes light from a cloudy day.

49. A system for automatically controlling vehicle equipment as in claim 45 wherein light in the first band of frequencies includes light from a cloudless day and light in the second band of frequencies includes light from a cloudy day.

* * * * *